United States Patent
Raleigh et al.

(10) Patent No.: US 9,258,735 B2
(45) Date of Patent: Feb. 9, 2016

(54) DEVICE-ASSISTED SERVICES FOR PROTECTING NETWORK CAPACITY

(71) Applicant: Headwater Partners I LLC, Redwood City, CA (US)

(72) Inventors: Gregory G. Raleigh, Woodside, CA (US); James Lavine, Corte Madera, CA (US); Alireza Raissinia, Monte Sereno, CA (US)

(73) Assignee: Headwater Partners I LLC, Redwood Shores, CA (US)

( * ) Notice: Subject to any disclaimer, the term of this patent is extended or adjusted under 35 U.S.C. 154(b) by 0 days.

(21) Appl. No.: 14/689,504

(22) Filed: Apr. 17, 2015

(65) Prior Publication Data

US 2015/0230126 A1    Aug. 13, 2015

Related U.S. Application Data

(60) Continuation of application No. 14/082,040, filed on Nov. 15, 2013, which is a division of application No.
(Continued)

(51) Int. Cl.
*H04L 12/66*    (2006.01)
*H04W 28/02*    (2009.01)
(Continued)

(52) U.S. Cl.
CPC ....... *H04W 28/0289* (2013.01); *H04L 41/0893* (2013.01); *H04L 41/5051* (2013.01);
(Continued)

(58) Field of Classification Search
CPC ....... H04W 84/12; H04W 12/56; H04W 4/00; H04W 24/00
USPC .................. 370/331, 338, 342, 348, 339, 463
See application file for complete search history.

(56) References Cited

U.S. PATENT DOCUMENTS 5,131,020 A    7/1992 Liebesny et al.
5,283,904 A    2/1994 Carson et al.
(Continued)

FOREIGN PATENT DOCUMENTS

CA    2688553 A1    12/2008
CN    1310401 A    2/2000
(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
(Continued)

*Primary Examiner* — Ricky Ngo
*Assistant Examiner* — Dewanda Samuel
(74) *Attorney, Agent, or Firm* — James E. Harris

(57) ABSTRACT

A wireless end-user device has a wireless wide-area network (WWAN) modem. A network element securely provisions the device with a differential traffic control policy list that distinguishes how network traffic for at least one network type should be treated on a per-application basis. A user is also allowed, through an interface, to configure one or more aspects of how a differential traffic control policy is applied to applications. One or more device agents classify whether an application is interacting with a user in a user interface foreground of the device and whether data communication for Internet service activities is provided through the WWAN modem. Based on the network- and user-configured policy information and the classifications, a network stack agent determines whether to allow or disallow a given Internet access request. Some requests that may otherwise be disallowed are allowed when the WWAN modem is already active to serve another request.

21 Claims, 29 Drawing Sheets

Related U.S. Application Data

13/134,028, filed on May 25, 2011, now Pat. No. 8,589,541, which is a continuation-in-part of application No. 13/134,005, filed on May 25, 2011, now Pat. No. 8,635,335, and a continuation-in-part of application No. 12/695,021, filed on Jan. 27, 2010, now Pat. No. 8,346,225, and a continuation-in-part of application No. 12/380,780, filed on Mar. 2, 2009, now Pat. No. 8,839,388, and a continuation-in-part of application No. 12/380,778, filed on Mar. 2, 2009, now Pat. No. 8,321,526, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,980, filed on Jan. 28, 2010, now Pat. No. 8,340,634.

(60) Provisional application No. 61/381,159, filed on Sep. 9, 2010, provisional application No. 61/348,022, filed on May 25, 2010, provisional application No. 61/381,162, filed on Sep. 9, 2010, provisional application No. 61/384,456, filed on Sep. 20, 2010, provisional application No. 61/389,547, filed on Oct. 4, 2010, provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/252,151, filed on Oct. 15, 2009, provisional application No. 61/252,153, filed on Oct. 15, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/264,120, filed on Nov. 24, 2009.

(51) Int. Cl.

| | | |
|---|---|---|
| *H04L 12/24* | (2006.01) | |
| *H04L 12/927* | (2013.01) | |
| *H04L 12/911* | (2013.01) | |
| *H04L 12/26* | (2006.01) | |
| *H04W 4/00* | (2009.01) | |
| *H04W 52/02* | (2009.01) | |
| *H04W 84/12* | (2009.01) | |
| *H04L 12/813* | (2013.01) | |
| *H04W 28/12* | (2009.01) | |
| *H04L 12/801* | (2013.01) | |
| *H04L 29/06* | (2006.01) | |
| *H04W 12/08* | (2009.01) | |
| *H04W 48/16* | (2009.01) | |
| *H04W 80/04* | (2009.01) | |
| *H04L 12/859* | (2013.01) | |
| *H04W 48/04* | (2009.01) | |
| *H04W 24/00* | (2009.01) | |
| *H04W 36/14* | (2009.01) | |
| *H04W 84/04* | (2009.01) | |

(52) U.S. Cl.
CPC ............ *H04L41/5054* (2013.01); *H04L 43/08* (2013.01); *H04L 43/0882* (2013.01); *H04L 47/12* (2013.01); *H04L 47/14* (2013.01); *H04L 47/19* (2013.01); *H04L 47/20* (2013.01); *H04L 47/2475* (2013.01); *H04L 47/801* (2013.01); *H04L 47/803* (2013.01); *H04L 47/805* (2013.01); *H04L 47/808* (2013.01); *H04L 47/822* (2013.01); *H04L 47/824* (2013.01); *H04L 63/10* (2013.01); *H04L 63/102* (2013.01); *H04L 63/20* (2013.01); *H04W 4/001* (2013.01); *H04W 12/08* (2013.01); *H04W 28/021* (2013.01); *H04W 28/0215* (2013.01); *H04W 28/0221* (2013.01); *H04W 28/0257* (2013.01); *H04W 28/0268* (2013.01); *H04W 28/12* (2013.01); *H04W 48/04* (2013.01); *H04W 48/16* (2013.01); *H04W 52/0212* (2013.01); *H04W 52/0264* (2013.01); *H04W 80/04* (2013.01); *H04W 84/12* (2013.01); *H04W 24/00* (2013.01); *H04W 36/14* (2013.01); *H04W 84/042* (2013.01)

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,630,159 A | 5/1997 | Zancho |
| 5,633,484 A | 5/1997 | Zancho et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,119,933 A | 9/2000 | Wong et al. |
| 6,125,391 A | 9/2000 | Meltzer et al. |
| 6,141,686 A | 10/2000 | Jackowski et al. |

(56) References Cited

U.S. PATENT DOCUMENTS

| | | | |
|---|---|---|---|
| 6,148,336 A | 11/2000 | Thomas et al. |
| 6,154,738 A | 11/2000 | Call |
| 6,185,576 B1 | 2/2001 | McIntosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,393,014 B1 | 5/2002 | Daly et al. |
| 6,397,259 B1 | 5/2002 | Lincke et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,542,992 B1 | 4/2003 | Peirce et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,598,034 B1 | 7/2003 | Kloth |
| 6,603,969 B1 | 8/2003 | Vuoristo et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,697,821 B2 | 2/2004 | Ziff et al. |
| 6,725,031 B2 | 4/2004 | Watler et al. |
| 6,735,206 B1 | 5/2004 | Oki et al. |
| 6,748,195 B1 | 6/2004 | Phillips |
| 6,748,437 B1 | 6/2004 | Mankude et al. |
| 6,754,470 B2 | 6/2004 | Hendrickson et al. |
| 6,757,717 B1 | 6/2004 | Goldstein |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,947,723 B1 | 9/2005 | Gurnani et al. |
| 6,952,428 B1 | 10/2005 | Necka et al. |
| 6,957,067 B1 | 10/2005 | Iyer et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,982,733 B1 | 1/2006 | McNally et al. |
| 6,983,370 B2 | 1/2006 | Eaton et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,024,200 B2 | 4/2006 | McKenna et al. |
| 7,024,460 B2 | 4/2006 | Koopmas et al. |
| 7,027,408 B2 | 4/2006 | Nabkel et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,084,775 B1 | 8/2006 | Smith |
| 7,092,696 B1 | 8/2006 | Hosain et al. |
| 7,102,620 B2 | 9/2006 | Harries et al. |
| 7,113,780 B2 | 9/2006 | McKenna et al. |
| 7,113,997 B2 | 9/2006 | Jayapalan et al. |
| 7,133,695 B2 | 11/2006 | Beyda |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,158,792 B1 | 1/2007 | Cook et al. |
| 7,162,237 B1 | 1/2007 | Silver et al. |
| 7,167,078 B2 | 1/2007 | Pourchot |
| 7,174,174 B2 | 2/2007 | Boris et al. |
| 7,180,855 B1 | 2/2007 | Lin |
| 7,181,017 B1 | 2/2007 | Nagel et al. |
| 7,197,321 B2 | 3/2007 | Erskine et al. |
| 7,200,112 B2 | 4/2007 | Sundar et al. |
| 7,203,169 B1 | 4/2007 | Okholm et al. |
| 7,203,752 B2 | 4/2007 | Rice et al. |
| 7,212,491 B2 | 5/2007 | Koga |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,271,765 B2 | 9/2007 | Stilp et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |

(56) References Cited

U.S. PATENT DOCUMENTS

| | | |
|---|---|---|
| 7,356,337 B2 | 4/2008 | Florence |
| 7,366,497 B2 | 4/2008 | Nagata |
| 7,366,654 B2 | 4/2008 | Moore |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,411,930 B2 | 8/2008 | Montojo et al. |
| 7,418,253 B2 | 8/2008 | Kavanagh |
| 7,418,257 B2 | 8/2008 | Kim |
| 7,421,004 B2 | 9/2008 | Feher |
| 7,444,669 B1 | 10/2008 | Bahl et al. |
| 7,450,591 B2 | 11/2008 | Korling et al. |
| 7,450,927 B1 | 11/2008 | Creswell et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,508,799 B2 | 3/2009 | Sumner et al. |
| 7,512,128 B2 | 3/2009 | DiMambro et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |
| 7,580,857 B2 | 8/2009 | VanFleet et al. |
| 7,583,964 B2 | 9/2009 | Wong |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,668,176 B2 | 2/2010 | Chuah |
| 7,668,612 B1 | 2/2010 | Okkonen |
| 7,668,903 B2 | 2/2010 | Edwards et al. |
| 7,676,673 B2 | 3/2010 | Weller et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,464 B2 | 5/2010 | Batta |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,606 B2 | 9/2010 | Birger et al. |
| 7,809,351 B1 | 10/2010 | Panda et al. |
| 7,817,615 B1 | 10/2010 | Breau et al. |
| 7,822,837 B1 | 10/2010 | Urban et al. |
| 7,826,427 B2 | 11/2010 | Sood et al. |
| 7,826,607 B1 | 11/2010 | de Carvalho Resende et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,477 B2 | 12/2010 | Cristofalo et al. |
| 7,853,255 B2 | 12/2010 | Karaoguz et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |

(56) References Cited

U.S. PATENT DOCUMENTS

| | | |
|---|---|---|
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,600 B2 | 10/2011 | Garrett et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,463 B1 | 11/2011 | Spiegel |
| 8,064,418 B2 | 11/2011 | Maki |
| 8,064,896 B2 | 11/2011 | Bell et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,144,591 B2 | 3/2012 | Ghai et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,160,015 B2 | 4/2012 | Rashid et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |

(56) References Cited

U.S. PATENT DOCUMENTS

| | | |
|---|---|---|
| 8,190,122 B1 | 5/2012 | Alexander et al. |
| 8,190,675 B2 | 5/2012 | Tribbett |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,195,093 B2 | 6/2012 | Garrett et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,307,067 B2 | 11/2012 | Ryan |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,718 B2 | 12/2012 | Colonna et al. |
| 8,346,210 B2 | 1/2013 | Balsan et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,385,896 B2 | 2/2013 | Proctor, Jr. et al. |
| 8,385,975 B2 | 2/2013 | Forutanpour |
| 8,386,386 B1 | 2/2013 | Zhu |
| 8,391,262 B2 | 3/2013 | Maki et al. |
| 8,391,834 B2 | 3/2013 | Raleigh |
| 8,396,458 B2 | 3/2013 | Raleigh |
| 8,396,929 B2 | 3/2013 | Helfman et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,422,988 B1 | 4/2013 | Keshav |
| 8,423,016 B2 | 4/2013 | Buckley et al. |
| 8,429,403 B2 | 4/2013 | Moret et al. |
| 8,429,409 B1 | 4/2013 | Wall et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| RE44,412 E | 8/2013 | Naqvi et al. |
| 8,503,455 B2 | 8/2013 | Heikens |
| 8,504,687 B2 | 8/2013 | Maffione et al. |
| 8,504,690 B2 | 8/2013 | Shah et al. |

(56) References Cited

U.S. PATENT DOCUMENTS

| | | |
|---|---|---|
| 8,504,729 B2 | 8/2013 | Pezzutti |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,521,110 B2 | 8/2013 | Rofougaran |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,526,329 B2 | 9/2013 | Mahany et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,532,610 B2 | 9/2013 | Manning Cassett et al. |
| 8,533,775 B2 | 9/2013 | Alcorn et al. |
| 8,538,394 B2 | 9/2013 | Zimmerman et al. |
| 8,538,458 B2 | 9/2013 | Haney |
| 8,539,561 B2 | 9/2013 | Gupta et al. |
| 8,543,265 B2 | 9/2013 | Ekhaguere et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,554,876 B2 | 10/2013 | Winsor |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,589,541 B2 | 11/2013 | Raleigh et al. |
| 8,589,955 B2 | 11/2013 | Roundtree et al. |
| 8,601,125 B2 | 12/2013 | Huang et al. |
| 8,605,691 B2 | 12/2013 | Soomro et al. |
| 8,626,115 B2 | 1/2014 | Raleigh et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,676,925 B1 | 3/2014 | Liu et al. |
| 8,693,323 B1 | 4/2014 | McDysan |
| 8,694,772 B2 | 4/2014 | Kao et al. |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,423 B2 | 5/2014 | Wyld |
| 8,725,899 B2 | 5/2014 | Short et al. |
| 8,730,842 B2 | 5/2014 | Collins et al. |
| 8,732,808 B2 | 5/2014 | Sewall et al. |
| 8,739,035 B2 | 5/2014 | Trethewey |
| 8,761,711 B2 | 6/2014 | Grignani et al. |
| 8,780,857 B2 | 7/2014 | Balasubramanian et al. |
| 8,793,304 B2 | 7/2014 | Lu et al. |
| 8,804,517 B2 | 8/2014 | Oerton |
| 8,811,991 B2 | 8/2014 | Jain et al. |
| 8,812,525 B1 | 8/2014 | Taylor, III |
| 8,825,109 B2 | 9/2014 | Montemurro et al. |
| 8,831,561 B2 | 9/2014 | Sutaria et al. |
| 8,863,111 B2 | 10/2014 | Selitser et al. |
| 8,868,725 B2 | 10/2014 | Samba |
| 8,880,047 B2 | 11/2014 | Konicek et al. |
| 8,930,238 B2 | 1/2015 | Coffman et al. |
| 8,949,597 B1 | 2/2015 | Reeves et al. |
| 8,966,018 B2 | 2/2015 | Bugwadia et al. |
| 8,977,284 B2 | 3/2015 | Reed |
| 9,002,342 B2 | 4/2015 | Tenhunen et al. |
| 9,014,973 B2 | 4/2015 | Ruckart |
| 9,049,010 B2 | 6/2015 | Jueneman et al. |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1* | 7/2003 | Sundar .................. H04W 48/18 455/465 |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0127208 A1* | 7/2004 | Nair .................. H04W 36/14 455/420 |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0168052 A1 | 8/2004 | Clisham et al. |
| 2004/0170191 A1 | 9/2004 | Guo et al. |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225898 A1 | 11/2004 | Frost et al. |
| 2004/0236547 A1 | 11/2004 | Rappaport et al. |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |

(56) References Cited

U.S. PATENT DOCUMENTS

| | | |
|---|---|---|
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0075115 A1 | 4/2005 | Corneille et al. |
| 2005/0079863 A1 | 4/2005 | Macaluso |
| 2005/0096024 A1* | 5/2005 | Bicker ............... H04W 4/16 455/417 |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0135264 A1 | 6/2005 | Popoff et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0112016 A1 | 5/2006 | Ishibashi |
| 2006/0114832 A1 | 6/2006 | Hamilton et al. |
| 2006/0126562 A1* | 6/2006 | Liu ................... H04M 3/42246 370/331 |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | McKelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0183462 A1 | 8/2006 | Kolehmainen |
| 2006/0190314 A1 | 8/2006 | Hernandez |
| 2006/0199608 A1 | 9/2006 | Dunn et al. |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1* | 12/2006 | McConnell ....... H04L 29/06027 370/331 |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen |
| 2007/0168499 A1 | 7/2007 | Chu |
| 2007/0174490 A1 | 7/2007 | Choi et al. |
| 2007/0192460 A1 | 8/2007 | Choi et al. |
| 2007/0198656 A1 | 8/2007 | Mazzaferri et al. |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0070550 A1 | 3/2008 | Hose |
| 2008/0080457 A1 | 4/2008 | Cole |
| 2008/0081606 A1 | 4/2008 | Cole |
| 2008/0082643 A1 | 4/2008 | Storrie et al. |

(56) References Cited

U.S. PATENT DOCUMENTS

| | | |
|---|---|---|
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0282319 A1 | 11/2008 | Fontijn et al. |
| 2008/0293395 A1 | 11/2008 | Matthews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0036111 A1 | 2/2009 | Danford et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0048913 A1 | 2/2009 | Shenfield et al. |
| 2009/0049518 A1 | 2/2009 | Roman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | LeBlanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0287599 A1 | 11/2010 | He |
| 2010/0311402 A1 | 12/2010 | Srinivasan et al. |
| 2010/0318652 A1 | 12/2010 | Samba |
| 2010/0325420 A1 | 12/2010 | Kanekar |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0101952 A1 | 4/2012 | Raleigh et al. |
| 2012/0108225 A1 | 5/2012 | Luna et al. |
| 2012/0155296 A1 | 6/2012 | Kashanian |

(56) References Cited

U.S. PATENT DOCUMENTS

| | | |
|---|---|---|
| 2012/0166604 A1 | 6/2012 | Fortier et al. |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0095787 A1 | 4/2013 | Kashanian |
| 2013/0103376 A1 | 4/2013 | Gaddam et al. |
| 2013/0111572 A1 | 5/2013 | Gaddam et al. |
| 2013/0117140 A1 | 5/2013 | Kashanian |
| 2013/0117382 A1 | 5/2013 | Gaddam et al. |
| 2013/0144789 A1 | 6/2013 | Aaltonen et al. |
| 2013/0149994 A1 | 6/2013 | Gaddam et al. |
| 2013/0183937 A1 | 7/2013 | Neal et al. |
| 2013/0326356 A9 | 12/2013 | Zheng et al. |

FOREIGN PATENT DOCUMENTS

| | | |
|---|---|---|
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 A | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1463238 | 9/2004 |
| EP | 1503548 A1 | 2/2005 |
| EP | 1739518 | 1/2007 |
| EP | 1772988 | 4/2007 |
| EP | 1850575 A1 | 10/2007 |
| EP | 1978772 | 10/2008 |
| EP | 2466831 A1 | 6/2012 |
| JP | 3148713 B2 | 3/2001 |
| JP | 2007-318354 | 12/2007 |
| JP | 2008-301121 | 12/2008 |
| JP | 2009111919 | 5/2009 |
| JP | 2009-212707 | 9/2009 |
| JP | 2009-218773 | 9/2009 |
| JP | 2009232107 A | 10/2009 |
| WO | 9858505 | 12/1998 |
| WO | 9927723 A1 | 6/1999 |
| WO | 9965185 | 12/1999 |
| WO | 03014891 | 2/2003 |
| WO | 03058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2006004467 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 A1 | 6/2007 |
| WO | 2007069245 | 6/2007 |
| WO | 2007097786 | 8/2007 |
| WO | 2007107701 | 9/2007 |
| WO | 2007124279 | 11/2007 |
| WO | 2007126352 | 11/2007 |
| WO | 2007133844 | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 | 7/2008 |
| WO | 2008099802 | 8/2008 |
| WO | 2010088413 | 8/2010 |
| WO | 2011149532 A1 | 12/2011 |
| WO | 2012047275 | 4/2012 |

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.

Alonistioti et al., "Intelligent Architectures Enabling Flexible Service Provision and Adaptability," 2002.

Amazon Technologies, Inc., "Kindle™ User's Guide," 3rd Edition, Copyright 2004-2009.

Chandrasekhar et al., "Femtocell Networks: A Survey," Jun. 28, 2008.

Chaouchi et al., "Policy Based Networking in the Integration Effort of 4G Networks and Services," 2004 IEEE.

Cisco Systems, Inc., "Cisco Mobile Exchange (CMX) Solution Guide: Chapter 2—Overview of GSM, GPRS, and UMTS," Nov. 4, 2008.

Dikaiakos et al., "A Distributed Middleware Infrastructure for Personalized Services," Nov. 24, 2003.

European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].

Farooq et al., "An IEEE 802.16 WiMax Module for the NS-3 Simulator," Mar. 2-6, 2009.

Han et al., "Information Collection Services for Qos-Aware Mobile Applications," 2005.

Hartmann et al., "Agent-Based Banking Transactions & Information Retrieval—What About Performance Issues?" 1999.

Hewlett-Packard Development Company, LP, "IP Multimedia Services Charging," white paper, Jan. 2006.

Hossain et al., "Gain-Based Selection of Ambient Media Services in Pervasive Environments," Mobile Networks and Applications. Oct. 3, 2008.

Knight et al., "Layer 2 and 3 Virtual Private Networks: Taxonomy, Technology, and Standardization Efforts," IEEE Communications Magazine, Jun. 2004.

Koutsopoulou et al., "Middleware Platform for the Support of Charging Reconfiguration Actions," 2005.

Kyriakakos et al., "Ubiquitous Service Provision in Next Generation Mobile Networks," Proceedings of the 13th IST Mobile and Wireless Communications Summit, Lyon, France, Jun. 2004.

Li, Yu, "Dedicated E-Reading Device: The State of the Art and the Challenges," Scroll, vol. 1, No. 1, 2008.

Nilsson et al., "A Novel MAC Scheme for Solving the QoS Parameter Adjustment Problem in IEEE802.11e EDCA," Feb. 2006.

Oppliger, Rolf, "Internet Security: Firewalls and Bey," Communications of the ACM, May 1997, vol. 40. No. 5.

Rao et al., "Evolution of Mobile Location-Based Services," Communication of the ACM, Dec. 2003.

Steglich, Stephan, "I-Centric User Interaction," Nov. 21, 2003.

Van Eijk, et al., "GigaMobile, Agent Technology for Designing Personalized Mobile Service Brokerage," Jul. 1, 2002.

(56) References Cited

OTHER PUBLICATIONS

Zhu et al., "A Survey of Quality of Service in IEEE 802.11 Networks," IEEE Wireless Communications, Aug. 2004.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Accuris Networks, "The Business Value of Mobile Data Offload—a White Paper", 2010.
Wireless Broadband Alliance, "WISPr 2.0, Apr. 8, 2010"; Doc. Ref. No. WBA/RM/WISPr, Version 01.00.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wi-Fi Alliance Technical Committee Hotspot 2.0 Technical Task Group, "Hotspot 2.0 (Release 1) Technical Specification—Version 1.0.0"; 2012.
Wi-Fi Alliance Hotspot 2.0 Technical Task Group, "Wi-Fi Certified Passpoint™ (Release 1) Deployment Guidelines—Version 1.0—Oct. 2012".
Dixon et al., Triple Play Digital Services: Comcast and Verizon (Digital Phone, Television, and Internet), Aug. 2007.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
"The Construction of Intelligent Residential District in Use of Cable Television Network," Shandong Science, vol. 13, No. 2, Jun. 2000.
"Communication Concepts for Mobile Agent Systems," by Joachim Baumann et al.; Inst. of Parallel and Distributed High-Performance Systems, Univ. of Stuttgart, Germany, pp. 123-135, 1997.
"Prevent iCloud Documents & Data from using your data plan," Oct. 26, 2011; CNET webarchive, by Jason Cipriani.
"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"ASA/PIX: Allow Split Tunneling for VPN Clients on the ASA Configuration Example," Document ID 70917, Jan. 10, 2008.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Kassar et al., "An overview of vertical handover decision strategies in heterogeneous wireless networks," ScienceDirect, University Pierre & Marie Curie, Paris, France, Jun. 5, 2007.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
"Ads and movies on the run," the Gold Coast Bulletin, Southport, Qld, Jan. 29, 2008.
"Jentro Technologies launches Zenlet platform to accelerate location-based content delivery to mobile devices," The Mobile Internet, Boston, MA, Feb. 2008.
Jing et al., "Client-Server Computing in Mobile Environments," GTE Labs. Inc., Purdue University, ACM Computing Surveys, vol. 31, No. 2, Jun. 1999.
Kim, "Free wireless a high-wire act; MetroFi needs to draw enough ads to make service add profits," San Francisco Chronicle, Aug. 21, 2006.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Loopt User Guide, metroPCS, Jul. 17, 2008.
Nuzman et al., "A compund model for TCP connection arrivals for LAN and WAN applications," Oct. 22, 2002.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Sabat, "The evolving mobile wireless value chain and market structure," Nov. 2002.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.

* cited by examiner

|  | NBS 10% | NBS 25% | NBS 50% | NBS 75% | NBS 90% |
|---|---|---|---|---|---|
| Outlook | 6 | 5 | 4 | 3 | 2 |
| Skype | 7 | 6 | 2 | 1 | 0 |
| Safari | 5 | 4 | 3 | 2 | 1 |
| Pandora | 5 | 4 | 3 | 2 | 1 |
| FaceBook | 4 | 3 | 2 | 1 | 0 |
| iTunes | 7 | 6 | 3 | 1 | 0 |
| QuickTime | 8 | 6 | 4 | 1 | 0 |
| AV Software | 9 | 7 | 5 | 3 | 1 |
| Online Backup | 3 | 2 | 1 | 1 | 0 |
| OS Update | 2 | 1 | 0 | 0 | 0 |

FIG. 23

DEVICE-ASSISTED SERVICES FOR PROTECTING NETWORK CAPACITY

BACKGROUND

With the advent of mass market digital communications, applications and content distribution, many access networks such as wireless networks, cable networks and Digital Subscriber Line (DSL) networks are pressed for user capacity, with, for example Evolution-Data Optimized (EVDO), High Speed Packet Access (HSPA), Long Term Evolution (LTE), Worldwide Interoperability for Microwave Access (WiMax), DOCSIS, DSL, and Wireless Fidelity (Wi-Fi) becoming user capacity constrained. In the wireless case, although network capacity will increase with new higher capacity wireless radio access technologies, such as Multiple-Input Multiple-Output (MIMO), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

The foregoing example of trends and issues is intended to be illustrative and not exclusive. Other limitations of the art will become apparent to those of skill in the relevant art upon a reading of the specification and a study of the drawings.

BRIEF DESCRIPTION OF THE DRAWINGS

FIG. 23 illustrates a network capacity controlled services priority level chart for device assisted services (DAS) for protecting network capacity in accordance with some embodiments.

DETAILED DESCRIPTION

Figure 1:
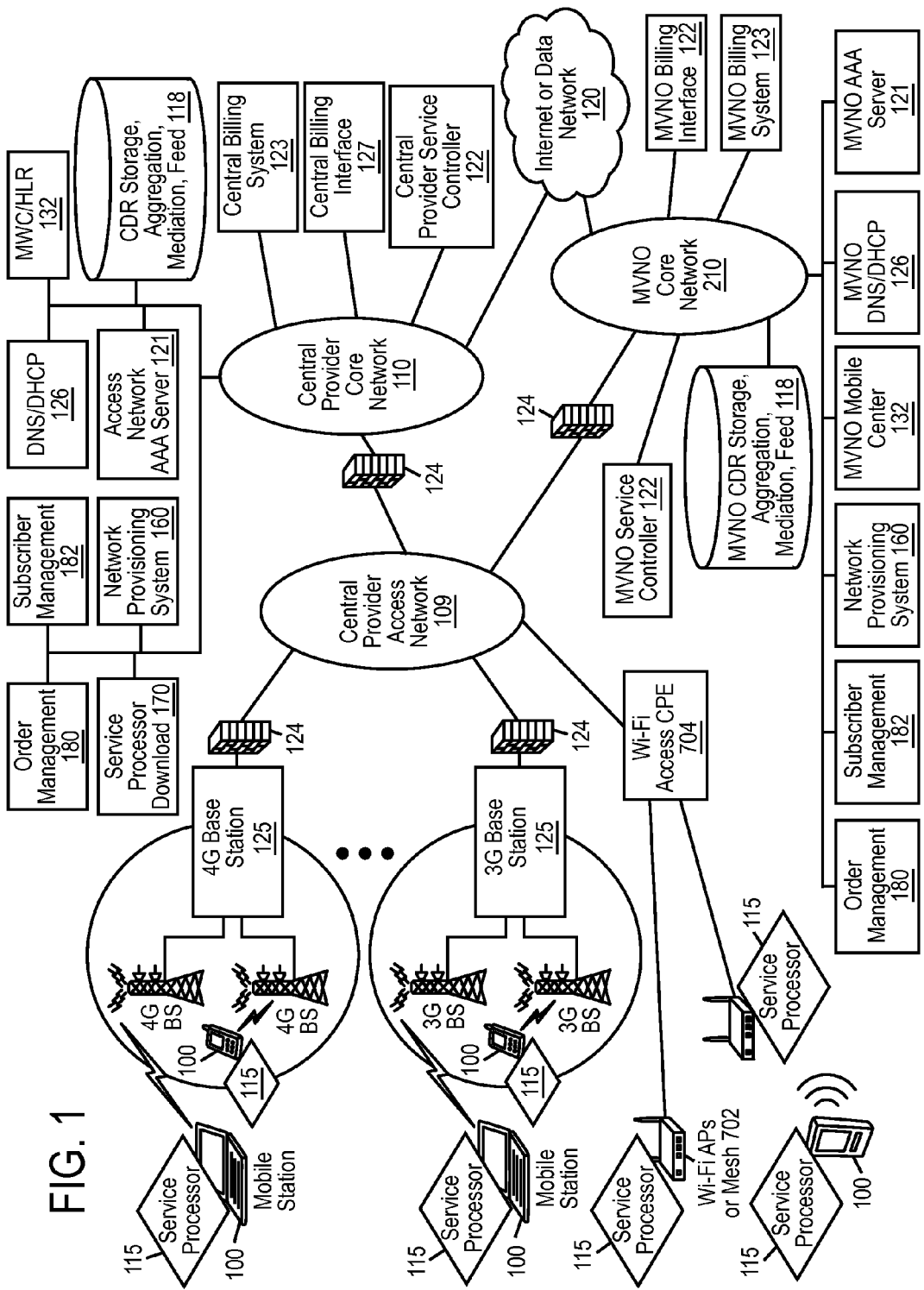
FIG. 1 illustrates a functional diagram of a network architecture for providing quality of service (QoS) for device assisted services (DAS) and/or for providing DAS for protecting network capacity in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As the network capacity gains are less than what is required to meet growing digital networking demand, a network capacity crunch is developing due to increasing network congestion on various wireless networks, such as mobile networks. The increasing popularity of various smart phone devices, net book devices, tablet computing devices, and various other wireless mobile computing devices, which are becoming increasingly popular on 3G, 4G, and other advanced wireless networks, is contributing to the network capacity crunch. Some network carriers have indicated that a relatively small number of users on such devices demand a disproportionately significant amount of their network capacity. For example, AT&T has recently indicated that about 3 percent of its smart phone device users (e.g., Apple iPhone® users) are generating approximately 40 percent of the operator's data traffic.

For example, in wireless networks, managing the wireless access connection capacity and network access connection resources is important to maintain network performance as network resources/capacity demand increases. Many network performance measures can be advantageously maintained or improved as network loading increases if capacity management and/or network resource management is employed. For example, these performance measures include network availability; the ability to deliver connections to all devices, users and/or applications seeking connections and enabled for service on the network; network access attempt success rate; the transmission speed experienced by one or more devices, users or applications; the average transmission speed experienced by all devices, users and/or applications; network bit error rate or packet error rate; the time delay from network access request to delivered access connection; the one-way delay or round-trip delay for a transmission; the delay timing jitter for a transmission; the time variation in transmission speed for one or more connections; the ability of the network to deliver various requested/needed levels of Quality of Service (QoS) to devices, users or applications that require differentiated connection QoS classes; the ability of the network to maintain efficiency (e.g., aggregated service throughput measured across all devices, users, and/or applications); the ability of the network to share or distribute a performance measure (e.g., the performance measures listed above) uniformly or fairly across multiple devices, users, and/or applications that all have the same service quality class or the same service plan performance parameters.

For example, if there is a limited amount of shared bandwidth for a set of user devices (e.g., a set of devices on a wireless network, such as a given base station or base station controller or femto cell or pico cell; or a set of devices on a cable modem networks, etc.), and if multiple and/or all devices allow all applications to indiscriminately access or attempt to access network resources or transmit/receive traffic, then the network can generally become overloaded. As a result, a subset of users/devices or in some cases most or all users/devices obtain poor network performance. As another example, if one or more devices forming a subset of devices on the network allow multiple and/or all applications to indiscriminately access or attempt to access network resources or transmit/receive traffic, then the network can become overloaded. As a result, a subset of users/devices or in some cases most or all users/devices obtain poor network performance.

Traditionally, mobile devices typically have specialized designs that are optimized to preserve network capacity and protect network resources from being over taxed. For example, wireless devices that browse the Internet often use specialized protocols such as WAP and data traffic compression or low resolution techniques rather than standard HTTP protocols and traffic used in wired Internet devices.

However, the wireless devices that implement specialized methods for accessing the Internet and/or other networks often implement complex specifications provided by one or more wireless carriers that own the networks that the device is designed to connect to. Such complex specifications often require time consuming design, testing, and certification processes. These processes in part have the effect of narrowing the base of device suppliers to those qualified and willing to perform the specialized design work required, slowing time to market for new devices, increasing the expense to develop new devices and reducing the types of applications that are supported.

Device OEMs have recently created wireless devices that are designed more like standard Internet devices and not fully optimized to preserve network capacity and resources. Many wireless service customers desire this type of device, and the OEMs generally want to reduce the complexity and time to market to deliver such devices. In addition, new market needs and new government requirements sometimes require that carriers offer a more open process for bringing new devices onto their network, in which the process does not require all of the specialized design and certification described above. These and various other factors are driving a growing need and trend for less complex and time consuming wireless device design and certification processes.

This trend has led many carriers to begin selling devices that are designed more as standard Internet service devices that connect to the Internet and other data networks through carrier wireless networks. As the cellular network is opened up to more and more new devices, applications and markets, there is a growing demand to allow general purpose Internet devices and applications to gain access to wireless networks without necessarily going through specialized design and certification process requirements to make the devices and applications efficient and authorized for access to such wireless networks.

However, general purpose Internet devices are not as frugal or sparing with wireless network access bandwidth. Moreover, with the advent of always on wide area network connections to the Internet has led to popular Internet services and applications that typically assume very inexpensive access and generally heed no attention to, for example, network busy state. As more general purpose Internet devices are provided for us on various wireless networks (e.g., mobile wireless networks), a high frequency of inefficient wireless network accesses continue to rise, which can reduce network capacity sometimes to levels that hinder access to service for that device (e.g., user, device, software demand) and/or other devices on that wireless network and/or that wireless network segment. As discussed above, judicious use of wireless network bandwidth, capacity, and resources generally results in better service for all users, but at present, device manufacturers and wireless network providers (e.g., wireless network carriers or carriers) have not provided or implemented more intelligent bandwidth usage techniques. These factors generally result in less carrier control of device design, which poses a threat to longer term network capacity and performance preservation as the volume of devices with less optimized wireless designs continues to grow.

There are many network performance and user performance factors that are impacted by the efficiency of the network, including, for example, overall network congestion; the access network performance experienced by one or more groups of users, devices, applications, network service sources, communication protocols, and/or operating system functions; and/or the performance experienced by a given user, device, application, network service source, communication protocol, and/or operating system function. Under a relatively low capacity demand of a wireless network, network performance as experienced by a group of devices, applications, network service sources, communication protocols, operating system functions, and/or users or by a single device, application, network service source, communication protocol, operating system function, and/or user can degrade somewhat proportionally (e.g., aggregate traffic delivered by the network may be roughly proportional to the peak available network traffic) with incremental increases in network access and/or traffic demand from one or more groups of users, devices, applications, network service sources, communication protocols and/or operating system functions. However, as network resources/network capacity demand increases (e.g., more wireless network data traffic is demanded in aggregate; more devices are serviced by the network; more users are serviced by the network; more applications are serviced by the network; more network service sources are serviced by the network; more operating system functions are serviced by the network; and/or more differentiated QoS sessions are serviced by the network), network availability/performance can decrease and/or the network may not adequately service one or more users, devices, applications, network service sources, communication protocols, and/or operating system functions, or may not service one or more groups of users, devices, applications, network service sources, communication protocols, and/or operating system functions.

There are many examples of how increasing network capacity demand can decrease network performance, including for example, to a decrease in average bandwidth offered per device (e.g., one or more users on a device, application, network service source, communication protocol, and/or operating system function executed/implemented on the device); an increase in traffic delivery latency; an increase in traffic delivery latency jitter; insufficient guaranteed or differentiated bandwidth for one or more differentiated QoS and/or dynamic QoS services (e.g., as described herein) to one or more devices, users, applications, network service sources, communication protocols, and/or operating system functions; increased latency for bandwidth reservation services; increased latency for QoS reservation services; performance problems with one or more communication protocols; unacceptable delays in user experience, and/or various other or similar consequences and device or user impacts resulting from reduced network availability and/or reduced network capacity. Examples of network communication protocols that can have degraded performance with excessive network loading or degraded network performance include, for example, Internet protocol (IP), HTML protocols, voice communication protocols including VOIP protocols, real-time video communication protocols, streaming media protocols (e.g., audio, video, etc), gaming protocols, VPN protocols, file download protocols, background service protocols, software update protocols, and/or various other network communication protocols. Thus, is it important to preserve/protect network capacity.

It is also important to control the number of transactions demanded from a given network resource (e.g., edge network segment, base station, base station controller, MAC resources, pico cell, femto cell, etc.) in a given period of time so that demand does not overcome the transaction servicing ability of that network resource. For example, network resources that should not be subjected to excess transaction demand can include base station or base station controller resources, media access control (MAC) resources, traffic transport resources, AAA resources, security or authentication resources, home agent (HA) resources, DNS resources, resources that play a part in network discovery, gateway or router resources, data session reservation or establishment resources (e.g., network resources required to manage, set up, conduct, and/or close service sessions, PPP sessions, communication flows, communication streams, QoS flows, radio access bearer reservation resources, tunnels, VPNs, APNs, special service routing, etc.), bandwidth reservation resources, QoS reservation or coordination resources, QoS transport resources, service charging resources, traffic analysis resources, network security resources, and/or various other or similar network resources. In some networks, the network performance degradation due to a given measure of incremental increase in network resource/capacity demand can become relatively large as various network resources become increasingly taxed due to either limited transaction processing capability or limited traffic bandwidth for one or more of the network resources that participate in establishing, servicing, conducting, maintaining, and/or closing the necessary network service connections and/or information exchanges required to conduct a service activity. For example, if the equipment required to establish a PPP session can only handle a certain number of new PPP session openings and/or closings per given period of time, and if device behavior is such that PPP sessions are often opened and/or closed, then the rate of PPP session transactions (e.g., openings and/or closings) can exceed the transaction capacity of the PPP session management resources. This is sometimes referred to as "flooding" or "overloading" a network resource with excess demand or excess connections, and, in such cases, the network resource may begin falling behind in servicing transaction demand in a well controlled manner (e.g., the network resource may continue processing transactions at or near a maximum rate for that network resource), or in some cases, the resource may fall behind transaction demand in a less well controlled manner (e.g., the network resource may become overwhelmed such that its processing rate not only falls below aggregate transaction demand, but the transaction rate processing capability decreases under overload as well).

In the PPP session establishment resource example, once the rate of requested transactions exceeds the resource maximum transaction rate, then unmet device demand can grow to a point where one or more devices experiences delays in connecting to and/or communicating (e.g., sending/receiving data) with the network.

As another example, in any type of random access bandwidth reservation protocol, MAC protocol, or bandwidth delivery protocol, in a network without proper management and/or control of traffic access reservations and/or transmissions, as the network demand increases there may be more collisions between reservation requests, traffic transmissions, application demands, network service source demands, communication protocol demands, and/or operating system function demands causing a decreasing network efficiency that can degrade user, device, application and/or network service performance so that performance falls below acceptable levels. As another example, in systems in which there is a QoS service session reservation system, uncontrolled and/or unmanaged QoS reservation requests and/or reservation grants can lead to a situation where the QoS reservation resources and/or QoS service delivery resources are over taxed to the point where QoS service performance falls below desired levels. As another example, in networks that require some form of minimum resource allocation for transmissions, reservations, or network resource transactions, the network can become inefficient if one or more devices, applications, network service sources, operating system functions, and/or communication protocols have a relatively high rate of network resource access attempts, network accesses or data transmissions for small transmission payloads (e.g., minimum MAC reservation factors, minimum security overhead factors, minimum QoS reservation factors, minimum time responses for establishing a base station connection, minimum time responses for establishing or closing/being released from a session, etc). Even if the data packet comprising the access event is small, the network resources required to complete the access event are often busy servicing the access event for much longer periods of time than are required for the actual data transmission.

Another example of device service activity behavior that can have an impact on network performance is the way the device, device subsystem, and/or modem subsystem power cycling or transitions from one power save state to another. For example, establishing a basic connection from a device to a wireless base station consumes base station resources for a period of time and in some cases can also consume other network resources such as AAA, HLR, HA, gateway, billing, and/or charging gateway resources. If a device terminates the connection to the base station when the modem subsystem (e.g., or some other portion of the device) goes from active connection state to a power save state, then each time the device enters power save state and then exits power save state network resources are consumed, sometimes for time periods measured on the order of seconds or in extreme cases even minutes. If such a device has an aggressive power save algorithm that enters power save state after a short idle period, then the device behavior can consume a proportionally large amount of resources such that the network ability to support multiple devices is diminished, or such that the network cannot support very many similar devices on the network. Another similar example is the establishment of network sessions once the base station connection is established (e.g., establishing a PPP session between the device and a home agent (HA) or other gateway), in which network resources required to open and/or close the network session are ignorantly consumed if a device exhibits aggressive power save state cycling or frequently terminates the data session for other reasons.

Another example of device service activity behavior that can impact network performance is applications that maintain persistent network communication that generates a relatively high frequency of network data packets. Some applications have persistent signaling that falls into this category. Specific examples include frequent device signaling sequences to update widgets on a desktop; synchronize user data such as calendars, contacts, email, and/or other information/content; check or update email or RSS feeds; access social networking websites or tools; online text, voice or video chat tools; update real-time information; and conduct other repetitive actions. Additional application behavior that can significantly tie up network resources and capacity include, for example, conference meeting services, video streaming, content update, software update, and/or other or similar application behavior. For example, even when the user is not directly interacting with or benefiting from this type of application, the application can be running in the background and continuing to consume potentially significant network resources.

For example, the types of service activities and/or device behavior that can reduce network capacity and/or network resource availability include software updates for OS and applications, frequent OS and application background network accesses and signaling, frequent network discovery and/or signaling (e.g., EtherType messages, ARP messages, and/or other messaging related to network access), cloud synchronization services, RSS feeds and/or other background information feeds, application (e.g., web browser) or device behavior reporting, background email downloads, content subscription service updates and downloads (e.g., music/video downloads, news feeds, etc.), text/voice/video chat clients, virus updates, peer to peer networking applications, inefficient network access sequences during frequent power cycling or power save state cycling, large downloads or other high bandwidth accesses, and/or greedy application programs that continually and/or frequently access the network with small transmissions or requests for information. Various other examples will now be apparent to one of ordinary skill in the art.

Thus, not only can network capacity, network performance, and/or network resource availability be degraded by high device transmission bandwidth demand, but other types of persistent or frequent traffic resulting from network resource requests, network data accesses or other network interaction can also degrade network capacity, network performance, and/or network resource whether or not the aggregate bandwidth demand as measured by the total data throughput is high or not. Thus, techniques are needed to preserve network capacity by, for example, differentially controlling these types of network service usage activities in various ways depending on the type of service activity requesting network access and/or requesting transactions with network resources.

Smart phones and similar devices are exacerbating the problem by making frequent queries of the wireless network as such devices move among cell sites to, while in transit, for example, push email, access social networking tools, and/or conduct other repetitive actions. While data traffic is also growing, signaling traffic is outpacing actual mobile data traffic by 30 percent to 50 percent by some estimates. For example, a Yahoo IM user may send a message but then wait a couple of seconds between messages. To preserve battery life, the smart phone typically moves into an idle mode. When the user pushes another message seconds later, the device has to set up a signaling path again, and even when the signaling resource is released by the smart phone, the network typically does not react fast enough to allow for the next station to use resources until several seconds and sometimes minutes. As a result, the base station controller in this example is spending a lot of its resources trying to process the signaling so it cannot perform other tasks, such as allocate additional resources for data network usage, and such inefficiencies exacerbate the data network capacity crunch and dropped calls on such wireless networks.

One approach used by smart phone vendors to address this problem and save battery life on their devices is to implement a fast dormancy feature, which allows the mobile device to quickly make a query to the radio network controller to release the connection so that it can return to the idle state faster. In other words, the device is relaying the fact that the phone is going dormant saving device resources (e.g., signaling channel) rather than network resources. However, the fast dormancy feature can exacerbate this problem by prematurely requesting a network release only to follow on with a request to connect back to the network or by a request to re-establish a connection with the network.

Network carriers have typically attempted to manage network capacity using various purely central/core network based approaches. For example, some carriers have indicated a robust capacity planning process and sufficient investment is needed to alleviate this growing capacity crunch. Purely centralized network solutions with no assistance from a device based software agent (or service processor) can have several limitations. For example, for some device applications, OS functions or other service usage activities, if the activity is blocked somewhere in the network behind the base station after over the air (OTA) spectrum bandwidth is consumed to open or begin to open a communication socket, then there can still be an appreciable amount of network capacity or resources consumed even though the data transfer is not allowed to complete. In addition, if the service usage activity is aggressive in re-attempting to establish the network connection to transfer the data, and the network continues to allow the OTA portion of the connection establishment but blocks the connection somewhere in the network, then a large amount of capacity can be consumed by many devices exhibiting such behavior even though no useful service is being allowed. Accordingly, some embodiments for protecting network capacity include controlling network service usage activities at the source of the demand—the device. Furthermore, in some embodiments, service usage is controlled in a manner that delays, prevents, or reduces the frequency of service usage activity re-try attempts to connect to the network.

In some cases, an additional drawback of purely centralized network solutions to protect network capacity arises when service usage activities are controlled, blocked, throttled, and/or delayed by central network equipment with no mechanisms or support to link to a device user interface (UI) to inform the user what is happening and why it is happening. This can lead to a frustrating user experience and reduced carrier customer satisfaction. Accordingly, in some embodiments, a device based UI is provided to provide the user with real time or near real time information regarding why a service usage activity is being controlled, blocked, throttled, and/or otherwise controlled in order to protect network capacity. In some embodiments, a UI is provided that also informs the user when there are options to set, control, override, or modify service usage controls for the purpose of protecting network capacity. In some embodiments, such user preference inputs also correspond to a change in service usage billing. In some embodiments, such changes in service usage billing due to capacity sparing service control changes by the user are communicated to the user via a UI notification sequence. In some embodiments, techniques for protecting network capacity employ user warnings when a service usage activity classified for differential user notification policies is likely to cause the user to go over service plan caps (e.g., total data byte count usage caps).

What is needed is intelligent network monitoring to provide real-time traffic monitoring network service usage (e.g., at the packet level/layer, network stack application interface level/layer, and/or application level/layer) of the wireless network (e.g., radio access networks and/or core networks) and to effectively manage the network service usage for protecting network capacity (e.g., while still maintaining an acceptable user experience). Using Device Assisted Services (DAS) techniques, and in some cases, network assisted/based techniques, to provide for network service usage monitoring of devices, network carriers/operators would be provided greater insight into what devices, which users and what applications, and when and where network congestion problems occur, enabling operators to intelligently add additional resources to certain areas when necessary (e.g., offloading data traffic onto femto cells or WiFi hotspots and adding more network resources), to differentially control network service usage, and/or to differentially charge for network service usage based on, for example, a network busy state, for protecting network capacity.

Intelligent network monitoring of the wireless network to effectively manage network service usage for protecting network capacity can include providing Device Assisted Services (DAS) for protecting network capacity in accordance with various embodiments described herein. For example, intelligent network monitoring of the wireless network to effectively manage network service usage for protecting network capacity can include differentially controlling over the air software updates and/or performing software updates via wired connections only. As another example, intelligent network monitoring of the wireless network to effectively manage network service usage for protecting network capacity can include differentially controlling various applications that demand significant network resources or network capacity. As another example, intelligent network monitoring of the wireless network to effectively manage network service usage for protecting network capacity can include managing network access connection requests resulting from repeated power down modes in the modem, which can cause resource intensive re-connection and/or re-authentication processes. As another example, intelligent network monitoring of the wireless network to effectively manage network service usage for protecting network capacity can include techniques for keeping PPP sessions alive to avoid the need to consume network resources to re-establish PPP sessions (e.g., unless the application behavior analysis predicts that a mean access time is long enough for the PPP session to be dropped off and yet not causing overall network resource limitations).

Unlike traditional QoS techniques, which are used to establish a single end or end to end guaranteed service level(s) on a network, techniques disclosed herein for protecting network capacity facilitate implementation of services on a network to facilitate differential control of certain services to protect network capacity (e.g., to reduce network congestion, network capacity demand, network resource demand; and/or to increase network availability). As also disclosed herein, techniques disclosed herein for protecting network capacity facilitate implementation of services on a network to facilitate differential control of certain services to protect network capacity can also facilitate QoS implementations by maintaining needed levels of network capacity/availability to facilitate delivery of certain QoS levels/classes. For example, techniques disclosed herein for protecting network capacity can aggregate across multiple services and/or devices to facilitate differential control of certain services to protect network capacity. As another example, techniques disclosed herein for protecting network capacity can be used to provide for dynamic QoS classifications (e.g., dynamically assigning/classifying and reassigning/reclassifying (based on various criteria, events, and/or measures) network service usage activities to various QoS levels/classes, such as described herein) to facilitate differential control of certain services to protect network capacity.

Accordingly, Device Assisted Services (DAS) for protecting network capacity is provided. In some embodiments, DAS for protecting network capacity provides for protection of network capacity (e.g., network congestion and/or network access/resource demand and/or network availability on an edge element of the network, such as on the Radio Access Network (RAN) of a wireless network, and/or from a device to a base station/base station controller), such as by controlling network service activity usage activities of a device in wireless communication with the network to reduce demands on the network. For example, controlling network service usage activities can include classifying and/or controlling network access requests (e.g., IP address requests), network access reservation requests (e.g., a QoS reservation/sequence), network capacity/resources usage (e.g., bandwidth usage), and/or any other network service usage activities. In some embodiments, applications, OS functions, and/or other network service usage activities that request IP addresses from network address server resources are classified and/or controlled so that the IP address requests are withheld, delayed, time windowed, reduced in frequency, aggregated or otherwise controlled. In some embodiments, such "IP address request control policies" for one or more applications, OS functions, and/or other network service usage activities are set, updated, and/or modified before communicating it over a network connection to a network element (e.g., a service controller or another network element/function). In some embodiments, network service usage activities are generated/requested by applications, operating system (OS) functions, and/or other software/functions executed on a device in communication with the network. In some embodiments, it is desirable to apply a service usage control policy for the network service usage activities to protect network capacity (e.g., reduce network capacity demand). For example, some applications and/or OS functions have limited capabilities to defer certain traffic types based on fixed settings in the application, and such applications and/or OS functions typically cannot optimize network service usage activities based on a current network busy state (e.g., based on changing levels of network capacity and/or network performance available to the device). In some embodiments, the network busy state (e.g., or conversely the network availability state) is a characterization of the congestion (e.g., or conversely available capacity) of the network for one or more device connections. For example, the network busy state can provide a measure of how busy or congested the network or a network segment (e.g., network edge element) is for one or more device connections. As another example, network availability state can provide a measure of what network connection resources are available to one or more device connections. Thus, network busy state and network availability state can be viewed as converse ways of providing similar information, and as described herein with respect to various embodiments, these terms can be used interchangeably.

In some embodiments, techniques are provided for assigning a priority to a network service usage activity and controlling traffic associated with the network services usage activity based on the assigned priority. In some embodiments, techniques are provided for a implementing a differentiated and dynamic background services classification, for example, as a function of network availability state and/or network busy state.

In some embodiments, a service usage control policy is used for assisting in network access control of network service usage activities (e.g., deferring some or all of the network capacity demand from these source activities). In some embodiments, some or all of the network capacity demand is satisfied at a point where the network resources or capacity are more available or less busy. In some embodiments, techniques are provided for classifying network service activities associated with one or more applications or OS functions to a background service class and differentially controlling the background service class traffic. In some embodiments, techniques are provided for classifying one or more network service activities associated with an application or OS function to a background service class, while other network service activities associated with that application or OS function are classified to other service classes (e.g., or to different background service class priority levels).

In some embodiments, techniques are provided for determining a network busy state (e.g., for a network edge element connection to a device, such as for a RAN for the device's current wireless network access and/or to the current base station/base station controller in wireless communication with the device). In some embodiments, techniques are provided for implementing a service usage control policy to differentially control network services traffic based on a network busy state for an activity, a group of activities, or for a service class.

In some embodiments, DAS for protecting network capacity includes monitoring a network service usage activity of the communications device in network communication; classifying the network service usage activity for differential network access control for protecting network capacity; and associating the network service usage activity with a network service usage control policy based on a classification of the network service usage activity to facilitate differential network access control for protecting network capacity.

In some embodiments, a network service usage activity is any activity by the device that includes wireless network communication. In some embodiments, an application, an operating system (OS), and/or other device function generates a network service usage activity. In some embodiments, an application, an operating system (OS), and/or other device function generates one or more network service usage activities. Examples of a network service usage activity include the following: a voice connection (e.g., coded voice connection or voice over IP (VOIP) connection), a device application or widget connection, a device OS function connection, an email text connection, an email download connection, a file download connection, a streaming media connection, a location service connection, a map services connection, a software update (e.g., application, operating system, and/or antimalware software update) or firmware update connection, a device backup connection, an RSS feed connection, a website connection, a connection to a server, a web browser connection, an Internet connection for a device based service activity, establishing a sync service account, a user data synchronization service, a device data synchronization service, a network connection flow or stream, a socket connection, a TCP connection, a destination/port assigned connection, an IP connection, a UDP connection, an HTTP or HTTPS connection, a TLS connection, an SSL connection, a VPN connection, a general network services connection (e.g., establishing a PPP session, authenticating to the network, obtaining an IP address, DNS service), and various other types of connections via wireless network communication as will be apparent to one of ordinary skill in the art.

In some embodiments, a network service usage activity is classified, associated with, and/or assigned to a background class (e.g., a background service or QoS class) to facilitate differential network service usage control to protect network capacity. In some embodiments, differential network service usage control includes one or more of the following: monitoring network service usage activity; accounting for network service usage activity; reporting network service usage activity; generating a user notification for a network service usage activity; requesting a user preference for control of network service usage activity; accepting a user preference for network service usage activity; implementation of a network service usage activity policy (e.g., block/allow; traffic control techniques, such as throttle, delay, priority queue, time window, suspend, quarantine, kill, remove, and other well known traffic control techniques); implementing UI intercept procedures; generating a network busy state notification; generating a background class notification; generating a user notification for differential network service usage control of a network service usage activity; and various other techniques as described herein.

In some embodiments, a network availability state includes a state or measure of availability/capacity of a segment of a network (e.g., a last edge element of a wireless network). In some embodiments, a network busy state includes a state or measure of the network usage level or network congestion of a segment of a network (e.g., a last edge element of a wireless network). In some embodiments, network availability state and network busy state are inverse measures. As used herein with respect to certain embodiments, network availability state and network busy state can be used interchangeably based on, for example, a design choice (e.g., designing to assign background policies based on a network busy state or a network availability state yields similar results, but they are different ways to characterize the network performance and/or capacity and/or congestion). In some embodiments, network availability state and network busy state are dynamic measures as such states change based on network usage activities (e.g., based on a time of day, availability/capacity level, congestion level, and/or performance level). In some embodiments, differential network service usage control of a network service usage activity is based on a network busy state or network availability state.

In some embodiments, certain network service usage activities are classified as background services. In some embodiments, lower priority and/or less critical (and/or based on various other criteria/measures) network service usage activities are classified as background services based on a network busy state and differentially controlled based on a network busy state to protect network capacity. In some embodiments, differential network service usage control policies are based on a time of day, a network busy state, background services and/or QoS class changes based on a time of day and/or a network busy state, a random back-off for access for certain network service usage activities, a deterministic schedule for certain network service usage activities, a time windowing in which network service usage control policies for one or more service activities or background/QoS classes changes based on time of day, network busy state, a service plan, and various other criteria, measures, and/or techniques as described herein.

In some embodiments, a network capacity controlled service or network capacity controlled services class includes one or more network services (e.g., background download services and/or various other types or categories of services as described herein) selected for differential network service usage control for protecting network capacity. In some embodiments, a network capacity controlled services classification includes one or more network services associated with a network capacity controlled service/class priority setting for differential network service usage control for protecting network capacity. In some embodiments, a network capacity controlled service or network capacity controlled services class includes one or more network services associated with a QoS class for differential network service usage control for protecting network capacity. In some embodiments, a network capacity controlled service or network capacity controlled services class includes one or more network services associated with a dynamic QoS class for differential network service usage control for protecting network capacity.

For example, differentially controlling network service usage activities based on network capacity controlled services or dynamic QoS or QoS classifications can protect network capacity by, for example, improving network performance, increasing network availability, reducing network resources demand, and/or reducing network capacity demand (e.g., based on an individual device, aggregate devices connected to an edge element, and/or aggregate devices connected to many edge elements). In some embodiments, differentially controlling network service usage activities based on network capacity controlled services or dynamic QoS or QoS classifications can protect network capacity while maintaining proper device operation. In some embodiments, differentially controlling network service usage activities based on network capacity controlled services or dynamic QoS or QoS classifications can protect network capacity while maintaining an acceptable user experience (e.g., proper and/or expected device operation, proper and/or software/application/OS/function operation, avoiding (whenever possible) significant adverse impact on device functions, and/or user notifications to keep the user informed of various differential control implemented on the device).

In some embodiments, dynamic QoS classifications include QoS classifications that can be dynamically modified (e.g., reclassified, reprioritized, upgraded, and/or downgraded) based on various criteria, measures, settings, and/or user input as described herein (e.g., based on a time of day and/or day of week, based on a network busy state, based on a user preference, and/or based on a service plan). In some embodiments, the various techniques described herein related to DAS for providing network capacity and/or QoS for DAS are applied to dynamic QoS related techniques.

As wireless networks, such as mobile networks, evolve towards higher bandwidth services, which can include or require, for example, various levels of Quality of Service (QoS) (e.g., conversational, interactive data, streaming data, and/or various (end-to-end) real-time services that may benefit from QoS), demands will increase for converged network services to facilitate such services for end-to-end services between networks (e.g., to allow for control and/or support for such services, for example, QoS support, across network boundaries, such as between wireless networks (such as various service provider networks) and IP networks (such as the Internet), and/or other networks). While various efforts have attempted to address such QoS needs, such as policy management frameworks for facilitating QoS end-to end solutions, there exists a need to facilitate various QoS requirements using Device Assisted Services (DAS).

Accordingly, Quality of Service (QoS) for Device Assisted Services (DAS) is provided. In some embodiments, QoS for DAS is provided.

To establish a QoS channel, differentiated services are typically available, in which one class/level of service has a higher priority than another to provide for differentiated services on a network, such as a wireless network. For example, in a wireless network, various network elements/functions can be provisioned and controlled to establish a single end or end to end QoS channel. In some embodiments, a centralized QoS policy coordination and decision function using DAS techniques to assist in coordinating the QoS channel setup and control among the various elements of a wireless network is provided.

In some embodiments, QoS channel refers to the logical communication channel connected to a device that provides a desired level of QoS service level. For example, the QoS channel can be created with one or more QoS links, in which each link represents a QoS enabled connection that spans a portion of the total end to end network communication path from a near end device to a far end device. For example, the far end device can be on the same network or on a different network, potentially with different access technology and/or a different access network carrier. In some embodiments, the QoS channel includes one or more QoS links in which each link in the channel is QoS enabled, or one or more of the links in the channel is QoS enabled and others are not. As an example, a QoS channel can include the following links: a first device traffic path link, a first device to access network equipment element link (e.g., 2G/3G/4G wireless base station, WiFi access point, cable network head end, DSLAM, fiber aggregation node, satellite aggregation node, or other network access point/node), a first carrier core network, a long haul IPX network, a second carrier core network, a second device to access network equipment element link, and a second device traffic path link as similarly described herein with respect to various embodiments.

In some embodiments, each of the links described above has the ability to provide QoS services for that segment of an overall QoS channel. In some embodiments, the device traffic path link and/or the device to access network equipment element link are QoS enabled, but the carrier core network and/or IPX network links are not QoS enabled. In some embodiments, the core network and/or IPX network have sufficient over-provisioning of bandwidth that QoS is not limited by these network elements and, for example, can be limited by the device traffic link and/or the device to access network equipment element link do not have sufficient excess bandwidth making it desirable to QoS enable these QoS channel links. A common example is a 2G/3G/4G wireless network in which a device traffic path link and the device to access network element link (e.g., Radio Access Bearer (RAB)) are QoS enabled while the carrier core network and IPX network links are not (e.g., are provided at a best effort service level or other service levels).

In some embodiments, a QoS session refers to the QoS enabled traffic for a given device that flows over a QoS channel or QoS link. This QoS traffic supports a QoS service activity. In some embodiments, a QoS service activity includes a device service usage that is requested, configured, or preferably serviced with a given level of QoS. In some embodiments, a device QoS activity is a combination of one or more of the following: application, destination, source, socket (e.g., IP address, protocol, and/or port), socket address (e.g., port number), URL or other similar service identifier, service provider, network type, traffic type, content type, network protocol, session type, QoS identifier, time of day, network capacity (e.g., network busy state), user service plan authorization or standing, roaming/home network status, and/or other criteria/measures as similarly described herein. For example, QoS service activities that are supported by QoS sessions can include VOIP traffic, streaming video traffic, differentiated access bandwidth during busy network periods, real-time interactive traffic, such as network connected multimedia meetings (e.g., shared presentations, picture, video, voice, and/or other such applications/services), best effort interactive, such as Internet browsing, time sensitive services, such as email message body delivery, near real-time interactive services, such as SMS or push to talk, background download services, such as email downloads and other file transfers (e.g., FTP), and/or truly background download services, such as software updates (e.g., OS or application software updates and/or antimalware updates including content/signature updates).

In some embodiments, various QoS levels or classes are supported. For example a conversation class can provide for real-time traffic, which is typically very delay sensitive but can tolerate bit errors and packet losses. The conversational class is typically used for Voice Over IP (VOIP) and video telephony, in which users of such services benefit from the short delay features of the conversational class. A streaming class is similar to the conversational class except that the streaming class typically can tolerate more delay than the conversational class. The streaming class is generally used for when one end of the connection is a user (e.g., human user) and the other end is a machine/computer (e.g., for streaming content applications, such as streaming of video, such as movies or other video content). An interactive class is generally intended for traffic that allows delay variation while requiring reasonably low response time (e.g., web browsing or other applications in which the channel can be unused for long periods of time but when a user makes a request for a new page/data, the response time should be reasonably low). A background class is generally used for lowest priority service usages (e.g., typically used for e-mail with and without downloads/attachments, application software updates, OS software updates, and/or other similar applications/functions). In some embodiments, various QoS classes or services are applicable to the conversational class. In some embodiments, various QoS classes or services are also applicable to the streaming class. In some embodiments, various QoS classes or services are also applicable to the interactive class but typically not applicable to the background class. As will now be apparent to one of ordinary skill in the art, various other classes can be provided with lower or higher granularity based on service usage/channel requirements and/or network architectures.

In some embodiments, a QoS link or a QoS channel supports one QoS session. In some embodiments, a QoS link or a QoS channel supports multiple QoS sessions. In some embodiments, QoS link provisioning is provided to setup the QoS traffic level for a given QoS session or group of QoS sessions.

In some embodiments, a QoS channel is a single ended QoS channel or an end to end QoS channel. For example, if a QoS channel is end to end, then the QoS channel provisioning is accomplished in a coordinated manner for each QoS enabled link in the QoS channel. If a QoS channel is single ended, then the network elements and/or device participate in provisioning as much of one end of the QoS channel as possible, leaving provisioning of the QoS for the other end of the channel as the responsibility of the device and/or network elements that handle the traffic at the other end of the QoS channel. In some embodiments, a single ended QoS channel includes another single ended QoS channel at the other end. In some embodiments, only one end has single ended QoS channel enablement while the other end of the channel is a best effort service level, which, for example, can be used where one end of the QoS channel has tighter constraints on traffic capacity or quality than the other end (e.g., a VOIP call with one end that is QoS enabled on a 3G wireless network that has relatively tight bandwidth compared to a lightly loaded cable modem network device on the other end which may not need to be QoS enabled in order to achieve adequate voice quality).

In some embodiments, a QoS request (e.g., a QoS channel request or QoS service request) is a request for a QoS provisioning event to enable a QoS channel for one or more QoS service activities. In some embodiments, QoS availability assessment includes determining whether one or more of the links in a possible QoS channel are available (e.g., based on network capacity and transmission quality) to provision the necessary level of QoS for a requested QoS channel. In some embodiments, a QoS request is initiated by a device, a user, an application, and/or a network element/function as similarly described herein.

In some embodiments, a service plan refers to the collection of access service capabilities, QoS capabilities, and/or network capacity controlled services that are associated with a communications device. In some embodiments, the access service capabilities, QoS capabilities, and/or network capacity controlled services are determined by the collection of access service control policies for the device. In some embodiments, these service control policies are implemented in the network equipment. In some embodiments, these access service control policies are implemented both in the device and in the network equipment. In some embodiments, these access service control policies are implemented in the device. In some embodiments, there are different levels of service control capabilities (e.g., policies) based on different levels of service plan payments or device standing or user standing. In some embodiments, there are different levels of service control policies based on network type, time of day, network busy status, and/or other criteria/measures as similarly described herein with respect to various embodiments. In some embodiments, the access control and QoS control policies are based on the type of service activity being sought. In some embodiments, the QoS level and access level available for a given service activity for a given device or user is determined by the policies associated with the service plan. In some embodiments, a QoS authorization assessment is performed to determine whether a device or user has sufficient service plan standing to allow the requested level of QoS.

In some embodiments, before a QoS channel or link is provisioned (or before a QoS request is responded to or filled), a QoS availability assessment is performed to determine whether sufficient communication channel resources are available to provision the necessary level of QoS for the QoS channel or link. In some embodiments, this QoS availability assessment is determined by assessing the available QoS capacity for one or more necessary QoS links in the channel. For example, the available QoS link capacity can be assessed for one or more of a device traffic path, a device to access network equipment element link, a core network link, and/or an IPX network link. If the QoS assessment shows that the necessary channel capacity and quality are available for the desired QoS level for one or more desired QoS service activities, then a QoS channel request or QoS service request can be granted. In some embodiments, a QoS link or QoS channel reservation process is provided to reserve QoS capacity and quality in advance of link or channel provisioning to ensure that the available QoS resources are not assigned between the time of QoS availability assessment and QoS channel provisioning.

In some embodiments, the QoS availability assessment is performed after QoS authorization assessment. This prevents the unnecessary exercising of network elements when the device or user does not have sufficient service plan standing to receive the desired level of QoS even if it is available. This can be an important screening function performed on the device in the service processor, or by a centralized network function such as the service controller (e.g., or interchangeably, the home agent; Home Location Register (HLR); Authentication, Authorization, and Accounting (AAA) server/gateway/function; base station; one of the gateways, policy and charging rules function (PCRF), or other network element/function). In some embodiments, QoS availability is assessed without conducting a QoS authorization assessment or before receiving the response to a QoS authorization assessment.

In some embodiments, a QoS channel is provisioned to create the QoS channel to support a QoS session (e.g., a QoS service activity). In some embodiments, QoS channel provision includes assigning, routing, and/or otherwise causing the QoS session traffic to flow over one or more QoS links in the assigned QoS channel.

In some embodiments, device assisted service traffic control and QoS apply readily and directly to the problems of managing a QoS device link for QoS channel provisioning. Accordingly, in some embodiments, a service processor is provided to assist in provisioning the device portion of the QoS channel. In some embodiments, the service processor provisions the device link portion of the QoS channel by placing a higher priority on higher QoS level traffic. In some embodiments, this QoS priority is implemented in a number of ways, including routing the higher priority QoS traffic into first priority in the downstream and/or upstream traffic queues. Upstream traffic queuing is performed directly in some embodiments by transmitting guaranteed bit rate traffic first at higher available throttling rates, differentiated QoS traffic second with a controlled throttling rate, best effort traffic third with possibly lower controlled throttled rates, and/or background traffic fourth when/if bandwidth not needed by the higher levels of QoS traffic and at lower controlled throttling rates. For example, downstream traffic can be handled by queuing traffic and delaying or preventing TCP acknowledgements to be returned for the lower levels of QoS priority, while immediately passing the traffic and TCP acknowledgements for higher levels of QoS priority. The device link portion of the QoS channel is thus provisioned by assigning policies for the queuing priority, delay, throttle rate, and TCP acknowledgement return rate for device traffic in accordance with the bandwidth that is available at any point in time for the device. In some embodiments, various device service processor traffic control capabilities regulate or partially regulate QoS in accordance with a set of network policy instructions, including, in some embodiments, a service plan policy set.

In some embodiments the device service processor establishes multiple QoS channels through the device traffic path with each QoS channel having traffic control policies as described herein, with each QoS channel policy set creating a different class of QoS. In some embodiments, employing this multiple QoS channel approach, QoS for a given service activity is provided by routing the traffic for that QoS activity to the appropriate QoS channel with the appropriate QoS policy settings. The routing to the appropriate QoS channel can be provided using various techniques. For example, the routing can be provided by applying a common service traffic control policy set to traffic associated with all QoS service activities that require or request the QoS provided by the common service traffic control policy set. The application of the service traffic control policy set can be accomplished in a number of ways utilizing the embodiments described for the policy implementation agent and the policy control agent described herein. In such embodiments, the problem of assigning a QoS channel to a number of QoS service activities is reduced to applying a pre-determined set of service traffic control policies to each of the QoS service activities, with each pre-determined set of service traffic control policies representing a different QoS class. The device can then manage the overall QoS for all traffic based on the available traffic capacity and quality, the total aggregate traffic demand for each QoS traffic class and the policy rules that determine how each traffic class is provided with differential bit rate and traffic quality as compared to the other traffic classes for a given level of available traffic capacity and quality.

Based on the aggregate demand for each traffic QoS class, and the traffic capacity and quality level available to the device, the service processor can adjust the total available bit rate or percentage of available traffic capacity for each QoS class. For example, in some embodiments, the aggregate demand for the real-time interactive traffic control class (e.g., services, such as VOIP, emergency communication services or high performance real-time competitive gaming) can be determined, and the QoS routing function on the device (e.g., a QoS router agent/function) can first allocate enough constant bit rate traffic capacity from the available traffic capacity to satisfy these services, with each QoS service activity that requires this QoS class being assigned to this QoS channel. As more QoS service activities require this traffic class, the capacity allocated to the QoS channel out of the available device capacity is increased, and when fewer QoS service activities require this traffic class the capacity for this QoS channel is released. In the event that the device does not have any more available capacity with a guaranteed bit rate QoS level, then additional QoS service activities that desire, require or request this QoS level will not be provided this QoS level, and instead will either be provided with a lower QoS level or will not be allowed to connect to the access network. In some embodiments, there can be a hierarchy among the possible QoS service activities so that if there is no more capacity available at a given service QoS level, then the available capacity for that QoS class is provided to the service activities requiring that QoS from highest priority to lowest, until the available QoS class capacity is consumed, and then one or more QoS service activities that are too low on the priority list to obtain service with that QoS class are either bumped to a lower QoS class or are denied access. In some embodiments, once the required capacity to satisfy the real-time constant rate traffic needs is satisfied, the remaining capacity available to the device is then divided among the other QoS channel classes in accordance with a priority policy, with the priority policy being based on the relative priority of each service class, the relative priority of each QoS service activity, or a combination of the relative priority of each QoS service class and each QoS service activity. For example, these relative priority policies can vary from device to device based on service plan selection, device type, user standing, user group, device location, device network connection, type of network, time of day, network busy state, and/or other criteria/measures.

In some embodiments, a QoS link is established between the device and an access network equipment element. For example, such equipment element embodiments can include a 2G/3G/4G wireless base station, a wireless access point, a cable network head end, a DSL network DSLAM, a fiber network device traffic aggregator, a satellite network device traffic aggregator, a frame relay aggregation node, an ATM aggregation node, and/or other network equipment. In some embodiments, a logical communication channel is created between the device and the network equipment element, with the logical communication channel supporting a given level of QoS or QoS class traffic policy set. For example, the logical channel can include a RAB formed between a 2G/3G/4G base station and a wireless end point device. The RAB can be formed by controlling the media access control (MAC) parameters of the base station radio channel so that a given level of QoS class policies can be implemented. For example, the RAB can support constant bit rate, low latency communication traffic for guaranteed bit rate real-time traffic, or a differentiated high priority access channel for streaming traffic, or a best effort random access channel for best effort traffic, or an available unused capacity traffic for background traffic. The QoS channel link created in this manner can be dedicated to a single device, or shared with a subset of devices, or available to all devices. The QoS channel link created in this manner can be used by the device to support a single QoS activity as described herein, or a group of QoS activities as described herein. It will now be apparent to one of ordinary skill in the art that similar settings for cable head end and cable modem MAC can yield similar QoS classes for QoS links for the cable modem case and that similar techniques can be applied for a wireless access point or a satellite system MAC to achieve similar QoS classes for QoS links. It will also now be apparent to one of ordinary skill in the art that by creating multiple logical channels in the device link, and/or adjusting the available access network capacity and quality for each logical device communication channel in the DSLAM or fiber aggregator, similar QoS class QoS links can be established for the DSL and fiber distribution network cases.

In some embodiments the device service processor serves to route QoS service activities to the appropriate logical communication channel established for the desired QoS class supported by a QoS link between the device and the access network equipment element. In some embodiments, the device service processor elements (e.g., the policy implementation agent and/or the policy control agent) can be used in some embodiments to assign the same QoS traffic control policies to one or more QoS service activities that require the same QoS level. In a similar manner, in some embodiments, the device service processor elements can be used to assign or route service activity traffic for a given QoS class to the correct logical communication channel between the device and the access network element (e.g., a 2G/3G/4G base station) that supports the traffic control policies for the desired QoS class. For example, a QoS service link that supports guaranteed bit rate and latency can be established with one or more RABs from a base station to the device, and a second QoS service link can be established that supports differentiated preferred access for streaming content using one or more differentiated access RABs, and a third best effort RAB can be used to support best effort traffic. Each of the required RABs is first requested and then provisioned as described herein based on the aggregate required capacity and quality for one or more QoS service activities that require or desire the specific QoS service class associated with the RAB logical channel policy parameters. Once the set of logical QoS channels is thus established, the service processor (e.g., QoS router agent/function) routes the traffic associated with each QoS service activity to the appropriate RAB. In some embodiments, the service processor can detect increases or decreases in aggregate QoS class demand for each QoS class as QoS activities are initiated or terminated for that QoS class, and the service processor can communicate the required increases or decreases in the RAB assignments required to support that logical QoS channel.

In some embodiments, the access QoS link is established by direct communication from the device in which the device requests the QoS channel or link from the access network equipment element, or the device requests the QoS channel or link from an intermediate networking device, such as a service controller (e.g., or a readily substituted device with similar features, such as a home agent, an HLR, a mobile switching center, a base station, an access gateway, a AAA system, PCRF, or a billing system). In some embodiments, the device service processor bases the QoS channel or link request on an association the device performs to match a QoS service activity with a desired or required QoS class or QoS traffic control policy set. For example, this association of QoS class or QoS traffic control policy set with QoS service activity can be determined by a predefined policy mapping that is stored on the device and used by the service processor. In some embodiments, this policy mapping store is populated and/or updated by a service controller (e.g., or similar function as described herein). In some embodiments, the mapping is determined by a service controller (e.g., or similar function as described herein) based on a report from the device of the QoS service activity that needs the QoS channel or link.

In some embodiments, the required or desired QoS level for one or more QoS service activities is determined by a set of QoS service traffic control policies that are pre-assigned to various QoS service activities. For example, a given application can be pre-assigned a QoS class. As another example, a web service destination such as a VOIP service site can be assigned a QoS class. As another example, a given application can have one QoS assignment level for general Internet traffic but have a QoS assignment for real-time gaming traffic. As another example, a real-time broadcasting website can have a best effort QoS level assigned to programming information and general browsing and have a differentiated streaming QoS level for broadcast traffic content. In some embodiments, detection of QoS need or QoS assignment request for a given activity can be assigned by a device service processor according to a pre-defined QoS policy rules table (e.g., QoS activity table), or can be determined by a service controller based on information reported by the device, or can be requested by an application through a QoS application interface (e.g., QoS API), or can be determined by the nature of incoming traffic.

In embodiments, in which both end points in the QoS channel participate in establishing an end to end QoS channel, the required QoS level is determined and/or communicated by the originating end point. In some embodiments, the required QoS level is determined and/or communicated by the receiving end point. In some embodiments the QoS level is determined and/or communicated by the originating end point service controller (e.g., or the access network element (such as a base station), the HLR, home agent, mobile switching center, AAA, gateway, or other network element/function). In some embodiments, the QoS level is determined and/or communicated by the receiving end point service controller (e.g., or alternatively the access network element (such as a base station), the HLR, home agent, mobile switching center, AAA, gateway, or other network element/function). In some embodiments, the receiving end point service controller (e.g., or the access network element (such as a base station), the HLR, home agent, mobile switching center, AAA, gateway or other network function) and the originating end point service controller (e.g., or other similar function) communicate with one another to coordinate establishment of the QoS channel between the end points.

In some embodiments, the near end or originating end device service processor contacts the far end or terminating device service processor to initiate a QoS channel. In some embodiments, the initiation of the QoS channel from the near end or originating device is performed automatically by the far end device when its service processor detects that a given level of QoS is needed for the communication between the two devices. In some embodiments, the near end or originating device service processor detects the need for a QoS channel to the far end or terminating device and contacts a central network resources, such as the service controller (e.g., or other equipment element with similar function for this purpose), and the service controller provisions the far end of the QoS channel, either by communicating directly with the far end device or by communicating with the far end device's service controller (e.g., or other equipment element with similar function for this purpose). In some embodiments, in which the far end device service controller is contacted to assist in provisioning the QoS channel, there is a look up function to determine the address of the far end service controller based on a look up index formed from some aspect of the far end device credentials (e.g., phone number, SIM ID, MEID, IMSI, IP address, user name, and/or other device credentials).

In some embodiments, the mapping of QoS service activity to the desired level of QoS class or QoS traffic control policies is determined by providing a QoS API in the device service processor that applications use to request a QoS class or QoS channel connection. In some embodiments, an API is provided so that application developers can create application software that uses the standard interface commands to request and set up QoS channels. In some embodiments, the API does one or more of the following: accepts QoS requests from an application, formats the QoS channel request into a protocol appropriate for transmission to network equipment responsible for assessing QoS channel availability (e.g., including possibly the device traffic control system), coordinates with other network elements (e.g., including possibly the device traffic control system) to reserve a QoS channel, coordinates with other network elements (e.g., including possibly the device traffic control system) to provision a QoS channel, informs the application that the desired QoS channel can be created or not, and/or coordinates with other network elements (e.g., including possibly the device traffic control system) to connect the application with the desired QoS channel class. In some embodiments, the QoS API accepts the application QoS request and communicates and possibly coordinates with one or more QoS network equipment elements, such as a base station, cable head end or access point. In some embodiments, the QoS API accepts the QoS request from the application and communicates and possibly coordinates with an intermediate network element, such as a service processor (e.g., or other similar function as described herein). In some embodiments the QoS API assesses the QoS service plan standing for the device or user before sending QoS channel requests to other network elements, and only initiates the QoS request sequence if required service plan authorization is in place. In this manner, the potentially complex process of establishing a QoS channel with all the specific equipment communication protocols that typically need to be supported to assess QoS channel availability and provision the QoS channel are simplified into a limited set of API commands that are easy for an application development community to learn about and use for QoS differentiated services and applications.

In some embodiments, local traffic control on the device service processor is combined with traffic control in the link between the device and the access network equipment element. In this manner, both the device traffic control path QoS link and the device to access network element QoS link can be coordinated for best device QoS performance results given the available capacity and quality of the access network traffic for the device. In some embodiments, the policies for how the device manages local traffic control, establishes access network element logical channels (e.g., RABs) and routes traffic to and from the access network element logical channels is all determined by predefined policy rules loaded onto the device by the service controller (or other equivalent network element). In some embodiments, these policies are determined in the service controller itself.

In some embodiments, a QoS user interface (e.g., QoS UI) is presented to the device user. In some embodiments, the QoS UI notifies the user what level of QoS services the device is authorized to receive based on the service plan selection. In some embodiments, the QoS UI notifies the user what level of QoS services are available on the present network the device is connected to at the present time. In some embodiments, the QoS UI notifies the user when a level of QoS service that is higher than that authorized by the user service plan is required or desirable for a given service activity that the device has initiated. In some embodiments, the QoS UI provides the user with a set of one or more upgrade options to upgrade the service plan to include a higher level of QoS for one or more service activities. In some embodiments, the QoS UI provides the user with an opportunity to specify what level of QoS the user would like to employ for one or more service usage activities. In some embodiments, the QoS UI allows the user to specify a service plan setting that provides differentiated QoS during times when the network is busy. In some embodiments, the QoS UI allows the user to purchase one or more grades of service QoS with either a post-pay for a pre-defined service period and one or more pre-defined service usage limits by QoS class, a pre-pay for one or more pre-defined service usage limits by QoS class, or another payment system for differentiated QoS services. In some embodiments, the QoS UI provides the user with an opportunity to QoS enable or pay for QoS services for a connection that is initiated by an incoming connection to the device.

In some embodiments, QoS for DAS techniques include verifying that the device is properly implementing the QoS traffic control policies, for example, in accordance with a service plan. This ensures that errors, hacking, user device software settings manipulations, or other malware events do not result in inappropriate levels of QoS for a given device or group of devices. Accordingly, in some embodiments, the traffic control and QoS verification techniques described herein are employed to verify that the proper level of QoS is applied for a given service usage activity in accordance with a QoS priority policy. For example, verification of QoS channel request policy rules behavior can be implemented in a variety of ways including, as an example, monitoring device QoS channel requests and comparing the level of QoS requested with the level of QoS the device is authorized to receive in the service plan in effect for the device. Verification of proper QoS channel usage behavior by a device can be implemented in a variety of ways including, for example, monitoring network based reports of QoS service usage and comparing the network based reports against the service policy rules that should be in effect given the device service plan. Verification of proper device traffic control to implement a QoS service policy that is in effect can be accomplished in a variety of ways by verifying that the appropriate traffic control policy rules are being properly implemented as described herein. In some embodiments, DAS for protecting network capacity techniques include various verification techniques (e.g., verifying monitoring, traffic controlling, reporting, and/or other functions implemented or performed by the device), as described herein.

In some embodiments, the QoS router prioritizes traffic on the device. In some embodiments, the QoS router connects the QoS enabled session to the RAB that has the proper QoS level. In some embodiments, one session is routed to the RAB. In some embodiments, more than one session can be routed to an RAB. In some embodiments, multiple RABs providing multiple QoS levels are created to the device, and the QoS router routes each service activity to the RAB dictated by the QoS policy rules in effect on the device.

In some embodiments, the network collects service usage charges for different QoS classes. In some embodiments, there is differentiated service charging for the different classes of QoS service usage. As an example, since guaranteed bit rate traffic consumes network resources whether the traffic capacity is used or not, there can be a time element involved in the charging calculations. As a more detailed example, guaranteed bit rate services can be charged by the total bandwidth provisioned to the device at a given time multiplied by the amount of time that that bandwidth is made available. In some embodiments, differentiated access traffic that has higher QoS than best effort traffic but is not guaranteed bit rate can be charged at a higher rate than best effort traffic but lower than guaranteed bit rate. In some embodiments, such traffic can be charged based on the time the QoS channel is made available and the total amount of data transmitted over the channel, or can only be based on the total amount of data transmitted over the channel. Best effort traffic is charged in some embodiments based only on the total amount of data used, with the data charges being less than differentiated streaming access services. Background data services in some embodiments are charged at the lowest rate, possibly with only certain times of the day or periods of low network traffic demand being available for such services, and with the service being based on total data transmitted. In some embodiments, all QoS service levels can be charged based on a fixed price for a fixed charging period, possibly with a service usage cap with additional charges if the service cap is exceeded. In such fixed price scenario embodiments, the price charged is again higher for higher levels of QoS. In some embodiments, the network collects service usage charges for different network capacity controlled service classes. In some embodiments, there is differentiated service charging for the different classes of network capacity controlled service usage, as described herein.

In some embodiments, the network equipment (e.g., access network element, gateways, AAA, service usage storage systems, home agent, HLR, mobile data center, and/or billing systems) record and report service usage for one or more of the QoS service classes used by the device. In some embodiments, the device service processor records and reports service usage for one or more of the QoS service classes used by the device and reports the QoS service class usage to the service controller (e.g., or another substitute network element). In some embodiments, in which the device is recording reporting usage for one or more QoS service classes, it is important to verify the device service usage reports to ensure that the device usage reports are not distorted, tampered with, and/or otherwise in error. In some embodiments, verifying service usage reports against service usage that should be occurring given the service control policies in place on the device, service processor agent functional operation verification, test service usage events, agent query response sequences, device service processor software protection techniques, device service processor software environment checks, and several other techniques are provides as described herein. For example, using one or more of these verification techniques can provide a verifiable device assisted QoS service usage charging system. As another example, using one or more of these verification techniques can provide a verifiable network capacity controlled service usage charging system. In some embodiments, the network equipment (e.g., access network element, gateways, AAA, service usage storage systems, home agent, HLR, mobile data center, and/or billing systems) record and report service usage for one or more of the network capacity controlled service classes used by the device, as described herein.

In some embodiments, device assisted traffic control is provided for managing network congestion as follows. For example, when a given base station or group of base stations experience traffic demand that is high relative to the available capacity and/or service quality that can be provided, and such a condition is determined (e.g., detected or reported) based on a network busy state assessment as described below and further herein, then a service controller (e.g., or another network function) can issue, send, and/or implement traffic control throttling policies to/for the devices in accordance with a measure of the excess traffic demand the one or more base stations is experiencing. For example, the device service processors connected to an overly busy base station can be instructed to reduce the traffic control priority for one or more classes of QoS traffic, reducing the queuing priority, throttling rate, delay and/or access allowance for some or all of one or more classes of traffic. As another example, the device service processors connected to an overly busy base station can be instructed to reduce the traffic control priority for one or more classes of network capacity controlled services traffic, reducing the queuing priority, throttling rate, delay and/or access allowance for some or all of one or more classes of such traffic. As another example, one or more classes of network capacity controlled services traffic, such as background download processes, which can include, for example, software updates can be turned off completely or throttled back significantly. As another example, best effort traffic such as Internet browsing can be throttled or reduced for a group of devices connected to base stations experiencing excess traffic demand. As another example, a policy can be implemented on the devices connected to busy base stations in which the device is allowed to browse or conduct other best effort service activities at a relatively high throttling rate for a period of time, but if the device uses more than a certain amount of service (e.g., total data downloaded and/or uploaded) in a certain period of time then the device may be traffic controlled according to an adaptive throttling policy as described herein. In some embodiments, higher QoS level traffic cannot be throttled in such circumstances, such as VOIP traffic where real-time guaranteed bit rate is important to meet user service needs or expectations, while lower priority traffic such as interactive browsing and/or background download are throttled and/or blocked. In some embodiments, the QoS availability assessment processes described herein are adjusted so that higher QoS channels are not provided and provisioned in times or locations in which a given base station or group of base stations experience excess demand or demand above a given threshold.

In some embodiments, users or devices that have service plans with higher QoS levels, or service plans with higher priority during busy network periods have different traffic control policies (e.g., for QoS services and/or network capacity controlled services) applied to them that result in a higher level of traffic performance and/or a higher level of QoS service availability. For example, emergency service workers can be given higher traffic control access policies that result in differentiated services during peak busy times on the network or a portion of the network. In some embodiments, users can obtain a premium service plan for differentiated access during peak busy time periods or may use higher levels of QoS service settings and/or service plans to achieve differentiated service during peak busy periods. As another example, services that demand high levels of QoS classes, such as real-time voice services, instant messaging, push to talk, differentiated video streaming, and/or interactive gaming, are not traffic controlled to the same extent that other lower priority services or lower class service plans are traffic controlled during peak busy times. For example, this type of service differentiation can also be applied based on device type, user group, user standing, user reward zone points, and/or other criteria/measures as similarly described herein.

In some embodiments, the decision to control (e.g., reduce, increase, and/or otherwise control in some manner) the access traffic control settings as described above is made by the device service processor based on the device's assessment of the network capacity, which can be determined using various techniques as described herein. In some embodiments, the decision to control the access traffic control settings as described above is made by a service controller (e.g., or other interchangeable network equipment element or elements as described herein) connected to the device that provides instructions to the device to adjust the access policy settings. For example, the service controller can obtain the network capacity information from access equipment elements, from device reports of traffic capacity and/or quality as described herein, or from reports on traffic capacity and/or quality obtained from dedicated devices used for the purpose of assessing network capacity. In some embodiments, the decision to control the access traffic control settings as described above is based on the time of day, the day of week, or both to accommodate cyclical patterns in network capacity and traffic demand.

In some embodiments, a service controller (e.g., or another network equipment element or elements, as described herein) assesses network busy state and then controls device traffic demand by reducing the offered capacity for one or more service classes (e.g., for QoS services and/or network capacity controlled services) supported by the access network equipment elements, such as a wireless base station. In such embodiments, the service controller (e.g., or similar function) gathers the network capacity information with one of the techniques described herein and instructs one or more of the access network equipment elements to reduce the offered capacity for one or more levels of QoS classes and/or network capacity controlled service classes, to one or more of the devices connected to the access network equipment elements. For example, the determination of which devices to throttle back can be made based on an equal throttling of all devices of a given service plan status, or based on the device traffic usage patterns in the recent past as described herein, or based on a combination of service plan status and recent traffic usage patterns.

In some embodiments, the device is enabled with ambient services that have differentiated QoS services and/or network capacity controlled services as part of the ambient service offering. For example, ambient QoS techniques can be provided using the pre-assigned QoS policies for a given service activity set within the ambient service, or using an ambient service application that requests QoS through the QoS API. Other embodiments for providing QoS differentiated service activities within ambient service offerings will now be apparent to one of ordinary skill in the art. As another example, ambient network capacity controlled service techniques can be provided using the pre-assigned network capacity controlled policies for a given service activity set within the ambient service, monitoring and dynamically assigned techniques, and/or using an ambient service application that uses API or emulated API techniques, and/or other techniques as described herein.

In some embodiments, a QoS service control policy is adapted as a function of the type of network the device is connected to. For example, the QoS traffic control policies and/or the QoS service charging policies can be different when the device is connected to a wireless network (e.g., a 3G/4G network where there is in general less available QoS enabled traffic capacity) than when the device is connected to a wired network (e.g., a cable or DSL network where there is in general a higher level of QoS capacity available). In such embodiments, the device service processor and the service controller can coordinate to adapt the QoS service control policies and/or the QoS service charging policies to be different depending on which network the device is connected to. Similarly, the device QoS service control policy and/or QoS service charging policy can also be adapted based on whether the device is connected to a home wireless network or a roaming wireless network. In some embodiments, a network capacity controlled service control policy and/or a network capacity controlled charging policy is adapted as a function of the type of network the device is connected to, as similarly described herein.

In some embodiments, various of the QoS related techniques and/or network capacity controlled services techniques described herein are performed on the device using DAS techniques and/or on the service controller in secure communication with a verified service processor executed on the device using DAS techniques. In some embodiments, various of the QoS related techniques and/or network capacity controlled services techniques described herein are performed by/in coordination/communication with one or more intermediate network elements/functions for assisting in various techniques (e.g., functions) for QoS techniques and/or network capacity controlled services techniques as described herein.

FIG. 1 illustrates a functional diagram of a network architecture for providing quality of service (QoS) for device assisted services (DAS) and/or for providing DAS for protecting network capacity in accordance with some embodiments. In some embodiments, QoS for DAS techniques described herein are implemented using the network architecture shown in FIG. 1. In some embodiments, DAS for protecting network capacity techniques described herein are implemented using the network architecture shown in FIG. 1.

As shown, FIG. 1 includes a 4G/3G/2G wireless network operated by, for example, a central provider. As shown, various wireless devices 100 are in communication with base stations 125 for wireless network communication with the wireless network (e.g., via a firewall 124), and other devices 100 are in communication with Wi-Fi Access Points (APs) or Mesh 702 for wireless communication to Wi-Fi Access CPE 704 in communication with central provider access network 109. In some embodiments, one or more of the devices 100 are in communication with other network element(s)/equipment that provides an access point, such as a cable network head end, a DSL network DSLAM, a fiber network aggregation node, and/or a satellite network aggregation node. In some embodiments, each of the wireless devices 100 includes a service processor 115 (as shown) (e.g., executed on a processor of the wireless device 100), and each service processor connects through a secure control plane link to a service controller 122 (e.g., using encrypted communications).

In some embodiments, service usage information includes network based service usage information (e.g., network based service usage measures or charging data records (CDRs), which can, for example, be generated by service usage measurement apparatus in the network equipment), which is obtained from one or more network elements (e.g., BTS/BSCs 125, RAN Gateways (not shown), Transport Gateways (not shown), Mobile Wireless Center/HLRs 132, AAA 121, Service Usage History/CDR Aggregation, Mediation, Feed 118, or other network equipment). In some embodiments, service usage information includes micro-CDRs. In some embodiments, micro-CDRs are used for CDR mediation or reconciliation that provides for service usage accounting on any device activity that is desired. In some embodiments, each device activity that is desired to be associated with a billing event is assigned a micro-CDR transaction code, and the service processor 115 is programmed to account for that activity associated with that transaction code. In some embodiments, the service processor 115 periodically reports (e.g., during each heartbeat or based on any other periodic, push, and/or pull communication technique(s)) micro-CDR usage measures to, for example, the service controller 122 or some other network element. In some embodiments, the service controller 122 reformats the heartbeat micro-CDR usage information into a valid CDR format (e.g., a CDR format that is used and can be processed by an SGSN or GGSN or other network elements/equipment used/authorized for generating or processing CDRs) and then transmits it to a network element/function for CDR mediation (e.g., CDR Storage, Aggregation, Mediation, Feed 118).

In some embodiments, CDR mediation is used to account for the micro-CDR service usage information by depositing it into an appropriate service usage account and deducting it from the user device bulk service usage account. For example, this technique provides for a flexible service usage billing solution that uses pre-existing solutions, infrastructures, and/or techniques for CDR mediation and billing. For example, the billing system (e.g., billing system 123 or billing interface 127) processes the mediated CDR feed from CDR mediation, applies the appropriate account billing codes to the aggregated micro-CDR information that was generated by the device, and then generates billing events in a manner that does not require changes to the existing billing systems (e.g., using new transaction codes to label the new device assisted billing capabilities). In some embodiments, network provisioning system 160 provisions various network elements/functions for authorization in the network, such as to authorize certain network elements/functions (e.g., CDR storage, aggregation, mediation, feed 118 or other network elements/functions) for providing micro-CDRs, reformatted micro-CDRs, and/or aggregated or reconciled CDRs.

As shown in FIG. 1, a CDR storage, aggregation, mediation, feed 118 is provided. In some embodiments, the CDR storage, aggregation, mediation, feed 118 receives, stores, aggregates and mediates micro-CDRs received from mobile devices 100. In some embodiments, the CDR storage, aggregation, mediation, feed 118 also provides a settlement platform using the mediated micro-CDRs, as described herein. In some embodiments, another network element provides the settlement platform using aggregated and/or mediated micro-CDRs (e.g., central billing interface 127 and/or another network element/function).

In some embodiments, various techniques for partitioning of device groups are used for partitioning the mobile devices 100 (e.g., allocating a subset of mobile devices 100 for a distributor, an OEM, a MVNO, and/or another partner or entity). As shown in FIG. 1, a MVNO core network 210 includes a MVNO CDR storage, aggregation, mediation, feed 118, a MVNO billing interface 122, and a MVNO billing system 123 (and other network elements as shown in FIG. 1). In some embodiments, the MVNO CDR storage, aggregation, mediation, feed 118 receives, stores, aggregates and mediates micro-CDRs received from mobile devices 100 (e.g., MVNO group partitioned devices).

Those of ordinary skill in the art will appreciate that various other network architectures can be used for providing device group partitions and a settlement platform, and FIG. 1 is illustrative of just one such example network architecture for which device group partitions and settlement platform techniques described herein can be provided.

In some embodiments, CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks shown in FIG. 1 (e.g., central provider access network 109 and/or central provider core network 110), which is in communication with the service controller 122 and a central billing interface 127. As shown in FIG. 1, service usage 118 provides a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 1. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures and embodiments described herein by one of ordinary skill in the art. Also, as shown in FIG. 1, the service controller 122 is in communication with the central billing interface 127 (e.g., sometimes referred to as the external billing management interface or billing communication interface), which is in communication with the central billing system 123. As shown in FIG. 1, an order management 180 and subscriber management 182 are also in communication with the central provider core network 110 for facilitating order and subscriber management of services for the devices 100 in accordance with some embodiments.

In some embodiments, a service processor download 170 is provided, which provides for periodical downloads/updates of service processors (e.g., service processor 115). In some embodiments, verification techniques include periodically updating, replacing, and/or updating an obfuscated version of the service processor, or performing any of these techniques in response to an indication of a potential compromise or tampering of any service processor functionality (e.g., QoS functionality and/or network capacity controlled services functionality) executed on or implemented on the device 100.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated/assisted service usage information (e.g., micro-CDRs) for one or more devices on the wireless network (e.g., devices 100); and provides the device generated service usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, as described herein, the CDR storage, aggregation, mediation, feed 118 collects/receives micro-CDRs for one or more devices on the wireless network (e.g., devices 100). In some embodiments, the CDR storage, aggregation, mediation, feed 118 (e.g., or other network elements and/or various combinations of network elements) includes a service usage data store (e.g., a billing aggregator) and a rules engine for aggregating the collected device generated service usage information. In some embodiments, the network device is a CDR feed aggregator, and the CDR storage, aggregation, mediation, feed 118 (and/or other network elements or combinations of network elements) also aggregates (network based) CDRs and/or micro-CDRs for the one or more devices on the wireless network; applies a set of rules to the aggregated CDRs and/or micro-CDRs using a rules engine (e.g., bill by account, transactional billing, revenue sharing model, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, a revenue sharing platform is provided using various techniques described herein. In some embodiments, QoS usage accounting/charging and/or network capacity controlled services usage accounting/charging is provided using various techniques described herein.

In some embodiments, the CDR storage, aggregation, mediation, feed 118 (and/or other network elements or combinations of network elements) communicates a new set of CDRs (e.g., aggregated and mediated CDRs and/or micro-CDRs that are then translated into standard CDRs for a given wireless network) for the one or more devices on the wireless network to a billing interface (e.g., central billing interface 127) or a billing system (e.g., central billing system 123). In some embodiments, the CDR storage, aggregation, mediation, feed 118 (and/or other network elements or combinations of network elements) communicates with a service controller (e.g., service controller 122) to collect the device generated service usage information (e.g., micro-CDRs) for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated service usage information to a billing interface or a billing system. In some embodiments, the CDR storage, aggregation, mediation, feed 118 (and/or other network elements or combinations of network elements) communicates with a transport gateway and/or a Radio Access Network (RAN) gateway to collect the network generated/based service usage information for the one or more devices on the wireless network. In some embodiments, the service controller 122 communicates the device assisted service usage information (e.g., micro-CDRs) to the CDR storage, aggregation, mediation, feed 118 (e.g., or other network elements and/or various combinations of network elements).

In some embodiments, the CDR storage, aggregation, mediation, feed 118 (e.g., or other network elements and/or various combinations of network elements) performs rules for performing a bill by account aggregation and mediation function. In some embodiments, the CDR storage, aggregation, mediation, feed 118 (and/or other network elements or combinations of network elements) performs rules for performing a service billing function, as described herein, and/or for performing a service/transactional revenue sharing function, as described herein. In some embodiments, the service controller 122 in communication with the CDR storage, aggregation, mediation, feed 118 (and/or other network elements or combinations of network elements) performs a rules engine for aggregating and mediating the device assisted service usage information (e.g., micro-CDRs). In some embodiments, a rules engine device in communication with the CDR storage, aggregation, mediation, feed 118 (e.g., or other network elements and/or various combinations of network elements) performs a rules engine for aggregating and mediating the device assisted service usage information (e.g., QOS service usage information and/or network capacity controlled services usage information).

In some embodiments, the rules engine is included in (e.g., integrated with/part of) the CDR storage, aggregation, mediation, feed 118. In some embodiments, the rules engine and associated functions, as described herein, is a separate function/device. In some embodiments, the service controller 122 performs some or all of these rules engine based functions, as described herein, and communicates with the central billing interface 127. In some embodiments, the service controller 122 performs some or all of these rules engine based functions, as described herein, and communicates with the central billing system 123.

In some embodiments, a settlement platform service is provided. For example, micro-CDRs can be aggregated and mediated to associate service usage for one or more services used by a communications device (e.g., a user of the communications device). A rules engine or another function can determine a revenue share allocation for the service usage for a particular service to determine the settlement for such service usage for the revenue sharing allocation/model and to distribute accounting and settlement information to one or more of carriers, distribution partners, MVNOs, wholesale partners, and/or other partners or entities. In some embodiments, the service is a transactional service.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device assisted service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device assisted service usage information (e.g., micro-CDRs) includes a transaction type field or transaction code (e.g., indicating a type of service for the associated service usage information). For example, the rules engine can apply a rule or a set of rules based on the identified service associated with the device generated service usage information to determine a bill-by-account billing offset (e.g., a new CDR can be generated to provide the determined bill-by-account billing offset). In some examples, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., a service usage data store and rules engine, such as CDR storage, aggregation, mediation, feed 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network (e.g., by network provision system 160) and behaves substantially similar to other CDR generators on the network).

In some embodiments, the service controller 122 is provisioned as a new type of networking function that is recognized as a valid, authorized, and secure source for CDRs by the other necessary elements in the network (e.g., CDR storage, aggregation, mediation, feed 118). In some embodiments, if the necessary network apparatus only recognize CDRs from certain types of networking equipment (e.g., a RAN gateway or transport gateway), then the service controller 122 provides authentication credentials to the other networking equipment that indicate that it is one of the approved types of equipment for providing CDRs. In some embodiments, the link between the service controller 122 and the necessary CDR aggregation and mediation equipment is secured, authenticated, encrypted, and/or signed.

In some embodiments, the CDR storage, aggregation, mediation, feed 118 discards the network based service usage information (e.g., network based CDRs) received from one or more network elements. In these embodiments, the service controller 122 provides the device assisted service usage information (e.g., device based CDRs or micro-CDRs) to the CDR storage, aggregation, mediation, feed 118 (e.g., the CDR storage, aggregation, mediation, feed 118 can just provide a store, aggregate, and communication function(s), as it is not required to mediate network based CDRs and device assisted CDRs), and the device based service usage information is provided to the central billing interface 127 or the central billing system 123.

In some embodiments, the device based CDRs (e.g., micro-CDRs) and/or new CDRs generated based on execution of a rules engine as described herein are provided only for devices that are managed and/or based on device group, service plan, or any other criteria, categorization, and/or grouping, such as based on ambient service or ambient service provider or transactional service or transactional service provider.

In some embodiments, QoS for DAS includes a service processor (e.g., any device assisted element/function) that facilitates coordination for and/or provisions wireless access/radio access bearers (e.g., RABs). In some embodiments, the service processor determines whether a request for QoS is authorized (e.g., according to QoS service level, user standing, available local network capacity (e.g., as reported by other device(s) and/or network)). In some embodiments, device QoS capacity demand reports provide and/or augment network capacity demand reports.

In some embodiments, QoS for DAS includes a service controller (e.g., any network device based service control element/function) that facilitates coordination for and/or provisions wireless access/radio access bearers (e.g., RABs) on a device (e.g., a communications device, such as a mobile wireless communications device and/or an intermediate networking device), on network, and/or on device plus network. In some embodiments, the service controller provides device QoS capacity demand reports to other network equipment/elements/functions, and then also provisions the RAB channel based on various criteria and determinations.

In some embodiments, QoS for DAS provides for device assisted monitoring, information, and/or functionality to facilitate QoS without and/or to assist network based monitoring, information, and/or functionality (e.g., Deep Packet Inspection (DPI) and/or provides such monitoring, information, and/or functionality that may not be available via network based monitoring, information, and/or functionality (e.g., encrypted activities on the device may not be accessible by DPI or other network based techniques). For example, QoS for DAS can assist in the QoS setup to facilitate the QoS setup and provide such information that may not otherwise be available using network based only techniques. For example, device assisted activity and/or service monitoring techniques can assist in classifying the QoS for the monitored activity and/or service using, for example, a QoS activity map (e.g., as described herein or other similar techniques). For example, using such device assisted techniques eliminates and/or minimizes DPI or other network based techniques that can give rise to privacy concerns/issues, network neutrality concerns/issues, and/or otherwise may not be able to provide similar or equivalent granular service/activity monitoring, as discussed above, and/or also offloads such processing from the network (e.g., network elements/devices/functionality) to the communications devices (e.g., at least for such communications devices that can perform such functions, based on their processing and/or memory capabilities, as would be apparent to one of ordinary skill in the art). In some embodiments, QoS for DAS includes the service provider for providing an initial authorization/clearance for a QoS request (e.g., using various techniques described herein), and the service controller determines if the QoS request should be authorized (e.g., based on various QoS authorization/clearance/approval criteria (e.g., QoS activity maps and/or QoS request rule) and/or network capacity, as described herein). In some embodiments, QoS for DAS includes the service provider for providing a QoS request including a QoS class to the service controller, and the service controller determines if the QoS request should be authorized, as described herein. In some embodiments, DAS for protecting network capacity provides for device assisted monitoring, information, and/or functionality to facilitate protecting network capacity without and/or to assist network based monitoring, information, and/or functionality (e.g., Deep Packet Inspection (DPI) and/or provides such monitoring, information, and/or functionality that may not be available via network based monitoring, information, and/or functionality (e.g., encrypted activities on the device may not be accessible by DPI or other network based techniques). In some embodiments, DAS for protecting network capacity provides for device assisted monitoring, information, and/or functionality to facilitate protecting network capacity without solely relying upon DPI and/or without any use or any significant use of DPI wireless network, which conserves network resources and network capacity by controlling device network access behavior at the device instead of deep in the core network at a DPI gateway (e.g., DPI based techniques consume over the air wireless network capacity even if chatty device behavior is blocked at a DPI gateway; in contrast, DAS for protecting network capacity techniques that do not use DPI based techniques for controlling device service usage can, for example, provide a device based usage notification and service selection UI that does not consume over the air wireless network capacity).

In some embodiments, QoS for DAS and/or DAS for protecting network capacity includes providing or facilitating reports for base station (BTS) for network capacity (e.g., sector, channel, busy state information or network capacity usage/availability, and/or network capacity expected demand) based on, for example, one or more of the following: monitored application usage on the communications device, monitored user activity on the communications device, location of the communications, other available networks, and/or other monitored or determined activity, service usage measure, and/or metric. In some embodiments, at or after execution of an application that is determined to require network service usage (e.g., may require increased wireless network bandwidth, such as based on a service usage activity map), QoS for DAS sends information to the network (e.g., a network controller or other network device element/function) that capacity demand is forthcoming for the communications device (e.g., potentially initiating a provisioning of a QoS radio access bearer (RAB) or other type of RAB).

In some embodiments, network capacity (e.g., busy state information) is collected from one or more communications devices in communication with a wireless network (e.g., network capacity/usage information measured from each respective communications device's perspective is determined and stored by the service processor on each respective communications device) and reported to the service controller, and the service controller (e.g., or another network element/function) uses this information to determine what resources are available for allocation to various levels of QoS (e.g., to respond to/facilitate various QoS requests) and/or to workload balance across multiple base stations and/or networks (e.g., wired networks, cellular, Wi-Fi, and/or other wireless networks).

In some embodiments, the service processor executed on the communications device sends a QoS request (e.g., a wireless network bearer channel reservation request or Radio Access Bearer (RAB) request) to the service controller. The service controller verifies the request using various verification techniques as described herein. In some embodiments, the service controller facilitates coordination of various device QoS requests with one or more base stations (BTSs) in communication with the communications device to provide for the requested QoS reservation to facilitate the new QoS session. In some embodiments, the service controller provides a QoS routing function by, for example, providing various QoS routing instructions to a device service processor (e.g., aggregating, prioritizing, queuing, authorizing, allocating reservations/RABs, denying, re-routing (such as to other BTSs and/or other networks) and/or otherwise managing QoS requests), in which the BTS may or may not be QoS aware. For example, QoS priority can be based on activity (e.g., service usage and/or application), service level, user standing, network capacity, time of day, and/or QoS priority can be purchased on a transaction basis, a session basis, a pre-pay basis or a plan basis. As another example, QoS priority can also vary by device type, user within a group, group, application type, content type, or any other criteria or measure and/or any combination thereof. In some embodiments, the service controller also facilitates coordination of various device QoS requests with other network elements/functions for QoS implementation and management to provide for an end to end QoS solution.

In some embodiments, QoS can be symmetric for two mobile devices or asymmetric. In some embodiments, QoS resource availability can be from communications devices, BTS(s), other network functions (e.g., service control, service controller and/or any other network elements/functions) or any combination thereof. In some embodiments, the service controller provides QoS demand information to another network element/function. In some embodiments, the service controller provides the central aggregator and policy decision point (PDP). In some embodiments, the service controller controls (e.g., at least in part) QoS related functions for communications devices, BTS(s), and/or a combination of both.

In some embodiments, charging (e.g., monitoring and/or determining associating charging or billing) for QoS service usage/transactions and/or network capacity controlled services usage/transactions is determined using various techniques described herein. For example, the service processor can assist in charging for QoS and/or network capacity controlled activities. In some embodiments, the service processor uses device assisted Charging Data Records (CDRs) or micro-CDRs to assist in charging for QoS and/or network capacity controlled activities (e.g., using QoS class related transaction codes and/or network capacity controlled related transaction codes), as described herein with respect to various embodiments. In some embodiments, charging for QoS and/or network capacity controlled services is performed in whole or in part by one or more network elements/functions (e.g., service controller, SGSN/GGSN/other gateways, and/or billing interfaces/servers).

In some embodiments, service usage information includes network based service usage information. In some embodiments, the network based service usage information includes network based CDRs. In some embodiments, service usage information includes device based service usage information. In some embodiments, device based service usage information includes device assisted CDRs, also referred to herein as micro-CDRs, as described herein. In some embodiments, micro-CDRs are used for CDR mediation or reconciliation that provides for service usage accounting on any device activity that is desired (e.g., providing granular service usage information, such as based on application layer service usage monitoring, transaction service usage monitoring, QoS activities/sessions/transactions, network capacity controlled activities/sessions/transactions, and/or other types of service usage information). In some embodiments, each device includes a service processor (e.g., a service processor executed on a processor of a communications device, such as a mobile device or an intermediate networking device that can communicate with a wireless network).

In some embodiments, each device activity that is desired to be associated with a billing event (e.g., for a QoS related billing event) is assigned a micro-CDR transaction code, and the service processor is programmed to account for that activity associated with that transaction code (e.g., various transaction codes can be associated with service usage associated with certain services, applications, and/or based on QoS classes or priorities, respectively, which can be used for providing granular service usage for these various Internet/network based services/sites/transactions and/or any other Internet/network based services/sites, which can include transactional based services). For example, using these techniques, as described herein, essentially any type of device activity (e.g., including QoS classes and prioritization and/or network capacity controlled classes and prioritization) can be individually accounted for and/or controlled (e.g., throttled, restricted, and/or otherwise controlled as desired). In some embodiments, the service processor periodically reports (e.g., during each heartbeat or based on any other periodic, push, and/or pull communication technique(s)) micro-CDR usage measures to, for example, a service controller or some other network element/function. In some embodiments, the service controller reformats the heartbeat micro-CDR usage information into a valid CDR format (e.g., a CDR format that is used and can be processed by an SGSN or GGSN or some other authorized network element/function for CDRs) and then transmits the reformatted micro-CDRs to a network element/function for performing CDR mediation.

In some embodiments, CDR mediation is used to properly account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system can process the mediated CDR feed from CDR mediation, apply the appropriate account billing codes to the aggregated micro-CDR information that was generated by the device, and then generate billing events in a manner that does not require changes to existing billing systems, infrastructures, and techniques (e.g., using new transaction codes to label the new device assisted billing capabilities).

In some embodiments, the various QoS techniques performed on or by the communications device (e.g., using a service processor to provide or assist in providing QoS session provisioning, QoS policy management, QoS policy enforcement, and/or QoS accounting/charging, such as QoS charging records and reports) are verified (e.g., using various verification techniques described herein). In some embodiments, the various network capacity controlled services techniques performed on or by the communications device (e.g., using a service processor to provide or assist in providing network capacity controlled services policy management, network capacity controlled services policy enforcement, and/or network capacity controlled services charging, such as network capacity controlled services charging records and reports) are verified (e.g., using various verification techniques described herein).

For example, a QoS request, QoS related policy rules (e.g., QoS activity map, QoS related service plan and/or service policy settings) and implementation, QoS policy enforcement, and QoS charging are verified (e.g., periodically, per transaction, and/or based on some other criteria/metric). In some embodiments, verification techniques include one or more of the following: compare a network based service usage measure with a first service policy associated with the communications device, compare a device assisted service usage measure with the first service policy, compare the network based service usage measure to the device assisted service usage measure, perform a test and confirm a device assisted service usage measure based on the test, perform a User Interface (UI) notification (e.g., which can include a user authentication, password, question/answer challenge, and/or other authentication technique), and/or other similar verification techniques as will now be apparent to one of ordinary skill in the art. Accordingly, in some embodiments, QoS for DAS "closes the loop" for verification of various QoS related techniques, such as QoS requests, QoS grants, QoS usage, and/or QoS charging. In some embodiments, the service processor and the service controller serve as a verifiable QoS management/coordination system for other QoS elements/functions in network. In some embodiments, if such or other verification techniques determine or assist in determining that a QoS request, QoS report, and/or QoS policy behavior (e.g., or similarly, network capacity controlled services monitoring, reporting, and/or policy behavior) does not match expected requests, reports, and/or policy, then responsive actions can be performed, for example, the communications device (e.g., and/or suspect services) can be suspended, quarantined, killed/terminated, and/or flagged for further analysis/scrutiny to determine whether the device is malfunctioning, needs updating, has been tampered with or compromised, is infected with malware, and/or if any other problem exists.

In some embodiments, the communications device (e.g., the service processor) maintains a QoS flow table that associates or maps device activity to QoS level/class to RAB/QoS channel, and in some embodiments, the communications device also informs a QoS management network function/element of the relative priority of the QoS flows for the communications device (e.g., based on or using the QoS flow table). In some embodiments, the service controller receives or collects information from the communications device and maintains such a QoS flow table for the communications device and, in some embodiments, the service controller also informs a QoS management network function/element of the relative priority of the QoS flows for the communications device (e.g., based on or using the QoS flow table). In some embodiments, flows can be assigned to activities originating at the communications device in a transparent way, or simply by activity class or user preference, or using other techniques.

In some embodiments, the communications device maintains a table of QoS billing rates, scheduled transmission times, and/other QoS related information to implement an overlay MAC at the data networking level to manage QoS on legacy networks that are not QoS MAC enabled and/or do not have the various functionality to support QoS controls (e.g., and such techniques can also be used to provide for QoS functionality across different networks). In some embodiments, QoS related policies are exchanged between roaming and home service controllers to facilitate QoS support while roaming on a non-home network(s).

In some embodiments, the communications device serves as a network capacity indicator (e.g., collecting network capacity information for a local cell and communicating or reporting that network capacity information to the service controller). For example, permanent local cell communications devices can be placed in local cell areas to augment legacy equipment for such network capacity indicator/reporting functions. Various other techniques for determining network capacity and/or network availability are described herein.

In some embodiments, service partners and/or service providers can subsidize in whole or in part to upgrade a given user or group of users to better QoS related service level agreement (SLA)/class for a preferred destination. In some embodiments, based on monitored service usage and/or other monitored behavior of the communications device, such subsidized QoS upgrade/offers can be presented to a user of the communications device (e.g., as an incentive/reward for desired or preferred user behavior or for other reasons). Similarly, in some embodiments, these techniques are also applied to network capacity controlled services.

In some embodiments, QoS charging is based on QoS channel/reservation, service flow, or RAB charging (e.g., single flow per RAB, multi-flow per RAB, multi-RAB per flow). In some embodiments, charging (e.g., for QoS and/or for network capacity controlled services) is based on one or more of the following: network busy state, time criteria, user service class request, traffic volume and class, time and class, network capacity (e.g., network busy state) and class, time of day and class, location, traffic type, application type, application class, destination, destination type, partner service, and/or other criteria/measures. In some embodiments, QoS charging is verified using the various verification techniques described herein (e.g., test charging events). In some embodiments, network capacity controlled services charging is verified using the various verification techniques described herein (e.g., test charging events). In some embodiments, QoS charging is by data usage (e.g., by Megabyte (MB)), service flow by time by QoS class, speed by time, network busy state, time of day/day of week, service plan, current network, and/or other criteria/measures. In some embodiments, network capacity controlled services charging is by data usage (e.g., by Megabyte (MB)), service flow by time by network capacity controlled services class, speed by time, network busy state, time of day/day of week, service plan, current network, and/or other criteria/measures.

In some embodiments, QoS for DAS includes coordinating functions with one or more of the following: DAS elements/ functions, Radio Access Network (RAN), Transport network, Core network, GRX network, IPX network, and/or other networks/elements/functions.

Figure 2:
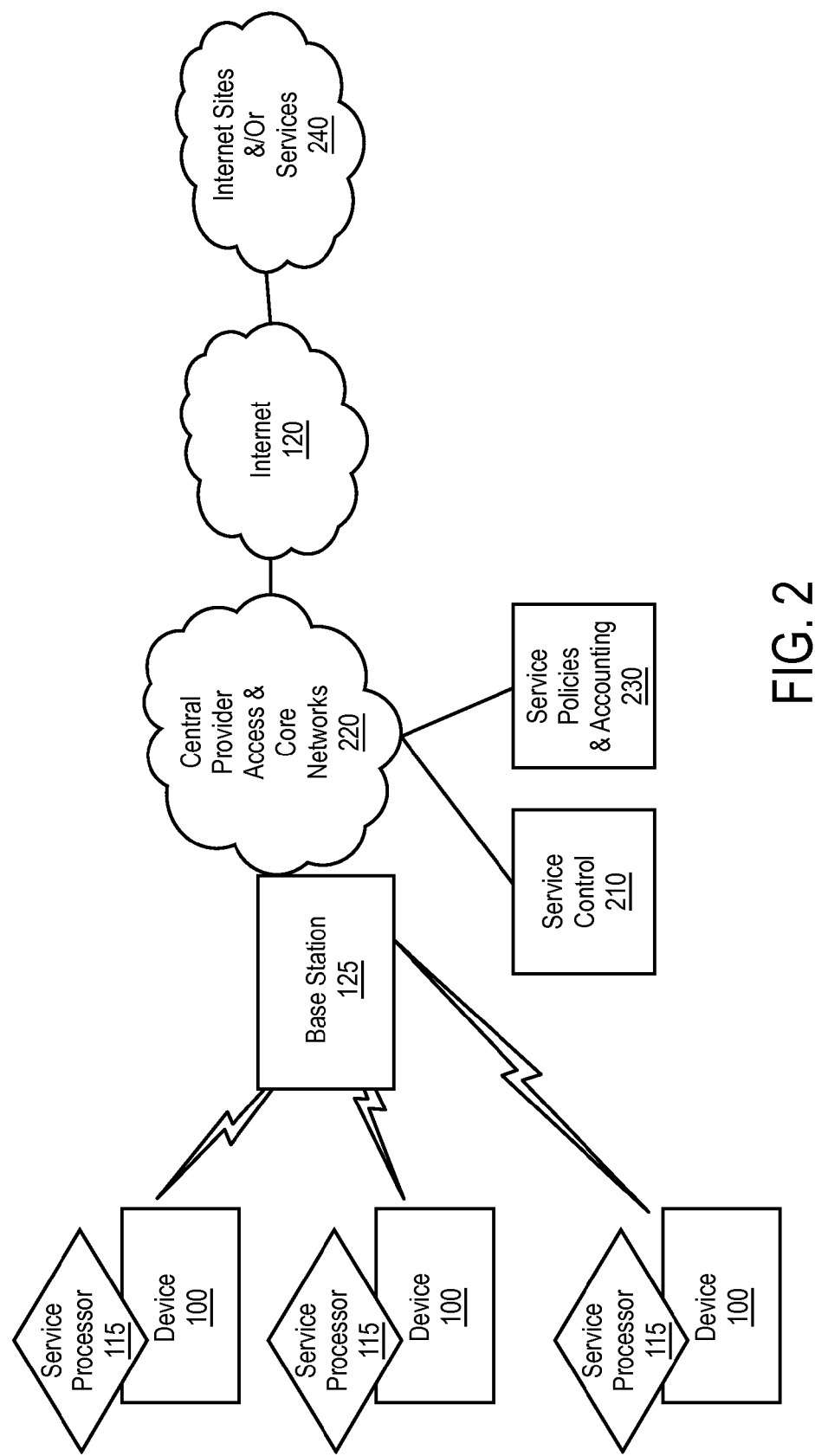
FIG. 2 illustrates another functional diagram of another network architecture for providing quality of service (QoS) for device assisted services (DAS) and/or for providing DAS for protecting network capacity in accordance with some embodiments.

FIG. 2 illustrates another functional diagram of another network architecture for providing quality of service (QoS) for device assisted services (DAS) and/or for providing DAS for protecting network capacity in accordance with some embodiments. In some embodiments, QoS for DAS techniques described herein are implemented using the network architecture shown in FIG. 2. In some embodiments, DAS for protecting network capacity techniques described herein are implemented using the network architecture shown in FIG. 2.

As shown, FIG. 2 includes various devices 100 including service processors 115. For example, devices 100 can include various types of mobile devices, such as phones, PDAs, computing devices, laptops, net books, tablets, cameras, music/media players, GPS devices, networked appliances, and any other networked device; and/or devices 100 can include various types of intermediate networking devices, as described herein. The devices 100 are in communication with service control 210 and central provider access and core networks 220. Service policies and accounting functions 230 are also provided in communication with the central provider access and core networks 220. For example, devices 100 can communicate via the central provider access and core networks 220 to the Internet 120 for access to various Internet sites/services 240 (e.g., Google sites/services, Yahoo sites/services, Blackberry services, Apple iTunes and AppStore, Amazon.com, FaceBook, and/or any other Internet service or other network facilitated service).

In some embodiments, FIG. 2 provides a wireless network architecture that supports various DAS for protecting network capacity techniques as described herein. Those of ordinary skill in the art will appreciate that various other network architectures can be used for providing various DAS for protecting network capacity techniques as described herein, and FIG. 2 is illustrative of just another such example network architecture for which DAS for protecting network capacity techniques as described herein can be provided.

Figure 3:
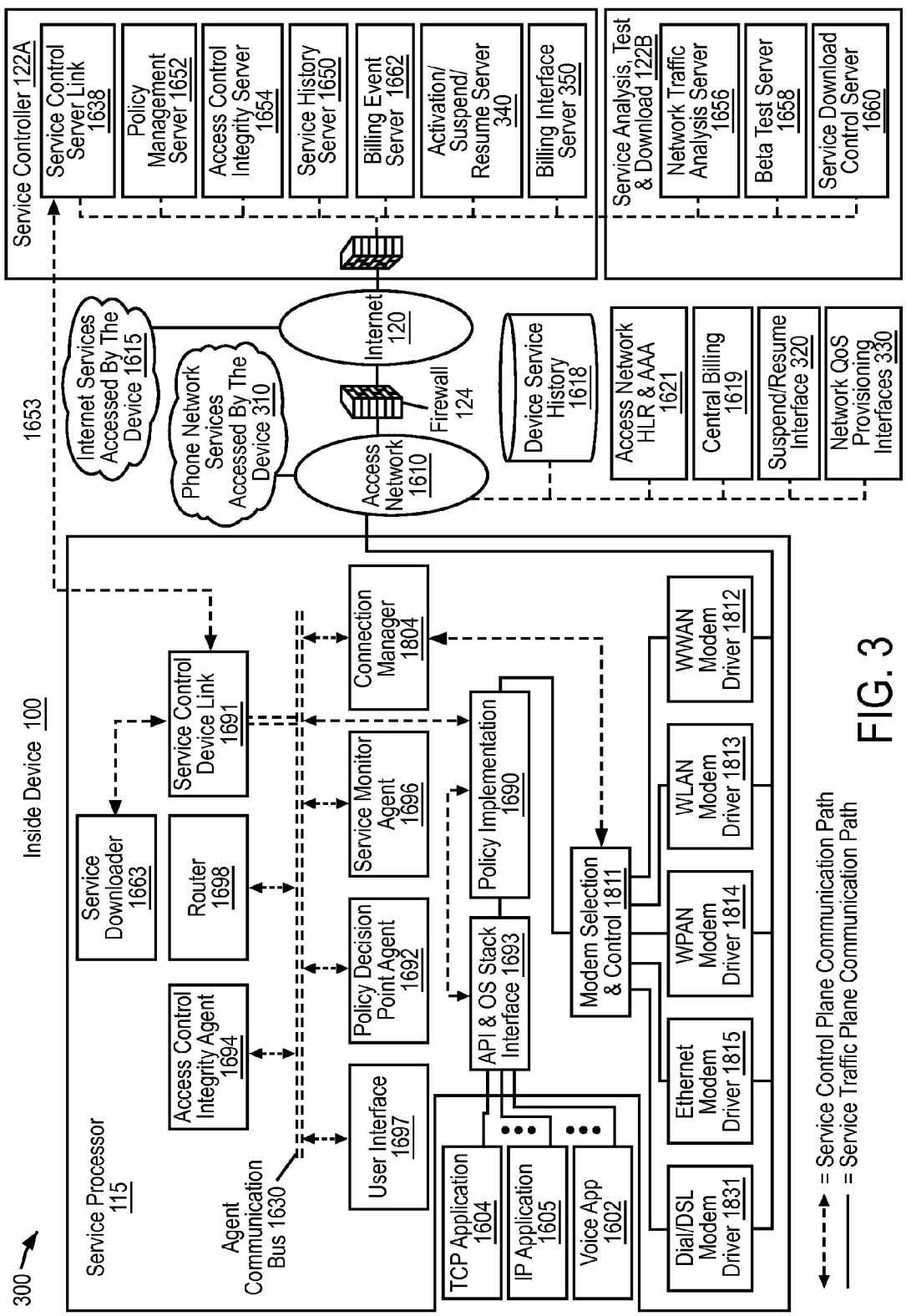
FIG. 3 illustrates a functional diagram of an architecture including a device based service processor and a service controller for providing quality of service (QoS) for device assisted services (DAS) and/or for providing DAS for protecting network capacity in accordance with some embodiments.

FIG. 3 illustrates another functional diagram of an architecture 300 including a device based service processor 115 and a service controller 122 for providing quality of service (QoS) for device assisted services (DAS) and/or for providing DAS for protecting network capacity in accordance with some embodiments. In some embodiments, QoS for DAS techniques described herein are implemented using the functions/elements shown in FIG. 3. In some embodiments, DAS for protecting network capacity techniques described herein are implemented using the functions/elements shown in FIG. 3.

For example, the architecture 300 provides a relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As will be apparent to one of ordinary skill in the art, the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, the functional elements shown in FIG. 3 are described below with respect to, for example, FIGS. 4, 12, and 13 as well as FIGS. 5 through 11 (e.g., QoS for DAS related embodiments) and FIGS. 14 through 23 (e.g., DAS for protecting network capacity related embodiments).

As shown in FIG. 3, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

As shown in FIG. 3, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 3, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

As shown in FIG. 3, the service controller 122 includes an access control integrity server 1654 (e.g., service policy security server). In some embodiments, the access control integrity server 1654 collects device information on service policy, service usage, agent configuration, and/or agent behavior. For example, the access control integrity server 1654 can cross check this information to identify integrity breaches in the service policy implementation and control system. In another example, the access control integrity server 1654 can initiate action when a service policy violation (e.g., QoS policy violation and/or a network capacity controlled services policy violation) or a system integrity breach is suspected.

In some embodiments, the access control integrity server 1654 (and/or some other agent of service controller 122) acts on access control integrity agent 1694 (e.g., service policy security agent) reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs or CDRs, and/or local service usage monitoring information) against expected service usage behavior given the policies that are intended to be in place (e.g., a QoS policy and/or a network capacity controlled services policy). For example, device service policy implementations can include measuring total QoS data passed, QoS data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (e.g., and/or some other agent of service controller 122) verifies device service policy, and the verification error conditions that can indicate a mismatch in QoS service measure and QoS service policy include one or more of the following: unauthorized network access (e.g., access beyond ambient service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy (e.g., a QoS policy and/or a network capacity controlled services policy).

As shown in FIG. 3, service controller 122 includes a service history server 1650 (e.g., charging server). In some embodiments, the service history server 1650 collects and records service usage or service activity reports from the Access Network AAA Server 1621 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618 (e.g., CDR feed and CDR mediation). In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 3, service controller 122 includes a policy management server 1652 (e.g., policy decision point (PDP) server) for managing service usage policies, such as QoS policies and/or a network capacity controlled services policies. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on the service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history, and/or other sensitive information) is not communicated to the network without the user's approval. In some embodiments, the policy management server 1652 adjusts service policy based on time of day. In some embodiments, the policy management server 1652 receives, requests, and/or otherwise obtains a measure of network availability/capacity and adjusts traffic shaping policy and/or other policy settings based on available network availability/capacity (e.g., a network busy state).

As shown in FIG. 3, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In some embodiments, the network traffic analysis server 1656 estimates the service quality and/or service usage for the network under variable settings on potential service policies. In some embodiments, the network traffic analysis server 1656 identifies actual or potential service behaviors by one or more devices that are causing problems for overall network service quality or service cost. In some embodiments, the network traffic analysis server 1656 estimates the network availability/capacity for the network under variable settings on potential service policies. In some embodiments, the network traffic analysis server 1656 identifies actual or potential service behaviors by one or more devices that are impacting and/or causing problems for overall network availability/capacity.

As shown in FIG. 3, Service Analysis, Test & Download 122B includes a beta test server 1658 (e.g., policy creation point and beta test server). In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization, such as for protecting network capacity.

As shown in FIG. 3, service controller 122 includes a service download control server 1660 (e.g., a service software download control server). In some embodiments, the service download control server 1660 provides a download function to install and/or update service software elements (e.g., the service processor 115 and/or agents/components of the service processor 115) on the device, as described herein.

As shown in FIG. 3 service controller 122 includes a billing event server 1662 (e.g., micro-CDR server). In some embodiments, the billing event server 1662 collects billing events, provides service plan information to the service processor 115, provides service usage updates to the service processor 115, serves as interface between device and central billing server 1619, and/or provides trusted third party function for certain ecommerce billing transactions.

As shown in FIG. 3, the Access Network HLR AAA server 1621 is in network communication with the access network 1610. In some embodiments, the Access Network AAA server 1621 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 1621 also provides the ability to suspend service for a device and resume service for a device based on communications received from the service controller 122. In some embodiments, the Access Network AAA server 1621 also provides the ability to direct routing for device traffic to a quarantine network or to restrict or limit network access when a device quarantine condition is invoked. In some embodiments, the Access Network AAA server 1621 also records and reports device network service usage (e.g., device network service usage can be reported to the device service history 1618).

As shown in FIG. 3, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation (e.g., to verify service usage charging). In some embodiments, the device service history 1618 is used to synchronize and/or verify the local service usage counter (e.g., to verify service usage accounting).

As shown in FIG. 3, the central billing 1619 (e.g., central provider billing server) is in network communication with the access network 1610. In some embodiments, the central provider billing server 1619 provides a mediation function for central provider billing events. For example, the central provider billing server 1619 can accept service plan changes. In some embodiments, the central provider billing server 1619 provides updates on device service usage, service plan limits and/or service policies. In some embodiments, the central provider billing server 1619 collects billing events, formulates bills, bills service users, provides certain billing event data and service plan information to the service controller 122 and/or device 100.

As shown in FIG. 3, in some embodiments, modem selection and control 1811 (e.g., in communication with connection manager 1804 as shown) selects the access network connection and is in communication with the modem firewall 1655, and modem drivers 1831, 1815, 1814, 1813, 1812 convert data traffic into modem bus traffic for one or more modems and are in communication with the modem selection and control 1811. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (e.g., potentially for higher service payments) than other users). As another example, ambient services (e.g., as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email, and SMS service. In this case, the service controller 122 would obtain from the billing system 123 in the case of network based billing (e.g., or the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 3, an agent communication bus 1630 represents a functional description for providing communication for the various service processor 115 agents and functions. In some embodiments, as represented in the functional diagram illustrated in FIG. 3, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned, and/or otherwise protected from unauthorized monitoring or usage. In some embodiments, an application interface agent (not shown) is used to literally tag or virtually tag application layer traffic so that the policy implementation agent(s) 1690 has the necessary information to implement selected traffic shaping solutions. In some embodiments, an application interface agent (not shown) is in communication with various applications, including a TCP application 1604, an IP application 1605, and a voice application 1602.

As shown in FIG. 3, service processor 115 includes an API and OS stack interface 1693. In some embodiments, the API and OS stack interface 1693 provides the QoS API functionality as similarly described herein with respect to various embodiments. In some embodiments, a QoS API is used to report back QoS availability to applications. In some embodiments, the API and OS stack interface 1693 provides the network capacity controlled API and/or emulated API functionality as similarly described herein with respect to various embodiments. As shown, service processor 115 also includes a router 1698 (e.g., a QoS router agent/function and/or a network capacity controlled services router agent/function) and a policy decision point (PDP) agent 1692. In some embodiments, the router 1698 provides QoS router functionality as similarly described herein with respect to various embodiments. In some embodiments, the router 1698 provides network capacity controlled services router functionality as similarly described herein with respect to various embodiments. In some embodiments, the QoS router supports multiple QoS channels (e.g., one or more provisioned/allocated QoS links forming a QoS channel between the device and the desired end point, such as an access point/BTS/gateway/network for a single ended QoS channel or other communication device for an end to end QoS channel, depending on the QoS connection/network support/availability/etc.). In some embodiments, the QoS router supports multiple QoS channels, which can each have different QoS classes/levels. In some embodiments, the QoS router routes application/service usage traffic to an appropriate QoS channel. In some embodiments, the QoS router determines the routing/mapping based on, for example, one or more of the following: a QoS API request, a QoS activity map, a user request, a service plan, a service profile, service policy settings, network capacity, service controller or other intermediate QoS network element/function/device, and/or any other criteria/measure, as similarly described herein with respect to various embodiments. In some embodiments, multiple different applications/services are routed to a particular QoS channel using various techniques described herein. In some embodiments, different applications/services are routed to different QoS channels using various techniques described herein. In some embodiments, the QoS router assists in managing and/or optimizing QoS usage for the communications device. In some embodiments, the QoS router assists in managing and/or optimizing QoS usage across multiple communications devices (e.g., based on network capacity for a given cell area/base station or other access point). In some embodiments, PDP agent 1692 provides the PDP agent functionality as similarly described herein with respect to various embodiments. As shown, architecture 300 also includes a suspend resume interface 320, network QoS provisioning interfaces 330 (e.g., for providing the various QoS techniques described herein), and an activation/suspend resume server 340 and billing interface server 350 in the service controller 122A.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent (not shown), service monitor agent 1696 (e.g., charging agent), or another agent or function (or combinations thereof) of the service processor 115 provides a DAS activity map. In some embodiments, a policy control agent (not shown), service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by socket (such as by IP address, protocol, and/or port), by socket id (such as port address/number), by port number, by content type, by application or application type, and/or any other service usage activity classification/categorization) with associated IP addresses and/or other criteria/measures. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments for providing QoS for DAS and/or for providing DAS for protecting network capacity. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs, and/or any of the various other DAS related techniques as described herein with respect to various embodiments.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (e.g., as discussed herein) is implemented and stored in software that can be performed on (e.g., executed by) various components in device 100. In some embodiments, it is advantageous to store or implement certain portions or all of service processor 115 in protected or secure memory so that other undesired programs (e.g., and/or unauthorized users) have difficulty accessing the functions or software in service processor 115. In some embodiments, service processor 115, at least in part, is implemented in and/or stored on secure non-volatile memory (e.g., non volatile memory can be secure non-volatile memory) that is not accessible without pass keys and/or other security mechanisms (e.g., security credentials). In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as shown in FIG. 3. In some embodiments, a secure software download embodiment also uses a secure non-volatile memory. Those of ordinary skill in the art will also appreciate that all memory can be on-chip, off-chip, on-board, and/or off-board.

Figure 4A:
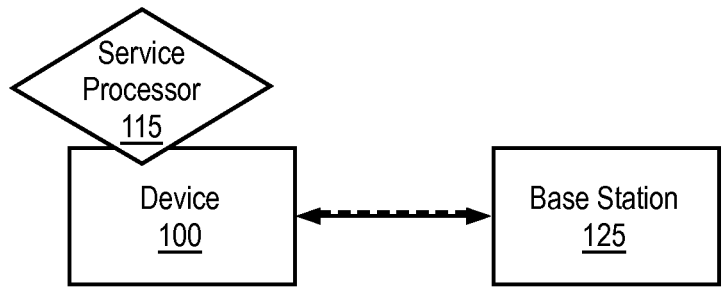
FIGS. 4A through 4C illustrates a functional diagram for providing quality of service (QoS) for device assisted services (DAS) in accordance with some embodiments.
Figure 4B:
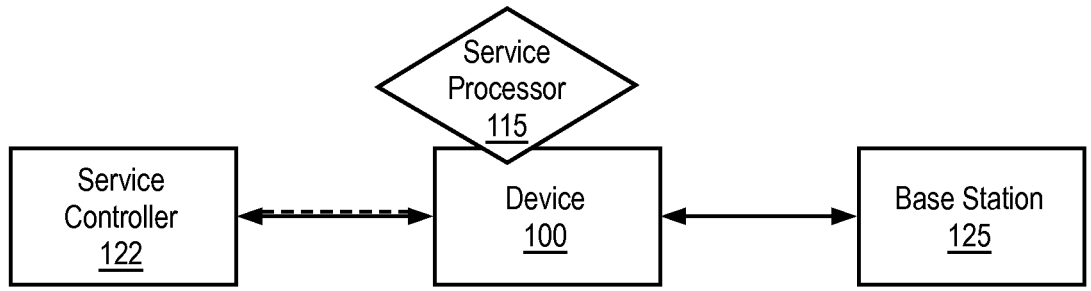
Figure 4C:
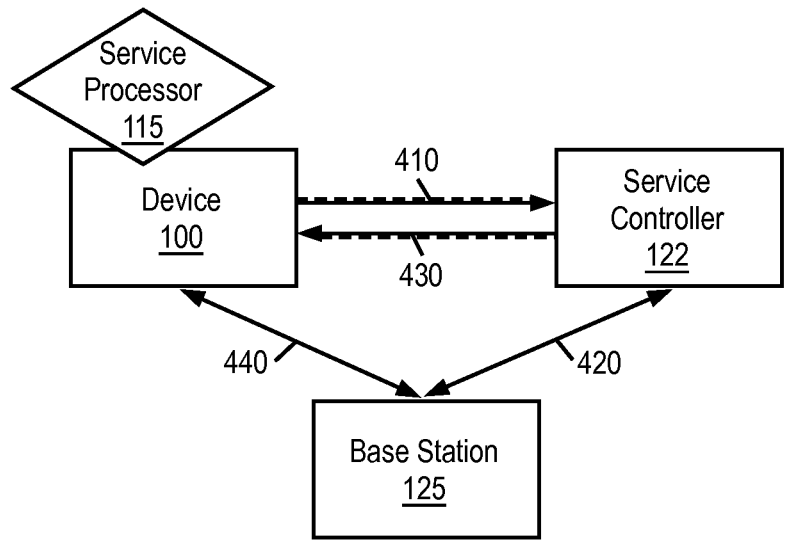

FIGS. 4A through 4C illustrates a functional diagram for providing quality of service (QoS) for device assisted services (DAS) in accordance with some embodiments. In some embodiments, QoS for DAS techniques described herein are implemented using the network architecture shown in FIGS. 4A through 4C.

Referring to FIG. 4A, in some embodiments, QoS functionality is performed at the communications device 100 using service processor 115 as similarly described herein. For example, the service processor 115 determines whether or not a QoS request is authorized (e.g., based on the associated service plan and/or other criteria/measures). If the QoS request is authorized, then the service processor 115 communicates with the base station (BTS) 125 to send the QoS request (e.g., a RAB or multi-RAB reservation request) to the local BTS. The BTS determines whether to accept or deny the QoS request (e.g., based on network capacity, such as using a first come first service QoS/network bandwidth or best effort access policy or other techniques, and/or other criteria/measures). The BTS responds to the QoS request accordingly. If the QoS request is granted, the QoS session can be initiated as similarly described herein. In some embodiments, the service processor 115 also performs various QoS charging functions using various techniques described herein, and the service processor 115 periodically sends QoS charging records or reports to the service controller 122 (e.g., and/or another network element/function). In some embodiments, the service processor 115 and the QoS related functions performed by the service processor 115 are periodically verified using the various techniques described herein.

Referring to FIG. 4B, FIG. 4B is similar to FIG. 4A except that the service controller 122 is also shown to be in communication with the service processor 115 of the communications device 100, which can provide for the download and periodically updating of the QoS rules and/or other service plan/profile/policy information that can include QoS related information. In some embodiments, the service processor 115 also performs various QoS charging functions using various techniques described herein, and the service processor 115 periodically sends QoS charging records or reports to the service controller 122 (e.g., and/or another network element/ function). In some embodiments, the service processor 115 and the QoS related functions performed by the service processor 115 are periodically verified using the various techniques described herein.

Referring to FIG. 4C, at 410, the service processor 115 sends a QoS request to the service controller 122 (e.g., the service processor can also (at least in part) determine whether the QoS request is authorized as similarly described with respect to FIG. 4A). At 420, the service controller 122 sends the QoS request to the BTS 125 if it is determined that the QoS request is authorized using various techniques described herein and/or whether the BTS 125 has network capacity for the QoS request. For example, the service controller can provide a central policy decision point function for QoS related activities (e.g., based on QoS prioritization, network capacity, and/or other criteria/measures/policies). At 430, the service controller 122 communicates the response to the QoS request accordingly. At 440, if the QoS request was approved, the device 100 initiates the QoS session (e.g., using a RAB or multi-RAB reservation) via the BTS 125. In some embodiments, the service processor 115 also performs various QoS charging functions using various techniques described herein, and the service processor 115 periodically sends QoS charging records or reports to the service controller 122 (e.g., and/or another network element/function). In some embodiments, the service processor 115 and the QoS related functions performed by the service processor 115 are periodically verified using the various techniques described herein.

In some embodiments, QoS techniques as described herein are implemented in the device (e.g., using the service processor 115) and one or more other network elements/functions, such as the BTS 125, service controller 125, RAN, SGSN/GGSN/other gateways and/or other network elements/functions, in which various of the QoS related functions can be distributed or allocated to such network elements/functions based on various design/network architecture approaches as will now be apparent to one of ordinary skill in the art, in which QoS related activities and/or functions at the device 100 are verified using various verification techniques described herein.

In some embodiments, the device determines QoS availability by directly querying QoS link reservation equipment in the network (e.g., an access point, such as the BTS 125). In some embodiments, the device determines QoS availability based on an intermediate network function that coordinates QoS requests with one or more network QoS link resources. In some embodiments, the device requests a QoS reservation in advance of QoS link establishment with one or more QoS network link resources. In some embodiments, in response to a QoS request, a QoS channel is reported as available only if/after it is determined that the necessary one or more QoS links required to create the QoS channel are available, and, for example, the QoS channel can then be reserved based on a confirmation or automatically be reserved in response to the QoS request.

Figure 5:
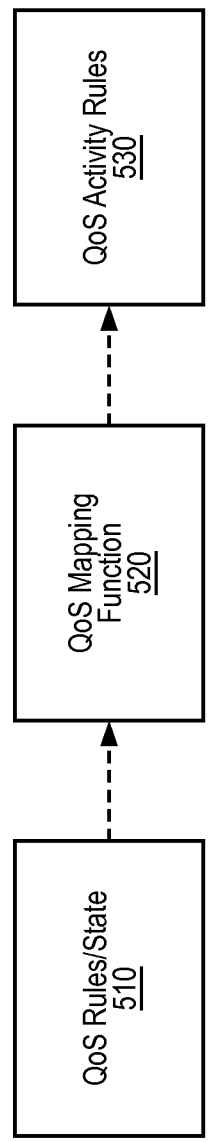
FIG. 5 illustrates a functional diagram for generating a QoS activity map for quality of service (QoS) for device assisted services (DAS) in accordance with some embodiments.

FIG. 5 illustrates a functional diagram for generating a QoS activity map for quality of service (QoS) for device assisted services (DAS) in accordance with some embodiments. In particular, FIG. 5 illustrates techniques for mapping a service plan or a set of service plan policies/rules for QoS 510 to a set of QoS activity rules 530. As shown, a set of QoS rules/QoS related device state information 510 (e.g., a set of associated service plan, service plan usage, other state such as network capacity or forecasted demand or time of day/day of week, activity usage, QoS level, and/or user preferences) is mapped using a QoS mapping function to a set of QoS activity rules 530 using various techniques described herein. At 530, activity rules (e.g., activity policy rules instructions) 530 are determined using the mapping function 520. In some embodiments, DAS for network capacity controlled services techniques can similarly be implemented using the techniques described with respect to FIG. 5 (e.g., for generating and implementing a network capacity controlled services activity map).

In some embodiments, the service plan includes a list of activity policies, and each activity policy in the service plan specifies how the activity policy is modified by rules state information. In some embodiments, each activity policy then becomes the instruction for the engine (e.g., QoS mapping function 520) that maps the activity policy to QoS activity rules 530. In some embodiments, service controller 122 downloads QoS mapping function 520, which is implemented by service processor 115.

In some embodiments, the service processor determines (e.g., and classifies) application/service usage activity demand with or without granular application/service usage activity (e.g., depending on various user/service plan/service provider/network/legal and/or other privacy restrictions and/or any other related requirements or settings). For example, policies (e.g., service policy settings and/or service profile settings) can be downloaded to provide such application/service usage activity monitoring rules and a QoS activity map for assigning such monitored activities to various QoS classes or priorities, and, in some embodiments, such monitoring and the QoS activity map can also be implemented using various verification techniques described herein (e.g., periodically audited, tested, compared with network service usage information). In some embodiments, the QoS activity map is based on a service plan, service profile, and/or service policy settings associated with the communications device. In some embodiments, the QoS activity map is based on a device group and/or user group. In some embodiments, the QoS activity map is based on user input (e.g., a user of the communications device can identify QoS classes/service levels for various applications and/or service activities, in response to requests for user input, based on user configurations, user defined rules (e.g., to eliminate or mitigate privacy and/or net neutrality concerns/issues), and/or confirmed monitored user behavior QoS related patterns or preferences). In some embodiments, the QoS activity map includes mappings/associations based on one or more of the following: a user preference for a given destination, destination class, application, application class (e.g., by application class instead of with respect to a specific application can also eliminate or mitigate privacy and/or net neutrality concerns/issues), flow, traffic or flow class, time period, time of day, location, network busy state (e.g., provide QoS when you can, then charge more when busy, notify user of busy state), device type, user type, user plan, user group, user standing, partner service, tokens, service type, and/or other criteria or measures.

In some embodiments, various techniques described herein are managed for device 100 for incoming and/or outgoing QoS requests. In some embodiments, as shown in FIG. 6, QoS for DAS includes establishing an end to end coordinated QoS service channel control.

Figure 6:
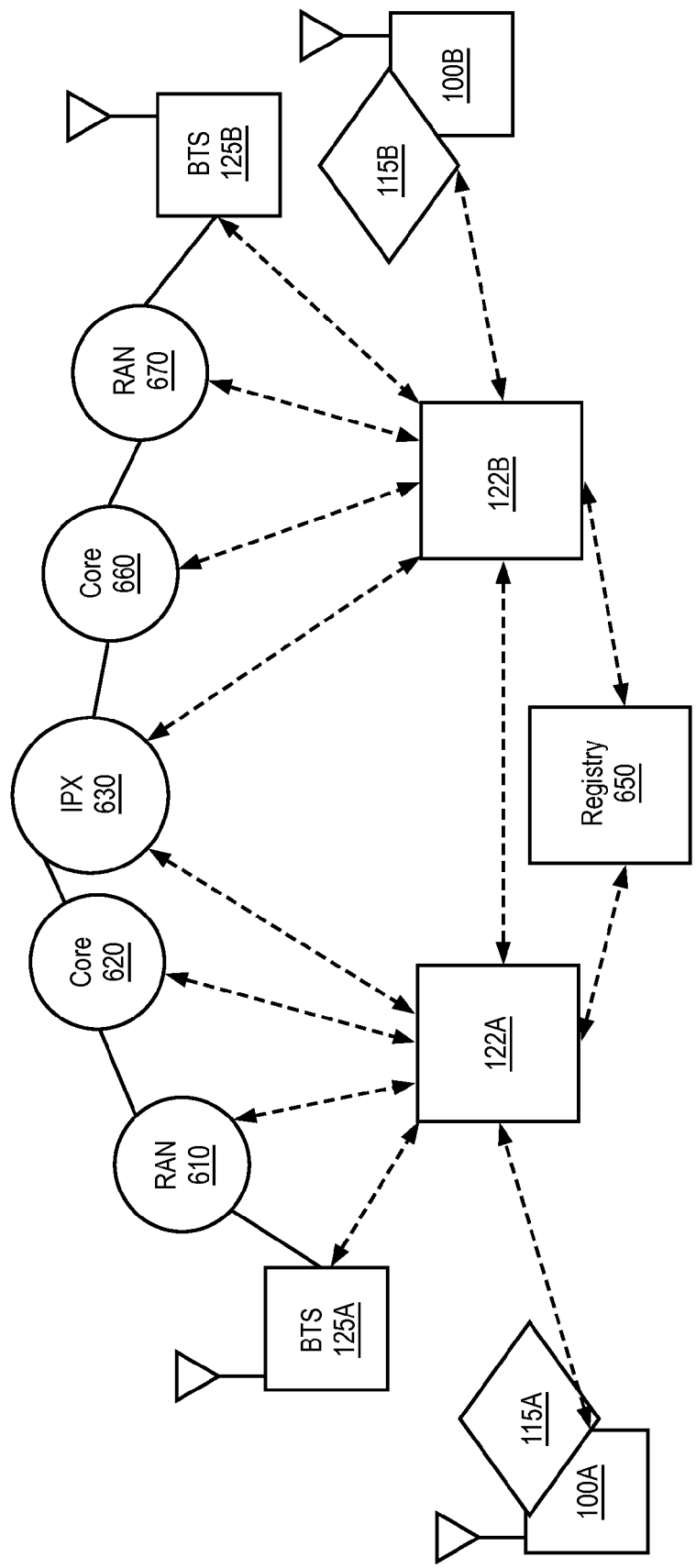
FIG. 6 illustrates a functional diagram for quality of service (QoS) for device assisted services (DAS) for an end to end coordinated QoS service channel control in accordance with some embodiments.

FIG. 6 illustrates a functional diagram for quality of service (QoS) for device assisted services for an end to end coordinated QoS service channel control in accordance with some embodiments. As shown in FIG. 6, a wireless communications device 100A includes a service processor 115A in secure communication with service controller 122A. A wireless communications device 100B includes a service processor 115B in secure communication with service controller 122B. In some embodiments, when, for example, device 100A initiates a QoS request for a QoS class session in communication with device 100B (e.g., a VOIP call or another application service requiring or possibly using a QoS class/level session, such as a conversational or other QoS type of class/level), as sequence of actions are performed using service controller 122A and service controller 122B to facilitate/setup an end to end coordinated QoS service channel control. In some embodiments, as similarly described herein, assuming that service processor 115A and service controller 122A determine that the QoS request from device 100A is authorized for that device, then the service controller 122A contacts registry 650 (e.g., a device registry, such as an HLR, mobile services center, or other central database or registry including, for example, service controller mappings by device/IP address/other) to determine the service controller associated with/responsible for managing QoS/service control for device 100B. The registry 650 provides the service controller 122B information (e.g., IP address/other address) based on this lookup determination. In some embodiments, service controller 122A then initiates the QoS request with service controller 122B to determine if the device 100B is authorized and/or available for the QoS session requested by device 100A. In some embodiments, service controllers 122A/B communicate with BTSs 125A/B to determine whether the QoS request can be facilitated (e.g., based on network capacity) as similarly described herein. In some embodiments, the service controllers 122A and 122B provide the central QoS coordination function and can request appropriate QoS channels directly from the respective local BTSs. In some embodiments, the service controllers 122A and 122B also communicate with one or more of the following network elements/functions as shown in FIG. 6 in order to facilitate an end to end coordinated QoS service channel control: RAN 610/670, Core Network 620/660, and IPX network 630. In some embodiments, service controllers 122A and 122B communicate with various necessary network elements for provisioning to facilitate session provisioning through the carrier core network as similarly discussed above. In some embodiments, service controllers 122A and 122B communicate with various necessary network elements for provisioning to facilitate session provisioning through the IPX network as similarly discussed above. As will be apparent to one of ordinary skill in the art, QoS for DAS techniques as described herein can be similarly implemented using these or similar techniques to various other network architectures.

Figure 7:
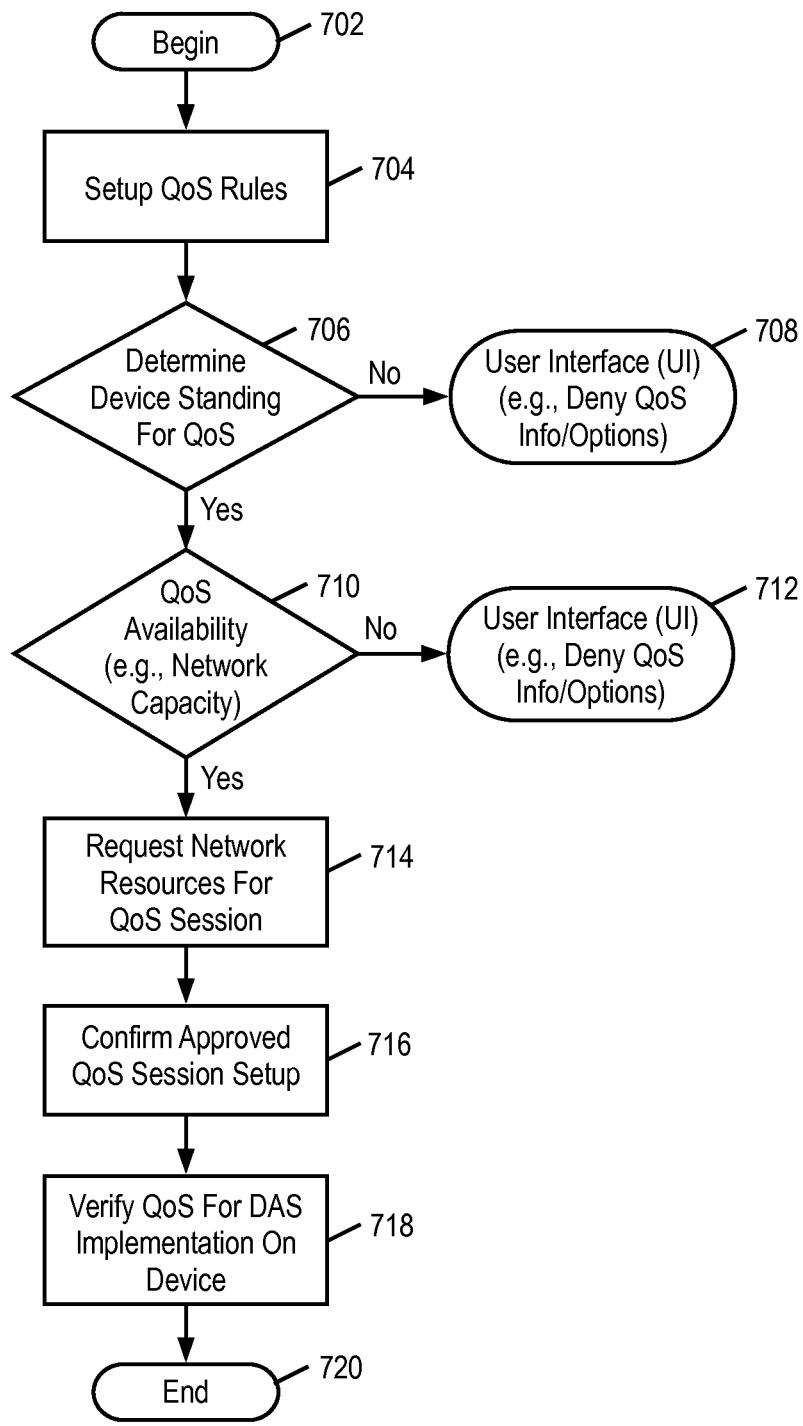
FIG. 7 illustrates a flow diagram for quality of service (QoS) for device assisted services (DAS) in accordance with some embodiments.

FIG. 7 illustrates a flow diagram for quality of service (QoS) for device assisted services (DAS) in accordance with some embodiments. At 702, the process begins. At 704, QoS rules are received or determined (e.g., a service processor receives or requests the QoS rules, which may be included in service plan, service profile, and/or service policy settings associated with the communications device). In some embodiments, the QoS rules are verified using various techniques as described herein (e.g., periodically updated, replaced, downloaded, obfuscated, and/or tested using by a service controller and/or using other verification techniques). In some embodiments, a QoS API is also used by various applications to initiate a QoS request, as described herein with respect to various embodiments. In some embodiments, the QoS rules are implemented in the form of a QoS activity map in accordance with various embodiments described herein. At 706, the communications device's standing for QoS is determined using various techniques described herein (e.g., based on the service plan, service profile, service policy settings, QoS rules, based on QoS class, current service usage, current billing standing, and/or any other criteria/measure). In some embodiments, in addition to verifying the device/user standing for the QoS request, whether the device is following or in compliance with an assigned QoS reservation request policy is also verified using various techniques described herein. If the device is determined to not be eligible for QoS, then at 708, the device User Interface (UI) provides information concerning the denial/ineligibility for QoS session(s) (e.g., denial/ineligibility explanation and/or options for providing for one or more QoS options, such as a service plan upgrade or payment for a certain/set of/period of time for QoS session(s) access). If the device is determined to be eligible for QoS, then at 710, QoS availability is determined (e.g., based on network capacity, which may be determined at the device, via communication with the service controller, via communication with the BTS, and/or any combination thereof, using the various techniques described herein). If QoS is determined to not be available, then at 712, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 714, a request for network resources for the QoS session is sent to one or more network resources (e.g., service controller, BTS, gateway, core/transport network, IPX/GRX networks, and/or other network elements/functions/resources). At 716, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 718, one or more verification techniques are performed to verify the QoS for DAS implementation on the device using various verification techniques described herein (e.g., comparing QoS service usage reports from a network source with the associated device policy; comparing QoS service usage reports from a network source with the QoS service usage reports from the device, and/or using other verification techniques as similarly described herein). At 720, the process is completed.

Figure 8A:
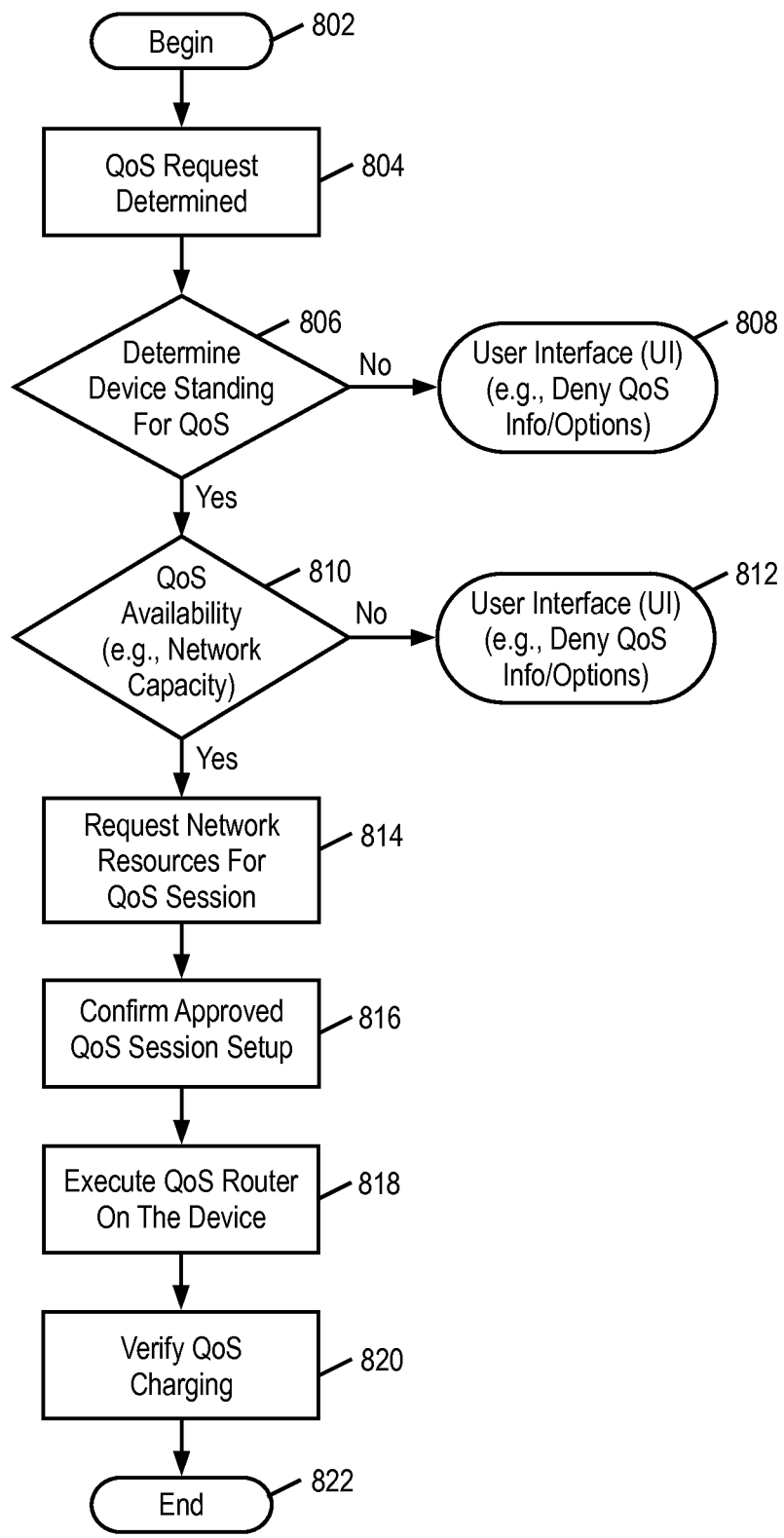
FIGS. 8A through 8C each illustrate another flow diagram for quality of service (QoS) for device assisted services (DAS) in accordance with some embodiments.
Figure 8B:
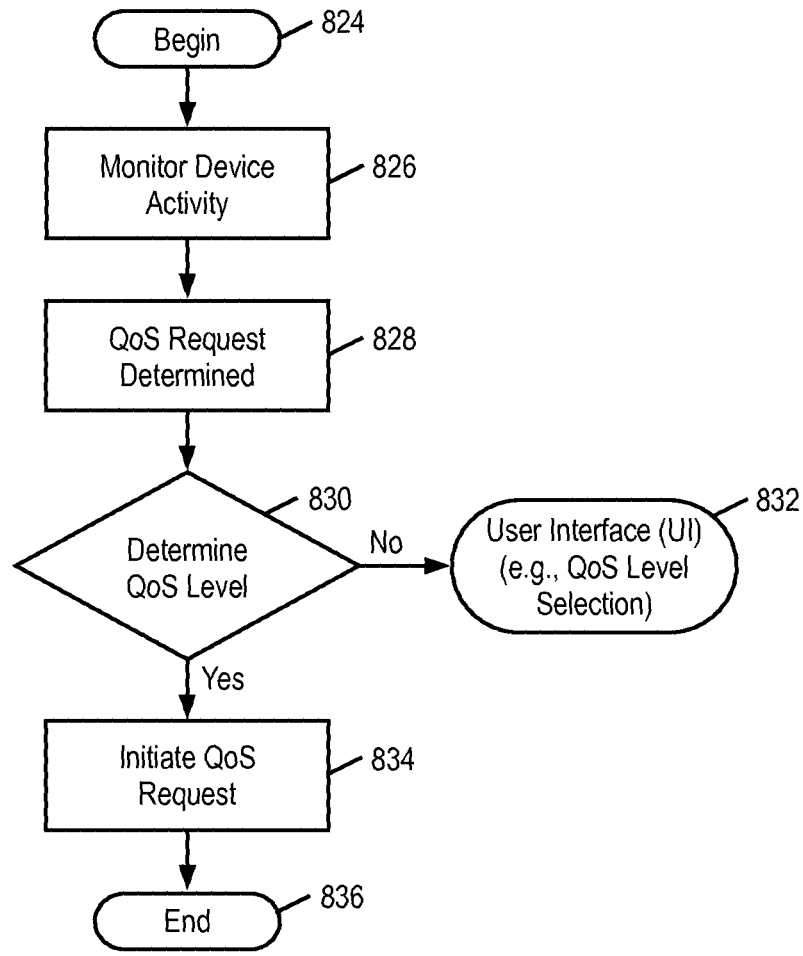
Figure 8C:
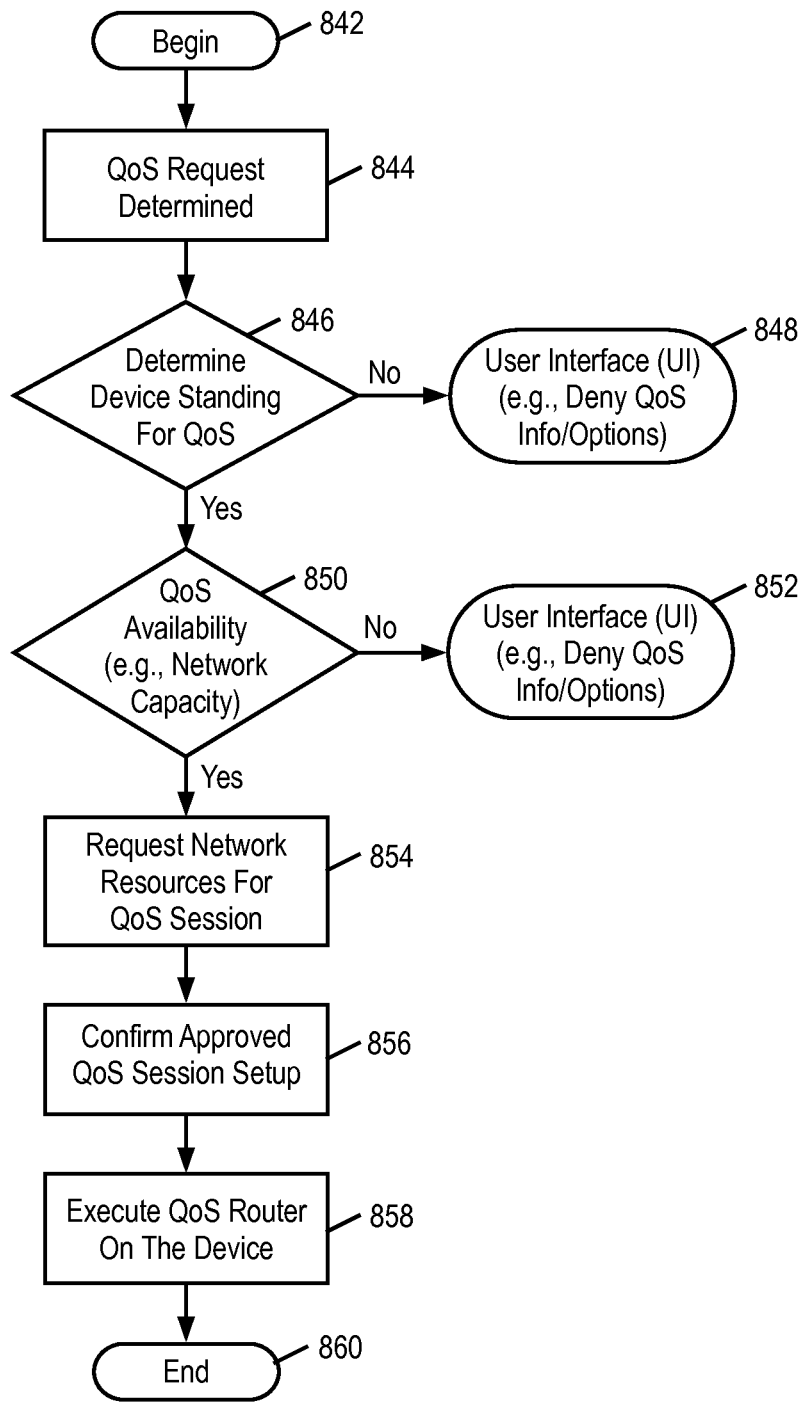

FIGS. 8A through 8C each illustrate another flow diagram for quality of service (QoS) for device assisted services (DAS) in accordance with some embodiments. FIG. 8A illustrates another flow diagram for quality of service (QoS) for device assisted services (DAS) in accordance with some embodiments. At 802, the process begins. In some embodiments, the QoS policies are implemented on the device (e.g., service processor collects/receives an associated service plan that defines/specifies basic policies for QoS, which can include a QoS activity map, which, for example, maps QoS classes based on application, service usage, flow type, destination, time of day, network capacity, and/or other criteria/ measures, as similarly described herein). In some embodiments, a QoS API is also used by various applications to initiate a QoS request, as described herein with respect to various embodiments. In some embodiments, the QoS rules are implemented in the form of a verified QoS activity map in accordance with various embodiments described herein. At 804, a QoS request is determined (e.g., by QoS class for a particular associated service/application). In some embodiments, the QoS request is determined at least in part by using the QoS activity map using various techniques described herein, for example, based on service/application usage monitoring on the device (e.g., by the service processor service usage monitoring agent). In some embodiments, the QoS request is determined based on the QoS API. In some embodiments, the QoS request is determined to be associated with an outgoing connection or an incoming connection. At 806, whether the QoS request is authorized is determined (e.g., whether the QoS request supported by the service plan, sufficient charging credit exists for this QoS request, and/or other criteria/measures). If not, then at 808, the UI provides a responsive notification and/or option as similarly described herein. If the QoS request is approved, then at 810, a request for network resources for the QoS session is sent to one or more network resources (e.g., service controller, BTS, gateway, core/transport network, IPX/GRX networks, a/another service controller in communication with another communications device such as for setting up a conversational class QoS connection with the other communications device, and/or other network elements/functions/resources). If the device is determined to be eligible for QoS, then at 810, QoS availability is determined (e.g., based on network capacity, which may be determined at the device, via communication with the service controller, via communication with the BTS or another network element/function, and/or any combination thereof, using the various techniques described herein). If QoS is determined to not be available, then at 812, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 814, a request for network resources for the QoS session is sent to one or more network resources (e.g., service controller, BTS, gateway, core/transport network, IPX/GRX networks, and/or other network elements/functions/resources, to setup, for example, a QoS end to end connection—coordinate all resources end to end for the approved and verified QoS flow). At 816, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 818, a QoS router is executed/performed on the communications device to assist in implementing QoS for DAS using various verification techniques described herein (e.g., to perform QoS queuing, throttling, and/or other QoS router related functions as described herein). At 820, verified QoS charging is performed (e.g., at least in part) on the device using various techniques described herein (e.g., using the service processor, such as the charging/service usage monitoring and/or other agents as described herein). In some embodiments, QoS charging records and/or reports are provided to one or more network elements for managing QoS billing and/or other QoS management/billing related service control functions (e.g., to the service controller and/or the billing interface or billing server). In some embodiments, QoS for DAS also facilitates reestablishing the QoS session/connection/channel/stream if the QoS session/connection/channel/stream is lost or goes down, using similar techniques to those described herein as would be apparent to one of ordinary skill in the art. At 822, the process is completed. In some embodiments, the QoS provisioning channel is closed when the device session is over to, for example, free up various resources.

FIG. 8B illustrates another flow diagram for quality of service (QoS) for device assisted services (DAS) in accordance with some embodiments. In some embodiments, QoS for DAS includes identifying the QoS requirements (e.g., QoS level or QoS class) for a service activity. At 824, the process begins. In some embodiments, the QoS policies are implemented on the device (e.g., service processor collects/receives an associated service plan that defines/specifies basic policies for QoS, which can include a QoS activity map, which, for example, maps QoS classes based on application, service usage, flow type, destination, time of day, network capacity, and/or other criteria/measures, as similarly described herein). In some embodiments, the QoS rules are implemented in the form of a verified QoS activity map in accordance with various embodiments described herein. At 826, the device monitors device activity, such as service/application usage activities. In some embodiments, the device detects the relevant activities based on various service usage monitoring techniques described herein. At 828, a QoS request is determined, for example, using various techniques described herein. At 830, a QoS level is determined based on the application and/or various device monitored service usage/application activities associated with the QoS request using various techniques described herein. For example, the QoS level can be determined using the QoS activity map, which provides a QoS policy defined by a table associating various QoS levels with a variety of activities that include various device monitored service usage/application activities. In some embodiments, the QoS activity map includes QoS level mappings based on one or more of the following: application, destination/source, traffic type, connection type, content type, time of day/day of week, network capacity, activity usage, service plan selection, current standing, user class, device class, home/roaming, network capabilities, and/or other criteria/measures as similarly described herein. In some embodiments, at 832, if the QoS level cannot be determined and/or in order to confirm a QoS level or selection among multiple potential appropriate/approved QoS levels, the UI presents options for a user to select the QoS level. At 834, the QoS request is initiated for the determined QoS level (e.g., QoS class and/or priorities). At 836, the process is completed.

FIG. 8C illustrates another flow diagram for quality of service (QoS) for device assisted services (DAS) in accordance with some embodiments. In some embodiments, QoS for DAS includes determining whether the network should grant the QoS request for a given device activity. At 842, the process begins. At 844, QoS request is determined. At 846, the communications device's standing for QoS is determined using various techniques described herein (e.g., a service processor in combination with a service controller or based on a communication for authorization of the QoS request sent to the service controller determines whether the QoS request is authorized, which can be based on the service plan, service profile, service policy settings, QoS rules, based on QoS class, current service usage, current billing standing, and/or any other criteria/measure). If the device is determined to not be eligible for QoS, then at 848, the device User Interface (UI) provides information concerning the denial/ineligibility for QoS session(s) (e.g., denial/ineligibility explanation and/or options for providing for one or more QoS options, such as a service plan upgrade or payment for a certain/set of/period of time for QoS session(s) access). If the device is determined to be eligible for QoS, then at 850, QoS availability is determined (e.g., based on network capacity, which may be determined at the device, via communication with the service controller, via communication with the BTS or another network element/function, and/or any combination thereof, using the various techniques described herein). If QoS is determined to not be available, then at 852, the UI provides information and/or options concerning the QoS availability (e.g., unavailability explanation and/or options for providing for one or more QoS options, such as a service plan upgrade or payment for a certain/set of/period of time for QoS session(s) access). If QoS is determined to be available, then at 854, a request for network resources for the QoS session is sent to one or more network resources (e.g., service controller, BTS, gateway, core/transport network, IPX/GRX networks, and/or other network elements/functions/resources can be queried directly and/or a centralized QoS resource/network function/element/database can be queried for determining such network resources and coordinating such scheduling). At 856, a confirmation of the approved QoS session is received to close the loop for the QoS for DAS (e.g., a QoS schedule is received that provides the QoS session confirmation information, such as a scheduled RAB/multi-RAB and/or other reserved network resource(s) by schedule/other criteria). At 858, a QoS router is performed. In some embodiments, the QoS router is performed on the device (e.g., service processor), on a network element/function (e.g., service controller), and/or in combinations thereof. In some embodiments, the QoS router prioritizes multiple QoS requests across a given communications device. In some embodiments, the QoS router prioritizes multiple QoS requests across multiple communications devices and/or across multiple BTSs. In some embodiments, the QoS router performs various QoS class degradation, promotion, and/or other throttling related techniques as similarly described herein (e.g., based on session priority, network capacity, workload balancing, QoS priority rules, and/or other criteria/measures/rules). At 860, the process is completed.

Figure 9:
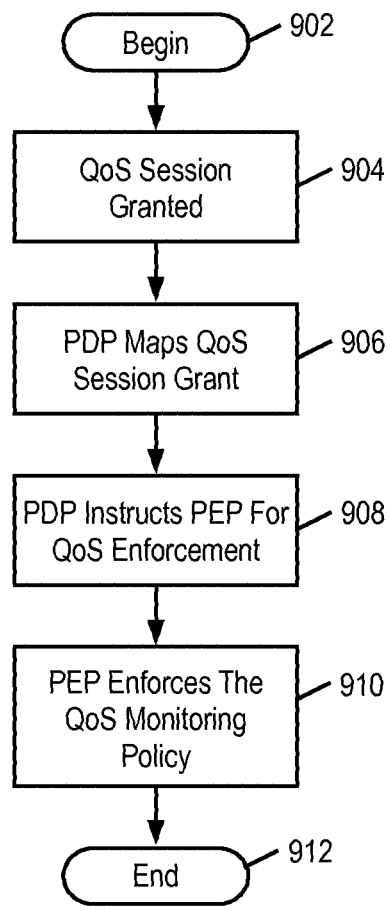
FIG. 9 illustrates another flow diagram for quality of service (QoS) for device assisted services (DAS) in accordance with some embodiments.

FIG. 9 illustrates another flow diagram for quality of service (QoS) for device assisted services (DAS) in accordance with some embodiments. In some embodiments, QoS for DAS includes QoS session provision for a service activity. At 902, the process begins. At 904, a new QoS session is granted and/or confirmed. At 906, a device service processor (e.g., policy decision point (PDP) agent, also referred to herein as a policy control agent) maps the QoS session grant to a QoS monitoring policy (e.g., based on a service controller provided QoS related policy, based on a service plan associated with the device, user, device/user group, and/or other criteria/measures, as similarly described herein). At 908, the QoS monitoring policy provides commands/instructions to a policy enforcement point (PEP) (e.g., PEP agent, also referred to herein as a policy implementation agent) for managing/enforcing the new QoS priorities/sessions. At 910, the PEP determines whether to allow, block, throttle, and/or queue priority (e.g., and/or otherwise control using various traffic control related techniques) a session based on the QoS monitoring policy. At 912, the process is completed.

Figure 10:
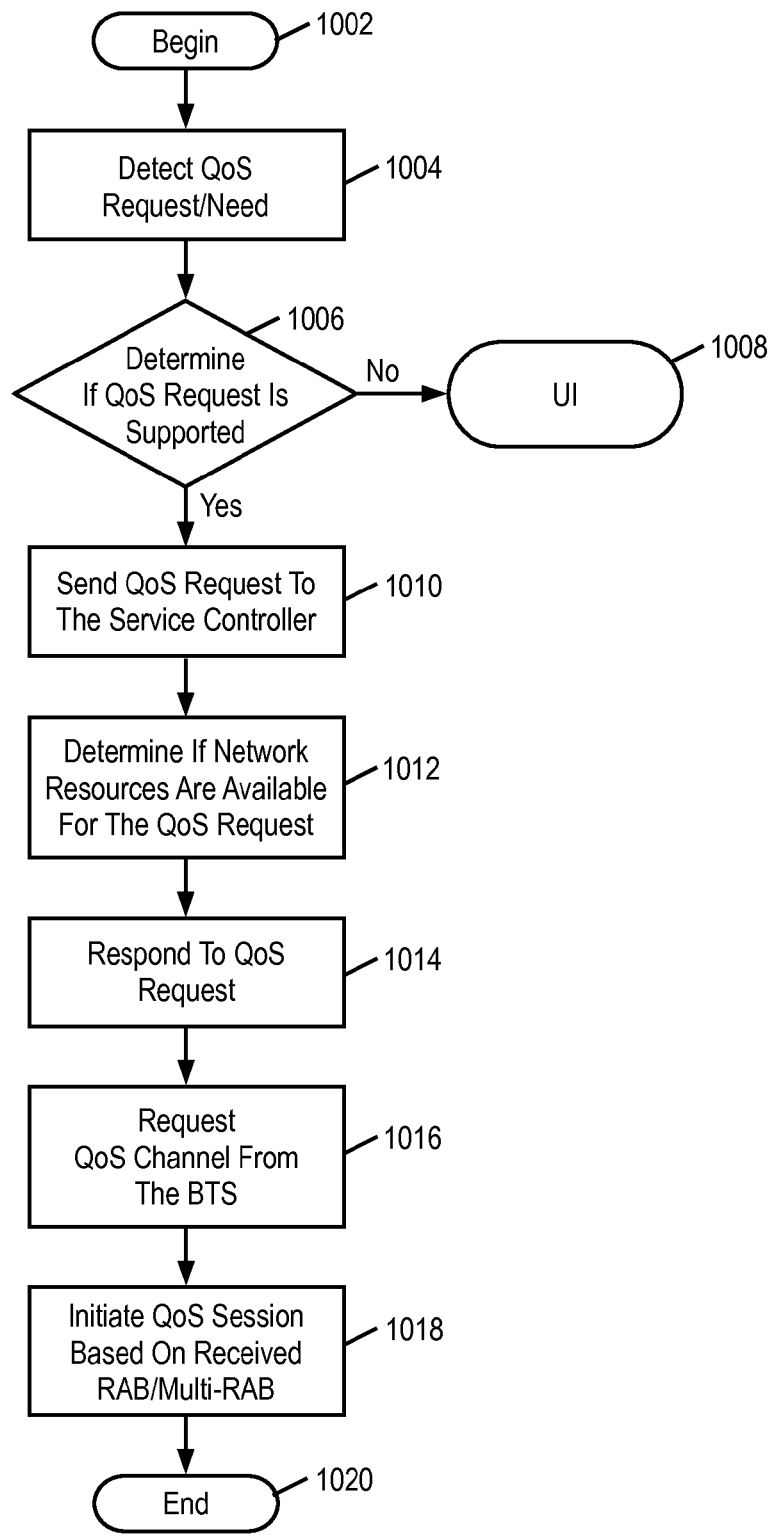
FIG. 10 illustrates another flow diagram for quality of service (QoS) for device assisted services (DAS) in accordance with some embodiments.

FIG. 10 illustrates another flow diagram for quality of service (QoS) for device assisted services (DAS) in accordance with some embodiments. In some embodiments, Radio Access Bearer (RAB) support is available, and the following process is performed in accordance with some embodiments.

At 1002, the process begins. At 1004, the device service processor detects a QoS request or QoS need (e.g., a QoS API request, a QoS request or need/benefit of QoS session based on service usage monitoring, such as by application and/or another service usage measure/activity). At 1006, the service processor and/or the service processor in communication with the service controller determines if the service plan allows/supports the requested QoS. If not, then at 1008, a UI event is generated (e.g., notifying the device user that such QoS/QoS level/class is not available, and potentially offering a QoS/service plan upgrade/purchase for that QoS/QoS level/class). At 1010, the service processor communicates the QoS request to the service controller (e.g., using a secure service control link or secure communication channel, as similarly described herein) to request the QoS level/class. At 1012, the service controller determines whether network resources are available using various techniques as described herein. In some embodiments, network capacity is determined using various techniques, such as local device measurements; dedicated local device measurement reports; BTS reports; other network element reports; by assessing, for example, a combination of one or more of available bandwidth, traffic delay or latency, available QoS level, variability in available bandwidth, variability in latency, and/or variability in available QoS level; and/or other techniques as described herein. At 1014, the service controller responds to the QoS request (e.g., grants or denies the QoS request). In some embodiments, another UI event is generated if the QoS request is denied as similarly described herein. At 1016 (assuming the QoS request is granted), the device requests a QoS channel from the BTS. In some embodiments, the request includes a QoS request authorization code received from the service controller. In some embodiments, the service controller provides a notification of the QoS request approval for the communications device to the BTS, so that the BTS can verify the approval of the QoS request. In some embodiments, the BTS confirms the device QoS channel request directly with the service controller. For example, various other techniques for verifying the QoS channel request can also be used as similarly described herein and as would be apparent to one of ordinary skill in the art. In some embodiments, the device service processor and/or service controller provides QoS related reports informing the BTS of how many QoS channels (e.g., RABs) to provision and how many best effort resources to provision based on device demand projections. At 1018 (assuming the QoS channel request is verified), the QoS session is initiated based on an allocated RAB or multi-RAB reservation received from the BTS (e.g., and/or other network elements as similarly described herein). At 1020, the process is completed.

Figure 11:
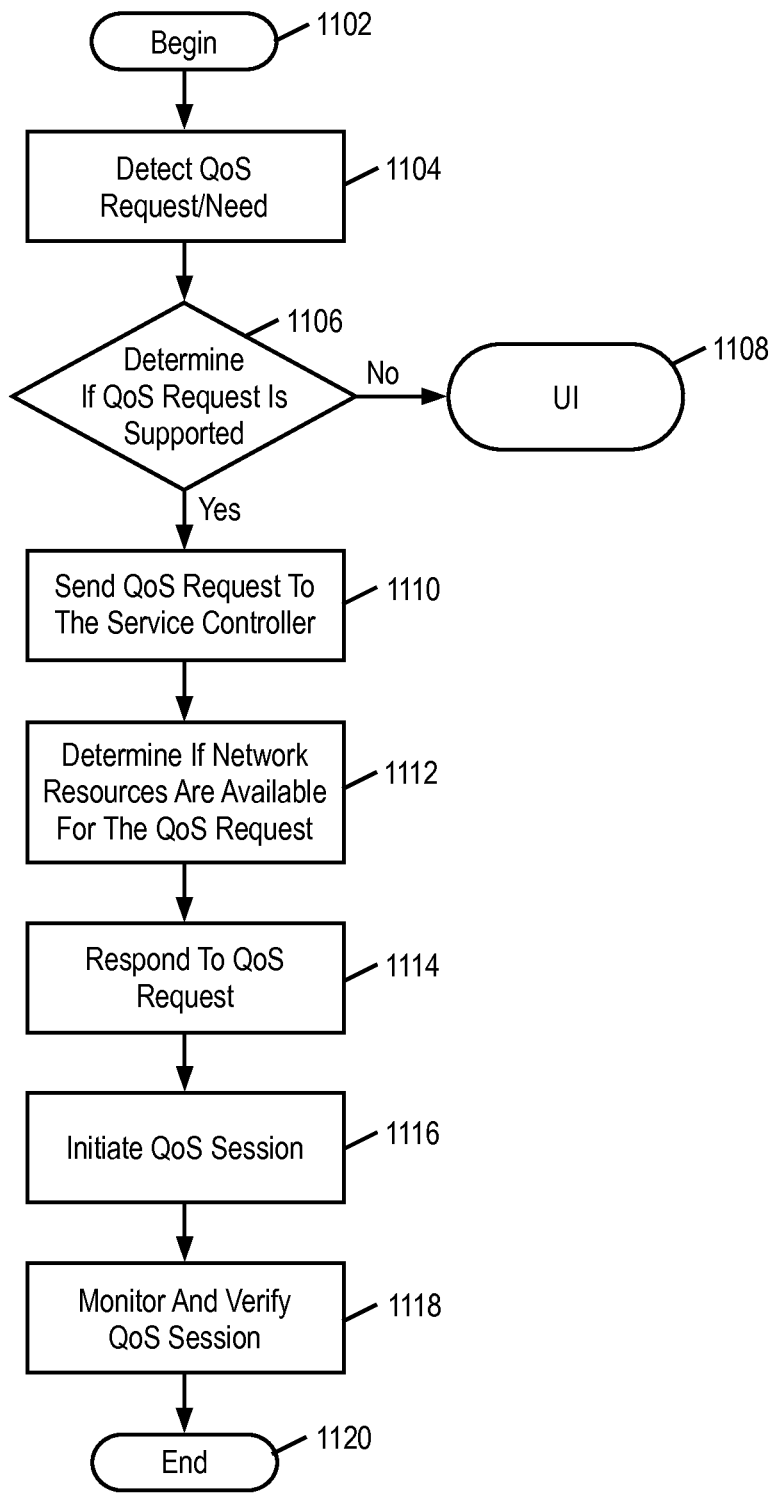
FIG. 11 illustrates another flow diagram for quality of service (QoS) for device assisted services (DAS) in accordance with some embodiments.

FIG. 11 illustrates another flow diagram for quality of service (QoS) for device assisted services (DAS) in accordance with some embodiments. In some embodiments, RAB support is not available, and the following process is performed in accordance with some embodiments. At 1102, the process begins. At 1104, the device service processor detects a QoS request or QoS need (e.g., a QoS API request, a QoS request or need/benefit of QoS session based on service usage monitoring, such as by application, or other service usage measure/activity). At 1106, the service processor and/or the service processor in communication with the service controller determines if the service plan allows/supports the requested QoS. If not, then at 1108, a UI event is generated (e.g., notifying the device user that such QoS/QoS level/class is not available, and potentially offering a QoS/service plan upgrade/purchase for that QoS/QoS level/class). At 1110, the service processor communicates the QoS request to the service controller (e.g., using a secure service control link or secure communication channel, as similarly described herein) to request the QoS level/class. At 1112, the service controller determines whether network resources are available using various techniques as described herein. In some embodiments, network capacity is determined using various techniques, such as local device measurements, BTS reports, other network element reports, and/or other techniques as described herein. In some embodiments, the service controller throttles other devices on the link so that the requested QoS level can be achieved (e.g., as RAB support is not available). In some embodiments, the service controller time slots traffic from the device end in synchronization with a BTS clock or absolute clock to facilitate the requested QoS level and to achieve necessary network capacity to support/facilitate the requested QoS level (e.g., minimizing jitter/inter-packet delay variation) based on current/forecasted network capacity on the link. At 1114, the service controller responds to the QoS request (e.g., grants or denies the QoS request). In some embodiments, another UI event is generated if the QoS request is denied as similarly described herein. At 1116 (assuming the QoS request is granted), the device initiates the QoS session. At 1118, the device service processor and/or the device service processor in secure communication with the service controller monitors and verifies the QoS session using various monitoring and verification techniques described herein (e.g., checks CDRs to determine if the QoS channel is properly implemented by the device). In some embodiments, a UI event is generated to notify the device user if there are potential problems with the QoS session implementation, to periodically inform the user of QoS charging, and/or other events/information related to QoS activities. At 1120, the process is completed.

Figure 12:
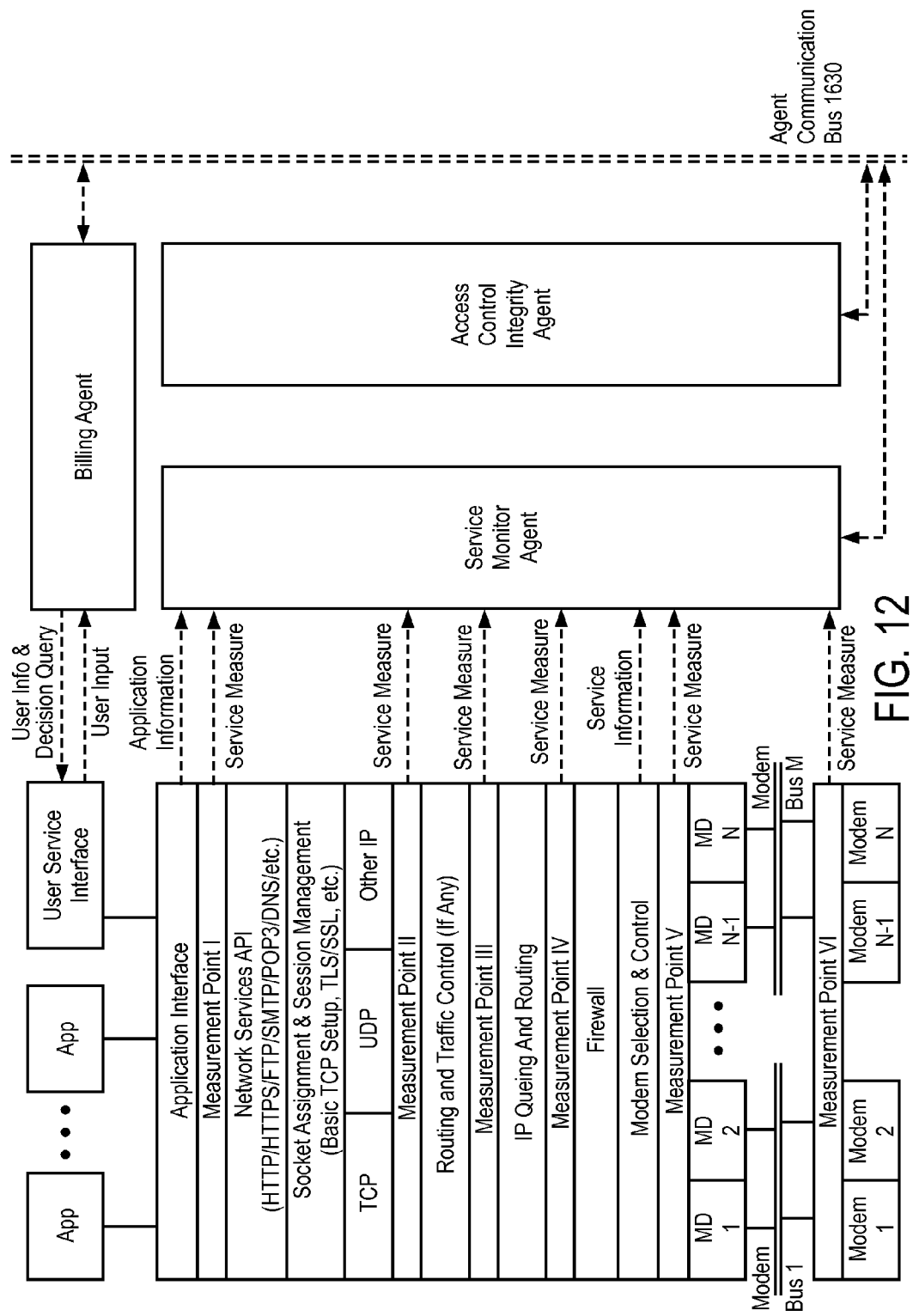
FIG. 12 illustrates a device stack for providing various service usage measurement techniques in accordance with some embodiments.

FIG. 12 illustrates a device stack for providing various service usage measurement techniques in accordance with some embodiments. FIG. 12 illustrates a device stack providing various service usage measurement from various points in the networking stack for a service monitor agent (e.g., for monitoring QoS related activities and/or for monitoring network capacity controlled services as described herein), a billing agent, and an access control integrity agent to assist in verifying the service usage measures, QoS related activities and functions, and billing reports in accordance with some embodiments. As shown in FIG. 12, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent/detect tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation driver/agent 1690 (e.g., policy enforcement point driver/agent), or in some embodiments the modem firewall agent 1655 or the application interface agent, in making a determination regarding the traffic parameters or type once the traffic is farther down in the communication stack where it is sometimes difficult or impossible to make a complete determination of traffic parameters. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

It will be appreciated that although the implementation/use of any or all of the measurement points illustrated in FIG. 12 is not required to have an effective implementation, such as was similarly shown with respect to various embodiments described herein, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack where, for example, it is more difficult to circumvent and can be more difficult to access for tampering purposes if the modem is designed with the proper software and/or hardware security to protect the integrity of the modem stack and measurement point(s).

Referring to FIG. 12, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multimode device based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent/detect tampering of the service controls. In some embodiments, the modem firewall is implemented farther up the stack, possibly in combination with other layers as indicated in other figures and described herein. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer (e.g., QoS IP queuing and routing layer and/or a network capacity controlled services queuing and routing layer). As shown, an IP queuing and routing layer is separate from the policy implementation layer where the policy implementation agent implements a portion of the traffic control and/or service usage control policies. As described herein, in some embodiments, these functions are separated so that a standard network stack function can be used for QoS IP queuing and routing and/or for network capacity controlled services queuing and routing, and the modifications necessary to implement the policy implementation agent functions can be provided in a new layer inserted into the standard stack. In some embodiments, the IP queuing and routing layer is combined with the traffic or service usage control layer. For example, a combined routing and policy implementation layer embodiment can also be used with the other embodiments, such as shown in FIG. 12. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POPS, DNS) resides above the session layer. Measurement point I resides between the network services API layer and an application layer, shown as application service interface agent in the device communications stack of FIG. 12.

As shown in FIG. 12, the application service interface layer (e.g., QoS application service interface layer and/or network capacity controlled services interface layer) is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

As shown in FIG. 12, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

Figure 13:
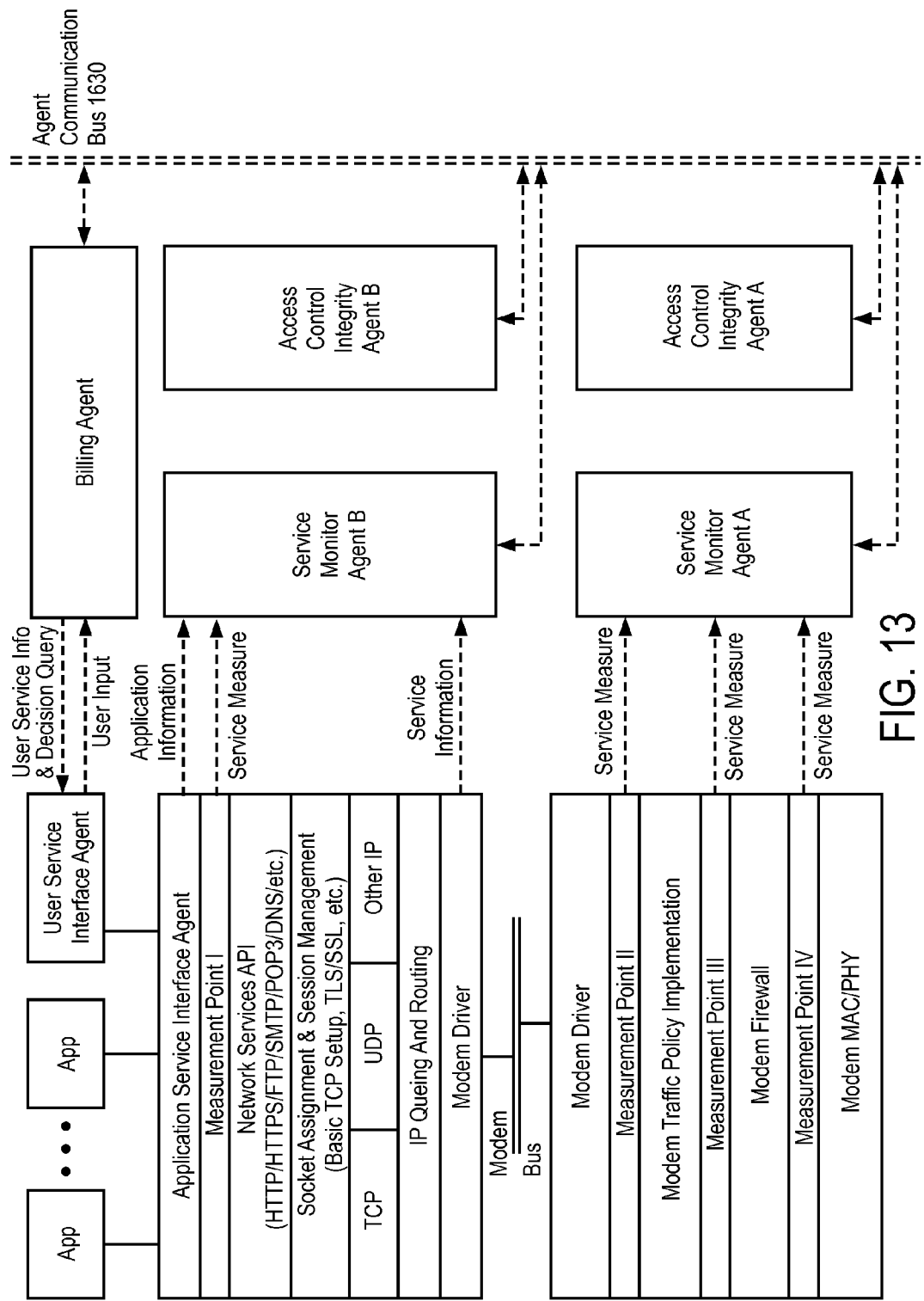
FIG. 13 illustrates another device stack for providing various service usage measurement techniques in accordance with some embodiments.

FIG. 13 illustrates another device stack for providing various service usage measurement techniques in accordance with some embodiments. FIG. 13 illustrates an embodiment similar to FIG. 12 in which some of the service processor is implemented on the modem and some of the service processor is implemented on the device application processor in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 13 are possible where more or less of the service processor functionality is moved onto the modem subsystem or onto the device application processor subsystem. For example, such embodiments similar to that depicted in FIG. 13 can be motivated by the advantages of including some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 13, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 13.

Additional Embodiments of DAS for Protecting Network Capacity

In some embodiments, DAS for protecting network capacity includes classifying a service activity as a network capacity controlled service and implementing a network capacity controlled services policy. In some embodiments, DAS for protecting network capacity includes device assisted/based techniques for classifying a service activity as a network capacity controlled service and/or implementing a network capacity controlled services policy. In some embodiments, DAS for protecting network capacity includes network assisted/based techniques (e.g., implemented on a network element/function, such as a service controller, a DPI gateway, a BTS/BTSC, etc., or a combination of network elements) for classifying a service activity as a network capacity controlled service and/or implementing a network capacity controlled services policy. In some embodiments, DAS for protecting network capacity includes providing a network access API or an emulated or virtual network access API (e.g., such an API can provide network busy state information and/or other criteria/measures and/or provide a mechanism for allowing, denying, delaying, and/or otherwise controlling network access). In some embodiments, DAS for protecting network capacity includes implementing a service plan that includes a network capacity controlled services policy (e.g., for differential network access control and/or differential charging for network capacity controlled services, which can also be based on a network busy state and/or other criteria/measures).

In some embodiments, DAS for protecting network capacity techniques also provide improved user privacy and facilitate network neutrality requirements. In contrast, network based techniques (e.g., DPI based techniques) can give rise to user privacy and network neutrality concerns and problems as discussed above. In some embodiments, DAS for protecting network capacity techniques include allowing a user to specify (e.g., permit or not permit) whether the network is aware of the user's Internet behavior (e.g., using UI input). In some embodiments, DAS for protecting network capacity techniques include allowing a user to select how they want their traffic usage and service plan costs to be managed.

Figure 14:
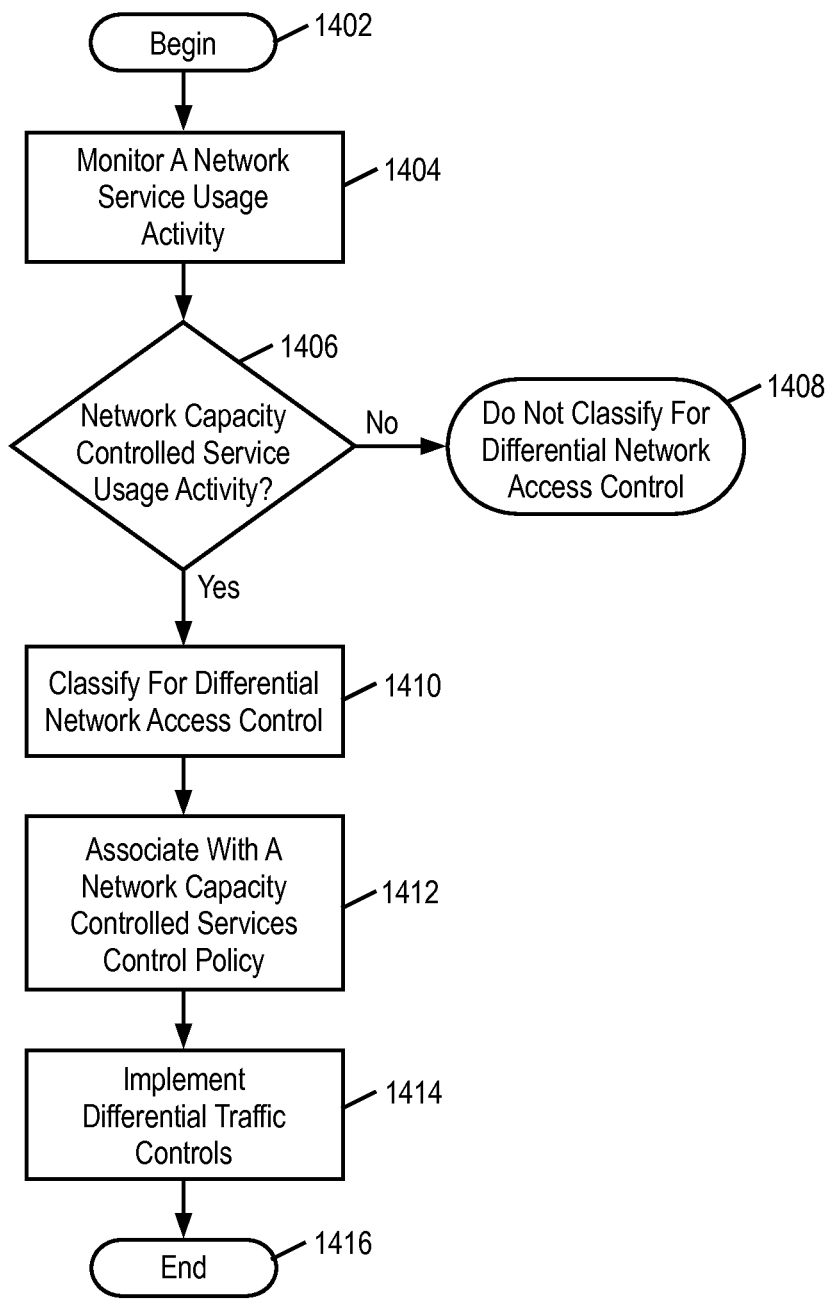
FIG. 14 illustrates a flow diagram for device assisted services (DAS) for protecting network capacity in accordance with some embodiments.

FIG. 14 illustrates a flow diagram for device assisted services (DAS) for protecting network capacity in accordance with some embodiments. At 1402, the process begins. At 1404, monitoring a network service usage activity of a device in network communication (e.g., wireless network communication) is performed. At 1406, whether the monitored network service usage activity is a network capacity controlled service is determined. At 1408 (the monitored network service usage activity was determined not to be a network capacity controlled service), the network service usage activity is not classified for differential network access control. At 1410, (the monitored network service usage activity was determined to be a network capacity controlled service), the network service usage activity is classified (e.g., into one or more network capacity controlled services) for differential network access control for protecting network capacity. In some embodiments, classifying the network service usage activity includes classifying the network service usage activity into one or more of a plurality of classification categories for differential network access control for protecting network capacity (e.g., one or more network capacity controlled service classifications and/or a priority state classification, such as a background services classification and/or a background priority state classification). At 1412, associating the network service usage activity with a network capacity controlled services control policy based on a classification of the network service usage activity to facilitate differential network access control for protecting network capacity is performed. At 1414, implementing differential network access control for protecting network capacity by implementing different traffic controls for all or some of the network service usage activities (e.g., based on a network busy state or another criteria/measure) is performed. At 1416, the process is completed.

Figure 15:
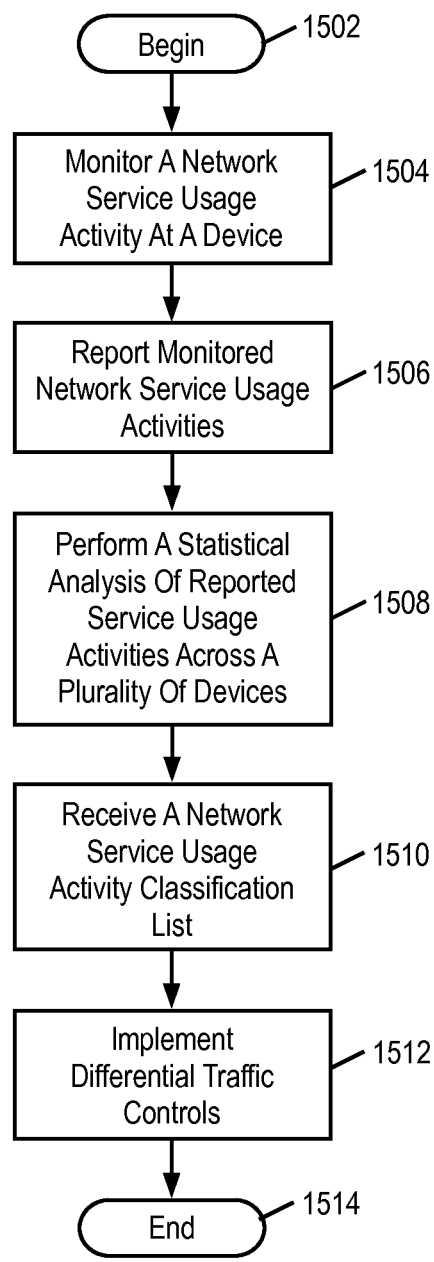
FIG. 15 illustrates another flow diagram for device assisted services (DAS) for protecting network capacity in accordance with some embodiments.

FIG. 15 illustrates another flow diagram for device assisted services (DAS) for protecting network capacity in accordance with some embodiments. At 1502, the process begins. At 1504, monitoring network service usage activities of a device in network communication is performed. At 1506, monitored network service usage activity of the device is reported (e.g., to a network element/function). At 1508, a statistical analysis of a reported network service usage activities across a plurality of devices is performed (e.g., by a network element/function). At 1510, the device receives a network service usage activity classification list (e.g., a network capacity controlled services list, which can be generated, for example, based on the monitored network service usage activities and the statistical analysis as well as other criteria/measures, including, for example, a service plan and/or a network busy state) from the network element. At 1512, implementing differential network access control based on the network service usage activity classification list for protecting network capacity is performed. At 1514, the process is completed. In some embodiments, DAS for protecting network capacity further includes associating the network service usage activity with a network service usage control policy (e.g., a network capacity controlled services policy) based on a classification of the network service usage activity to facilitate differential network access control for protecting network capacity. In some embodiments, DAS for protecting network capacity further includes differentially controlling the network service usage activity (e.g., network capacity controlled service) based on the service usage activity classification list.

Figure 16:
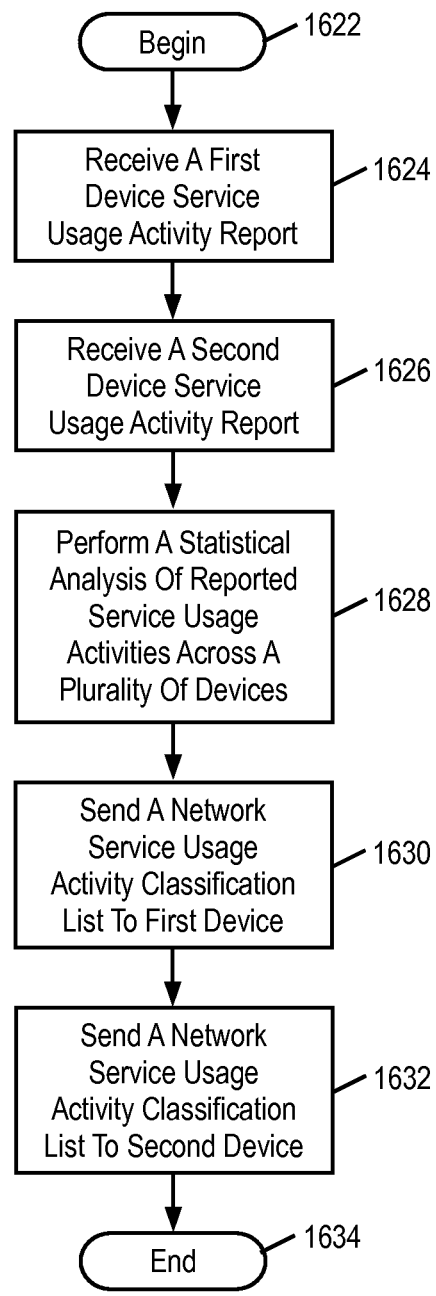
FIG. 16 illustrates another flow diagram for device assisted services (DAS) for protecting network capacity in accordance with some embodiments.

FIG. 16 illustrates another flow diagram for device assisted services (DAS) for protecting network capacity in accordance with some embodiments. At 1622, the process begins. At 1624, a first report of network service usage activity of a first device is received (e.g., at a network element/function) from the first device. At 1626, a second report of network service usage activity of a second device (e.g., at a network element/function) from the second device is received. At 1628, a statistical analysis of a plurality of reported service usage activities across a plurality of devices, including the first device and the second device, is performed (e.g., by a network element/function). At 1630, a network service usage activity classification list (e.g., a network capacity controlled services classification list) is sent to the first device (e.g., from a network element/function) for classifying network service usage activities (e.g., network capacity controlled services) based on the network service usage activity classification list for differential network access control for protecting network capacity. At 1632, a network service usage activity classification list is sent to the second device (e.g., from a network element/function) for classifying network service usage activities based on the network service usage activity classification list for differential network access control for protecting network capacity. At 1634, the process is completed. In some embodiments, DAS for protecting network capacity further includes associating the network service usage activity with a service usage control policy (e.g., a network capacity controlled services policy) based on a classification of the network service usage activity to facilitate differential network access control for protecting network capacity. In some embodiments, DAS for protecting network capacity further includes differentially controlling the network service usage activity (e.g., network capacity controlled service) based on the service usage activity classification list (e.g., network capacity controlled services classification list). In some embodiments, classifying network service usage activities is based on which network to which the device is connected. In some embodiments, the network service usage control policy is based on which network to which the device is connected.

Figure 17:
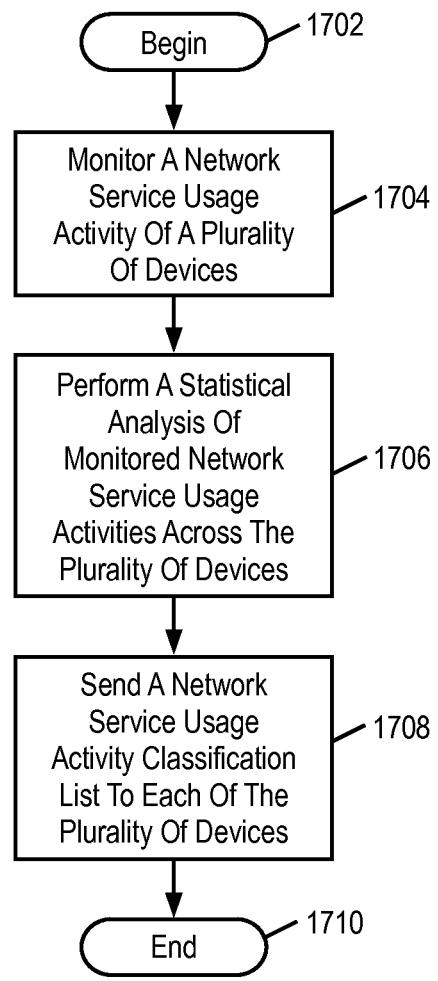
FIG. 17 illustrates another flow diagram for device assisted services (DAS) for protecting network capacity in accordance with some embodiments.

FIG. 17 illustrates another flow diagram for device assisted services (DAS) for protecting network capacity in accordance with some embodiments. At 1702, the process begins. At 1704, monitoring a network service usage activity of a plurality of devices in network communication using network based techniques is performed. At 1706, a statistical analysis of monitored network service usage activities across the plurality of devices is performed. At 1708, a network service usage activity classification list (e.g., a network capacity controlled services classification list) is sent to each of the plurality of devices for classifying network service usage activities (e.g., network capacity controlled services) based on the service usage activity classification list for differential network access control for protecting network capacity. At 1710, the process is completed.

Figure 18:
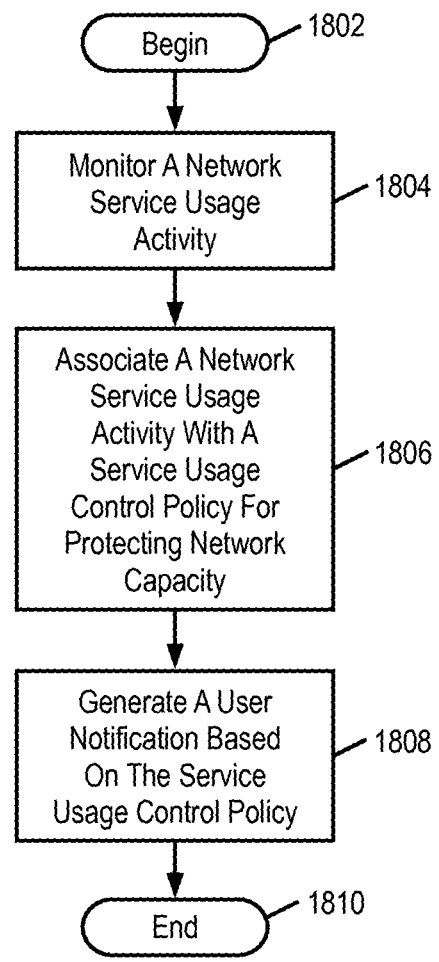
FIG. 18 illustrates another flow diagram for device assisted services (DAS) for protecting network capacity in accordance with some embodiments.

FIG. 18 illustrates another flow diagram for device assisted services (DAS) for protecting network capacity in accordance with some embodiments. At 1802, the process begins. At 1804, monitoring network service usage activities of a device in network communication is performed. At 1806, associating a network service usage activity (e.g., a network capacity controlled service) with a service usage control policy (e.g., a network capacity controlled services policy) based on a classification of the network service usage activity (e.g., a network capacity controlled services classification list) for differential network access control for protecting network capacity is performed. At 1808, a user notification based on the service usage control policy is generated. At 1810, the process is completed.

In some embodiments, the service usage control policy includes a service usage notification policy. In some embodiments, the user notification includes one or more of the following: a notification that the application to be downloaded and/or launched is a network capacity controlled service; a list of one or more service activities (e.g., applications, OS/other software functions/utilities, and/or other functions/utilities as described herein) that have a network capacity controlled services classification; type of service policy in effect for one or more network capacity controlled services; notification that a service activity belongs to a network capacity controlled services class; notification that a service activity that is classified as network capacity controlled service can have the service class changed; notification that if the service class is changed for a service activity the service charges will change; notification that one or more networks are available (e.g., one or more alternative networks and/or network busy state information and/or charging information and/or incentives associated with such networks), a service plan upgrade/downgrade offer/option; and an offer for a service plan that rewards a user that responds to the notification a service plan is lower cost/discounted for responding to notification to use or not to use service activity based on usage level warning notification. In some embodiments, the user notification includes a user preference selection, including one or more of the following: a provision to associate an access policy control with the application (e.g., allow/block, notify of usage, notify of usage at a given threshold, traffic control settings, allow during certain times, allow when network not busy, and/or other policy controls as described herein), an over-ride option for selecting the service usage control policy; a modify option to select the service usage control policy; a select option to select a new service plan (e.g., an option to review and select alternative/new service plan upgrade/downgrade options), and an acknowledgement request (e.g., to confirm/ acknowledge receipt of the notification, in which the acknowledgement can be transmitted to a network element/ function and/or stored locally for later reference/transmission).

In some embodiments, before a given device application, process, function, OS service or other service activity is allowed to start, the intention to start is intercepted by a launch manager, the background service policy set or the network protection service policy set for the service activity is retrieved, and any necessary user notification or service launch control policies are implemented prior to allowing the service activity to launch. In such embodiments, a launch intercept manager may be used to implement this functionality. In some embodiments, this launch intercept manager is provided with a list identifying the service activities (e.g., application identifiers, OS function identifiers, aggregate service activity identifiers, and/or component service activity identifiers) that have a launch control policy in effect. In some embodiments, the list of launch control policies includes blocking or delaying launch of the one or more service activities. In some embodiments, the launch control policy includes a user notification before, during or after the service activity is launched. In some embodiments, the user is informed that a service activity that has a background service control policy in effect or a network protection service control policy in effect is attempting to launch, is about to launch or has launched. In a further set of embodiments, the launch is held up until the user is notified and is allowed to decide if they would like to launch the service activity. In some embodiments, the user notification includes a message that the service activity attempting to launch consumes a large amount of service usage and asks the user if they would like to continue (e.g., "This application consumes a large amount of data, would you like to continue?", "This application consumes data even when you are not using it, would you like to continue?" "This application consumes data while you are roaming which adds cost to your usage bill, would you like to continue?", etc). In some embodiments, the decision on whether or not to launch a service activity is pre-programmed into the list identifying the service activities (e.g., application identifiers, OS function identifiers, aggregate service activity identifiers, and/or component service activity identifiers) that have a launch control policy in effect. In some embodiments a portion of the list is pre-programmed by the user in accordance with user preference for controlling usage of service activities. In some embodiments, a portion of the list is pre-programmed by a network element (e.g., a service controller) in accordance with network background service or network protection service policies specified by a service policy design management system operated by a service provider as described herein. In some embodiments, the policy implementation defined by the list identifying the service activities (e.g., application identifiers, OS function identifiers, aggregate service activity identifiers, and/or component service activity identifiers) that have a launch control policy in effect is verified to ensure that the user or malicious software has not defeated the policy enforcement specified in the list. In some embodiments the list identifying the service activities that have a launch control policy in effect includes launch policies that are a function of one or more of: background service state, network busy state (or performance state or QoS state), type of network the device is connected to, home or roaming connection, time of day or day of week.

In some embodiments, the various design techniques described herein that allow for intercepting a service activity intention to launch, and applying a background service policy set or a network protection service policy set can be designed into the OS itself. For example, the intercept and policy implementation functions can be designed into the activity manager, broadcast intent manger, media service manager, service manager, or other application or service activity management function in the Android OS. One of ordinary skill in the art will recognize that similarly, the various design techniques described herein that allow for intercepting a service activity intention to launch, and applying a background service policy set or a network protection service policy set can be designed into application launch management functions in the iPhone OS, windows mobile OS, windows PC OS, Blackberry OS, Palm OS, and other OS designs.

In some embodiments, the pre-launch user notification information indicates one or more of: typical service usage or cost, or projected service usage or cost for the service activity attempting to launch. In some embodiments, the user sets limitations on access for one or more service activities and once this limit is hit then when the service activities with exceeded limits attempt to launch the user is notified. In some embodiments, the user chooses from a set of service restrictions rather than simply blocking or allowing service activity launch, with example service restrictions including but not limited to: a pre-configured set of restriction policies to chose from (e.g., full access, limited access, highly restricted access or block access), block, throttle, delay, aggregate and hold, limit amount of usage per unit time, cap usage, set limit for additional notification, specify type of network, specify busy state (performance, QoS) or background state, or choose from pre-configured settings options.

In some embodiments, the user notification occurs after the user attempts to download or load an application onto the device (e.g., an application downloaded from the web or an online application store for a smart phone or other wireless/ network computing device, such as an Apple iPhone or iPad, or Google Android/Chrome based device). In some embodiments, the user notification occurs after the user attempts to run the service activity or to initiate usage of a cloud based service/application (e.g., Google or Microsoft cloud service based apps). In some embodiments, the user notification occurs after one or more of the following: the service usage activity hits a usage threshold event, the service usage activity attempts a network service usage that satisfies a pre-condition, an update to a network capacity protection service activity classification list or policy set, and a network message is sent to the device triggering the notification. In some embodiments, the user notification provides information on the service usage activity that is possible, typical, or likely for the service usage activity. In some embodiments, the user notification includes a user option for obtaining more information about the service usage of the service activity (e.g., a message that the service usage activity may result in a high service usage and/or that the service usage activity may or will result in a high service usage as compared in some way to a limit of the current service plan) to make informed user preference settings.

In some embodiments, a user notification includes displaying (e.g., and as applicable, allowing users to provide UI input) one or more of the following: current and/or past/ historical/logged network service usage activity list, current and/or past/historical/logged network capacity controlled service usage activities, current activity policy settings, current or available networks, service plan options (e.g., for how to treat one or more network capacity controlled service traffic types), selection option(s) to assign a network capacity controlled service activity into a different priority traffic control and/or charging buckets, network service usage by activity (e.g., network capacity controlled services and other services), network busy state (e.g., and with resulting policies in force), service activity policy setting vs. busy state and time/day/week, network service activity priority, network service activity usage statistics (e.g., vs. network busy state and/or network service usage control policy state).

In some embodiments, a UI notification is displayed when user attempts a network capacity controlled service activity during a network busy state (e.g., that modifies a network capacity controlled services policy). In some embodiments, the UI notification includes information on service plan choice and a network capacity controlled services policy over-ride option (e.g., one time, time window, usage amount, permanent by activity, and/or all), charging information based on a user selection, and/or service plan upgrade information and options.

In some embodiments, a UI notification is displayed for user input for preferences/configurations for multiple networks (e.g., WiFi, 4G, 3G, and/or other wired or wireless access networks) including charging policy. In some embodiments, a UI notification is displayed when a specified network traffic service usage activity (e.g., based on network capacity controlled services classification, QoS classification, priority classification, time based criteria, network capacity, service plan, charging criteria, and/or other criteria/measures) is being attempted or is occurring and providing options (e.g., allow, block, delay, throttle, and/or other options).

In some embodiments, a UI fuel gauge is displayed (e.g., to depict current and/or historical network service usage, for example, relative to a service plan for the device, by network, relative to network busy state, time based criteria, and/or other criteria/measures). In some embodiments, a user notification includes a communication sent to the user (e.g., an email, SMS or other text message, voice message/call, and/or other electronic form of communication). In some embodiments, the communication sent to the user includes network service usage information, network capacity controlled service usage related information, and/or an instruction to log into a web page or send a communication for more information (e.g., regarding an information update and/or alert or warning message, such as related to network service usage and/or charging for network service usage).

In some embodiments, a notification (e.g., a user or network service cloud notification) is generated based on an aggregate service activity reports usage (e.g., allows network provider to generate user notifications and/or to notify application provider/service activity provider). In some embodiments, a notification (e.g., a user or network service cloud notification) is generated based on a publishing of an updated/new network capacity controlled services list based on an aggregate monitored activity (e.g., based on a service plan, velocity, sockets opening frequency/rate (e.g., messaging layer behavior), total data usage, peak busy time usage to formulate or update black list for monitoring, notifying, and/or controlling, which can be applied to one, multiple, group, or all devices). In some embodiments, a notification (e.g., a user or network service cloud notification) is generated based on data usage trends for particular device relative to an associated service plan and/or other comparable devices or data usage thresholds/statistical based data usage measures.

In some embodiments an application is actually composed of several component applications, processes or functions. Examples of this include but are not limited to: the components of a Java application JAR file; applications that use OS functions; applications that use a proxy service function; applications, functions or processes that coordinate with one another to implement a composite process, function or application; and OS process functions that support an application or overall OS function. In such embodiments it is important to be able to categorize all applications, functions and processes on a device that contribute to the service usage of a service activity so that the service activity can be monitored for service usage, have the service usage accounted for, implement the appropriate user notification when one or more service activity components attempts to start or use the network, implement the appropriate user notification when one or more service activity components reaches a pre-determined service usage level that requires user notification, and implement the appropriate background service or network protection service usage controls as specified herein ((including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein). In the case of service activity components that belong exclusively to one aggregate service activity (e.g., an application, application JAR file or OS function), this may be accomplished by including each of the component service activities on a list that identifies the service activity components that belong to the aggregate service activity, and then monitoring, possibly controlling and providing user notifications based on the aggregate or component behavior of each service activity in accordance with the policies specified for the aggregate service activity. For example, it is necessary to group all application launch behavior and/or network access behavior under the monitoring, launch, notification, accounting and background service controls or network protection service controls (or other background or network protection service policies as specified herein) in accordance with the background service or network protection service policies for the aggregate application that the JAR file supports. As another example, if an OS network synch or update function utilizes various software components or processes to implement the network synch or update function, then each of the software components or process must be monitored and aggregated under the background service policies or network protection service policies for the aggregate OS synch or update function.

In some embodiments, this ability to group usage for a related set of service activity components dedicated to an aggregate service activity as described herein is used to improve usage reporting of service activities to a service controller for the purpose of statistically identifying service activities that are candidates for background service policy controls or network protections service policy controls.

In some cases, multiple applications, processes, functions, OS services or other service activities can utilize a common set of component software applications, processes, functions or OS services. In such cases, in order to implement background service policies and/or network protection service policies for service activity monitoring and accounting, service activity launch control, user notification, or network access control as described herein, it is necessary to associate the specific network access data or information flows to and from the common component software applications, processes or functions that belong to the specific initiating application, process, function or other service activity that is to be managed according to a background service or network protection service policy set. In what follows, a specific set of examples is provided on how to map common component service activity for a set of common OS functions referred to as proxy service functions to a specific application, process, function, OS service or other service activity for the purpose of implementing a background service policy set or a network protection service policy set as described herein. Once these examples are reviewed, it will be obvious to one of ordinary skill in the art how to apply similar mapping of service activity for a common set of components to a service activity that is to be managed in accordance with a background service policy set or a network protection service policy set as described herein.

In some embodiments, this ability to group usage for a common set of service activity components as described herein is used to improve usage reporting of service activities to a service controller for the purpose of statistically identifying service activities that are candidates for background service policy controls or network protections service policy controls.

In some embodiments, a proxy network service manager refers to an intermediary data flow function in a device operating system that sits on a data path between a device application and a device networking stack interface to provide a level of network service abstraction from the network stack interface, a higher level service function above the network stack interface, enhanced or special traffic processing functions, media service transfer management, file download service, HTTP proxy service functions, QoS differentiation, or other similar or related higher level traffic processing. Example Proxy Service Managers include the following: media service manager (e.g., android media service library function), email service manager, DNS function, software download service manager, media download manager (e.g., audio player, streaming media player, movie downloader, media service OS function, etc.), data download service manager, Android "media" library function, Android.net library function, Jave.net library function, Apache library function, other similar software/library functions or services in other device operating systems, SMTP/IMAP/POP proxy, HTTP proxy, IM proxy, VPN service manager, SSL proxy, etc. Herein these alternative network access data flows that are initiated by an application are termed application proxy service flows. In such embodiments an app can sometimes simply request a network access service activity from an OS component such as a proxy service component rather than directly accessing the network. In such embodiments, in order to implement background service controls or user notification of application service usage, it is necessary to monitor the application proxy service flows, classify them as being initiated by or belonging to a particular application or service activity, and implement the proper background service classifications, user notifications, application process launch intercept, background service accounting, and background service usage restrictions as described herein in accordance with the policies intended for the initiating application or service activity. This is accomplished by inserting service usage monitors that allow a mapping of (i) the initiating application identifier (e.g., app name, app fingerprint, application identification tag, application process number, application credential, or other secure or non-secure application or process identifier) to (ii) the request to the proxy service and subsequently to (iii) the network service flows between the proxy service and the network elements that service the information communications. Once this mapping is accomplished, the service usage flows of the proxy service can then be accounted back to the initiating application, device software process or other service activity, the proper policies can then be applied to each service usage flow for user notification, service activity launch control, service activity background accounting (including variable charge rating dependent on background service state and/or sponsored service charging), service activity background service controls or network usage restrictions as described herein (including but not limited to for example: block network access, restrict network access, throttle network access, delay network access, aggregate and hold network access, select for time of day network access restrictions, select network type restrictions, select roaming network access restrictions, select service usage restrictions such as a usage limit, select service cost restrictions such as a cost limit or otherwise place on another form of background service status or network usage restriction as described herein).

In some embodiments, this ability to track service usage for an service activity through a proxy service as described herein is used to improve usage reporting of service activities to a service controller for the purpose of statistically identifying service activities that are candidates for background service policy controls or network protections service policy controls.

In some embodiments, the various design techniques described herein that allow for monitoring, accounting for and/or implementing service policy for component service activities that belong to an aggregate service activity can be designed into the OS itself. For example, in certain current mobile OS implementations (e.g., Android, iPhone, Blackberry, etc) there are some applications available in the market that allow a user to get an estimate for how much data a certain subset of applications are consuming on a wireless service provider network, but it is not possible for the user or application to get an indication of the service usage for certain OS functions, whereas the embodiments disclosed herein will allow for this. As another example, in certain current mobile OS implementations it is not possible to associate proxy service usage (e.g., media download and media streaming proxy library software functions) with the specific applications that use the proxy service, so while the user can be informed of generic common OS functions or proxy services (e.g., in the case of Android: "media service," "media," "gallery," "Google service framework" and other generic common OS software library functions or proxy services), there is no way for the user to determine what applications widgets or other service activities are actually generating this common service function usage, whereas the invention described herein permits the user full visibility on such usage monitoring examples. Furthermore, if the OS is retrofitted with the intercept and policy implementation functions can be designed into the activity manager, broadcast intent manger, media service manager, service manager, or other application or service activity management function in the Android OS. One or ordinary skill in the art will recognize that similarly, the various design techniques described herein that allow for intercepting a service activity intention to launch, and applying a background service policy set or a network protection service policy set can be designed into application launch management functions in the iPhone OS, Windows mobile OS, Windows PC OS, Blackberry OS, Palm OS, and other OS designs.

Figure 19:
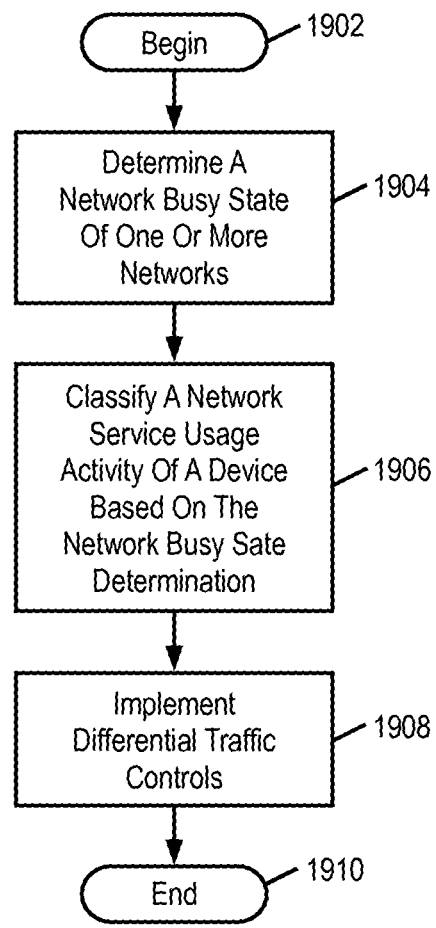
FIG. 19 illustrates another flow diagram for device assisted services (DAS) for protecting network capacity in accordance with some embodiments.

FIG. 19 illustrates another flow diagram for device assisted services (DAS) for protecting network capacity in accordance with some embodiments. At 1902, the process begins. At 1904, determining a network busy state of one or more networks is performed. In some embodiments, the one or more networks are selected from an access network, a wired network, and a wireless network. At 1906, classifying a network service usage activity (e.g., a network capacity controlled service) of a device based on the network busy state determination is performed to facilitate differential network access control for protecting network capacity of the one or more networks. In some embodiments, the network busy state is based on one or more of the following: network performance, network congestion, network availability, network resource availability, network capacity, or any other network service usage measure, and one or more time windows (e.g., time based criteria). In some embodiments, protecting network capacity of the one or more networks includes protecting network capacity of a last edge segment of a wireless network (e.g., RAN, BTS, BTSC, and/or other network elements). In some embodiments, the determining and classifying are performed using device assisted/based techniques. In some embodiments, the determining and classifying are performed using network assisted/based techniques (e.g., implemented on a network element/function, such as a service controller, a DPI gateway, a BTS/BTSC, etc., or a combination of network elements). In some embodiments, the determining and classifying are performed using a combination of device assisted/based techniques and network assisted/based techniques. At 1908, implementing differential traffic controls is performed based on the service usage activity classification for protecting network capacity. At 1910, the process is completed. In some embodiments, a network busy state is determined based on one or more of the following: a time of day, a network reported busy state, and/or a device (e.g., near-end and/or far-end) determined/reported network busy state. In some embodiments, a network busy state is determined using one or more of the following: a network probe, a device query, a network probe report (e.g., including a BTS and/or BTSC), a network probe analysis, a device analysis based on performance of native traffic without probe such as TCP timeout, UDP retransmissions, a multiple network test, a device monitored network congestion based on network service usage activity (e.g., application based network access performance data) performed for a network to which the device is connected and/or one or more alternative networks. In some embodiments, a network congestion state is associated with a network busy state (e.g., a network busy state setting/level). For example, a network congestion level of 40% of network usage can be associated with a network busy state setting of 4, a network congestion level of 80% of network usage can be associated with a network busy state setting of 8, and so forth.

Figure 20:
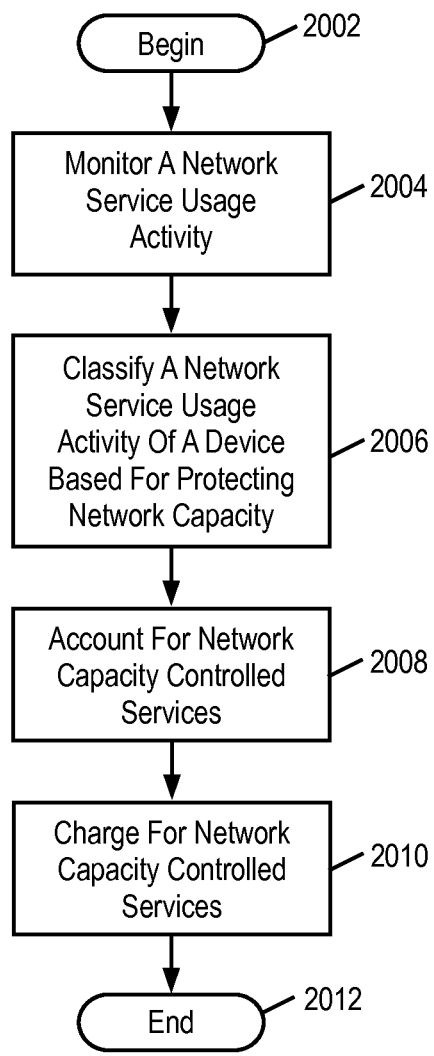
FIG. 20 illustrates another flow diagram for device assisted services (DAS) for protecting network capacity in accordance with some embodiments.

FIG. 20 illustrates another flow diagram for device assisted services (DAS) for protecting network capacity in accordance with some embodiments. At 2002, the process begins. At 2004, monitoring a network service usage activity of a device in network communication is performed. At 2006, classifying the network service usage activity (e.g., based on a classification of the network service usage activity for protecting network capacity, for example, as a network capacity controlled service) for protecting network capacity is performed. At 2008, accounting for network capacity controlled services (e.g., accounting for the network service usage activity based on a classification of the network service usage activity for protecting network capacity) is performed. At 2010, charging for network capacity controlled services is performed. At 2012, the process is completed. In some embodiments, DAS for protecting network capacity further includes classifying the network service usage activity as a network capacity controlled service. In some embodiments, DAS for protecting network capacity includes differentially accounting and/or differentially charging for network capacity controlled services and foreground services. In some embodiments, the network service usage control policy includes policies for differentially controlling, accounting, and/or charging for network capacity controlled services (e.g., based on a network busy state, a time based criteria, a service plan, network to which the device or network service usage activity is gaining access from, and/or other criteria/measures). In some embodiments, accounting for network capacity controlled services includes differentially collecting service usage for one or more network capacity controlled service classes in which the accounting is modified/varies (e.g., dynamically) based on one or more of the following: network busy state (e.g., modify/credit accounting during network congestion not satisfying the user preference), network service activity, access network (e.g., the network to which the device/service activity is currently connected), user preference selection, time based criteria (e.g., current time of day/day of week/month), associated service plan, option to time window. In some embodiments, charging for network capacity controlled services includes mapping an accounting to a charging report. In some embodiments, charging for network capacity controlled services includes sending the charging report to a network element (e.g., a service controller, a service cloud, a billing interface/server, and/or another network element/function). In some embodiments, charging for network capacity controlled services includes mediating or arbitrating CDRs/IPDRs for network capacity controlled service(s) vs. other network service usage activities or bulk network service usage activities. In some embodiments, charging for network capacity controlled services includes converting a charging report to a billing record or billing action. In some embodiments, charging for network capacity controlled services includes generating a user notification of network capacity controlled service charges upon request or based a criteria/measure (e.g., a threshold charging level and/or a threshold network service usage level). In some embodiments, charging for network capacity controlled services includes charge by application based on a charging policy (e.g., bill by application according to billing policy rules, such as for billing to a user or to a sponsored service provider, carrier, and/or other entity).

Figure 21:
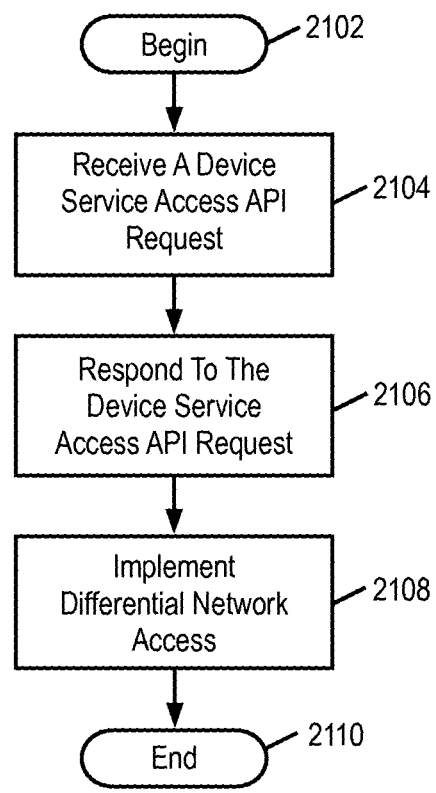
FIG. 21 illustrates another flow diagram for device assisted services (DAS) for protecting network capacity in accordance with some embodiments.

FIG. 21 illustrates another flow diagram for device assisted services (DAS) for protecting network capacity in accordance with some embodiments. In some embodiments, DAS for protecting network capacity includes providing a device service access API that provides an interface for applications, OS functions, and/or other service usage activities to a network access connection (e.g., or stack) for providing differential network access for protecting network capacity. In some embodiments, the differential network access is determined by one or more of the following: a service priority of the service usage activity and a network busy state. At 2102, the process begins. At 2104, a device service access API request is received. At 2106, the device service access API request is responded to. In some embodiments, the differential network access (e.g., for network capacity controlled services and/or based on network busy state and/or other criteria/measures) is implemented by one or more of the following: providing network busy state information to the service usage activity, receiving network busy state information, receiving network capacity demands for the service usage activity, receiving a scheduled time/time slot demand from the service usage activity, receiving and/or providing network location and/or physical location information (e.g., base station, communication channel, cell sector, roaming or non-roaming network to which the device is connected, and/or GPS or other physical location data), providing information to the service usage activity informing it when it is allowed to access the network, providing information to the service usage activity informing it what traffic controls must be applied/implemented, providing information to the service usage activity informing it when the network is available to it for access, and providing information to the service usage activity of its scheduled access time/time slot (e.g., based on one or more of the following: priority, network busy state, and time of day) (e.g., with a specified performance level or service level, such as data transfer size, speed, network capacity controlled service priority level, QoS level, data transfer type, scheduling time(s), and/or network connection parameters), and instructing the device and/or service usage activity to transition to a different state (e.g., power save state, sleep state dormant, idle, wait state, and/or an awake state). At 2108, differential network access is implemented. At 2110, the process is completed. In some embodiments, the device service access API is a programmatic interface, a virtual interface, and/or an emulated interface that provides instructions for differential access to a network to protect network capacity, as described herein.

In some embodiments, the API is served or located on the device, on a network element (e.g., using a secure communication between the device and the network element for the API communication, such as HTTPS, TLS, SSL, an encrypted data connection or SS7 control channel, and/or other well known secure communication techniques), and/or both/partly in both. In some embodiments, a network based API is an API that facilitates an API or other interface communication (e.g., secure communication as discussed above) between an application executing on the device and a network element and/or service cloud for protecting network capacity. For example, a network API can provide an interface for an application to communicate with a service cloud (e.g., network server) for obtaining network access control information (e.g., network busy state, multiple network information based on available networks and/or network busy state information of available networks, network capacity controlled service priorities and availability, scheduled time/time slots for network access based on network busy state, service plan, network capacity controlled service, and/or other criteria/ measures). As another example, a network API can facilitate an application provider, central network/service provider, and/or a third party with access to communicate with the application to provide and/or request information (e.g., physical location of the application, network location of the application, network service usage information for the application, network busy state information provided to the application, and/or other criteria/measures). As yet another example, a network API can facilitate a broadcast to one or more applications, OS functions, and/or devices (e.g., partitioned based on geography, network, application, OS function, and/or any other criteria/measure) with network capacity related information (e.g., network busy state, availability based on network capacity controlled service classification and/or priority level, scheduled time/time slots for certain network capacity controlled service classification and/or priority level, emergency/high priority software/antimalware/vulnerability update and scheduled time/time slots for such software updates, and/or other criteria/measures). In some embodiments, the network access API for protecting network capacity is an open API or standard/required API (e.g., required or standardized for applications for a certain network service provider, such as to be provided via the Verizon application store or the Apple AppStore) published for application and OS developers so that the applications and OS functions are designed to understand and implement the network access API for protecting network capacity. For example, a certification program can be established to provide application and OS developers with test specifications, working implementations, and/or criteria to make sure the network access API is properly implemented and is functioning in accordance with the specified requirements. In some embodiments, the network access API is an interface for communication with a service controller (e.g., service controller 122) or another network element/function (e.g., a service usage API for communication with a service usage server or billing interface/ server or another network element/function that facilitates a secure communication for sending/receiving or otherwise communicating network access related information for protecting network capacity). In some embodiments, the network API provides for sponsored billing (e.g., reverse billing) of all, classified, and/or a subset of network service usage charges to a sponsored partner associated with the network service usage activity (e.g., application) that accesses the network API. In some embodiments, the network API provides for a sponsored service in which the network service usage activity (e.g., application) that accesses the network API provides a sponsored service partner credential to the network API, the credential is used as a billing mechanism to charge the sponsored partner, the user account is mediated to remove the sponsored partner charge, and the network API provides access service and/or information service (e.g., location information, local information, content information, network information, and/or any other information).

Figure 22:
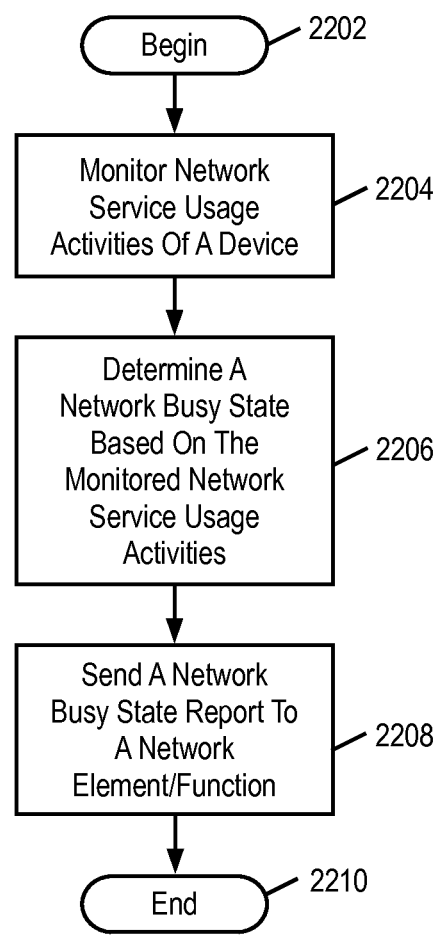
FIG. 22 illustrates another flow diagram for device assisted services (DAS) for protecting network capacity in accordance with some embodiments.

FIG. 22 illustrates another flow diagram for device assisted services (DAS) for protecting network capacity in accordance with some embodiments. At 2202, the process begins. At 2204, network service usage activities of a device are monitored (e.g., using a verified/verifiable service processor). At 2206, a network busy state (e.g., a measure of network capacity, availability, and/or performance) is determined based on the monitored network service usage activities (e.g., using various techniques as described herein). In some embodiments, a service processor on the device is used to determine (e.g., measure and/or characterize) a network busy state experienced by the device (e.g., which can be used to determine the network access control policy for one or more network capacity controlled services). At 2208, a network busy state report is sent to a network element/function (e.g., a service controller and/or another network element/function as described herein). At 2210, the process is completed. In some embodiments, the service processor is verified using various techniques described herein. In some embodiments, the network busy state report includes one or more of the following: data rate, latency, jitter, bit error rate, packet error rate, number of access attempts, number of access successes, number of access failures, QoS level availability, QoS level performance, and variability in any of the preceding parameters. In some embodiments, the network busy state report includes one or more of the following: base station ID, cell sector ID, CDMA ID, FDMA channel ID, TDMA channel ID, GPS location, and/or physical location to identify the edge network element that is associated with the network busy state report to a network element. In some embodiments, the monitoring of network service usage activities includes measuring the network performance for traffic the device is transmitting/ receiving and/or generating network performance testing traffic. In some embodiments, the network busy state is collected (e.g., and/or used to assist, supplement, and/or verify device based network busy state measures) by one or more network elements that can measure and/or report network busy state (e.g., BTS, BTSC, base station monitor, and/or airwave monitor). For example, airwave monitors and/or base station monitors can be provided to facilitate a reliable characterization of network busy state in a coverage area of one or more base stations and/or base station sectors, such as affixed mobile terminals (e.g., trusted terminals that can include additional network busy state monitoring and/or reporting functionality) installed (e.g., temporarily or permanently) in the coverage area of one or more base stations and/or base station sectors (e.g., in which a sector is the combination of a directional antenna and a frequency channel) so that the affixed mobile terminals perform network busy state monitoring and reporting to the service controller, the local base station, and/or other network element(s)/function(s) as similarly described herein. In some embodiments, the permanently affixed mobile terminals provide network monitors for reporting, for example, network busy state, to a central network element, such as the service controller, which can, for example, aggregate such network busy state information to determine network busy state for one or more network coverage areas. In some embodiments, the permanently affixed mobile terminals are always present in these locations where installed and always on (e.g., performing network monitoring), and can be trusted (e.g., the permanently affixed mobile terminals can be loaded with various hardware and/or software credentials). For example, using the permanently affixed mobile terminals, a reliable characterization of network busy state can be provided, which can then be reported to a central network element and aggregated for performing various network busy state related techniques as described herein with respect to various embodiments. In some embodiments, the network element/function uses the network busy state report (e.g., and other network busy state reports from other devices connected to the same network edge element) to determine the network busy state for a network edge element connected to the device. In some embodiments, network element/function sends a busy state report for the network edge element to the device (e.g., and to other devices connected to the same network edge element), which the device can then use to implement differential network access control policies (e.g., for network capacity controlled services) based on the network busy state. In some embodiments, a network busy state is provided by a network element (e.g., service controller or service cloud) and broadcast to the device (e.g., securely communicated to the service processor).

FIG. 23 illustrates a network capacity controlled services priority level chart for device assisted services (DAS) for protecting network capacity in accordance with some embodiments. In some embodiments, various applications, OS functions, and/or other utilities/tools installed/loaded onto and/or launched/executing/active on a communications device (e.g., device 100) are classified as network capacity controlled services for protecting network capacity. In some embodiments, one or more of the network capacity controlled services are assigned or classified with network capacity controlled service levels or priority levels for protecting network capacity. In some embodiments, one or more of the network capacity controlled services are dynamically assigned or classified with network capacity controlled service levels or priority levels based on one or more criteria/measures (e.g., dynamic criteria/measures), such as network busy state, current access network, time based criteria, an associated service plan, and/or other criteria/measures. In some embodiments, a higher priority level means that the application or utility/function is granted higher relative priority for network access (e.g., a priority level 10 can provide for guaranteed network access and a priority level 0 can provide a blocked network access, while priority levels between 1 through 9 can provide relatively increasing prioritized network access potentially relative to allocated network access and other services requesting network access).

As shown in FIG. 23, the network capacity controlled services are dynamically assigned or classified with network capacity controlled service levels or priority levels based on the network busy state of the current access network. For example, an email application, Microsoft Outlook, is assigned different priority levels for protecting network capacity based on the network busy state, as shown: a priority level 6 for a network busy state (NBS) level of 10% (e.g., up to about 10% of the network capacity is being utilized based on current or recently/last measured/detected/determined network capacity/resources usage using various techniques as described herein), a priority level 5 for a network busy state (NBS) level of 25%, a priority level 4 for a network busy state (NBS) level of 50%, a priority level 3 for a network busy state (NBS) level of 75%, and a priority level 2 for a network busy state (NBS) level of 90%. As also shown, an antivirus (AV) software update application/utility/function is assigned different priority levels for protecting network capacity based on the network busy state: a priority level 9 for a network busy state (NBS) level of 10%, a priority level 7 for a network busy state (NBS) level of 25%, a priority level 5 for a network busy state (NBS) level of 50%, a priority level 3 for a network busy state (NBS) level of 75%, and a priority level 1 for a network busy state (NBS) level of 90%. Various other applications and utilities/functions are shown with various priority level assignments/classifications based on the network busy state levels shown in the network capacity controlled services priority level chart of FIG. 23. As will be apparent to one of ordinary skill in the art, various assignments and/or techniques for dynamically assigning priority levels for network access based on network busy state levels can be applied for protecting network capacity (e.g., based on user preferences, service plans, access networks, a power state of device, a device usage state, time based criteria, and various other factors such as higher priority for urgent software and/or security updates, such as a high priority security or vulnerability software patch or update, and/or urgent or high priority emails or other communications, such as a 911 VOIP call).

Referring again to FIGS. 1 through 3, DAS for protecting network capacity is implemented using a service processor (e.g., a service processor 115) of the device (e.g., a device 100) using various DAS techniques as described herein to facilitate differential network service access control (e.g., for network capacity controlled services) to assist in protecting network capacity in accordance with some embodiments. In some embodiments, the service processor and/or one or more agents of the service processor is/are verified using one or more of the following verification techniques (e.g., and/or to specifically verify monitoring the network service usage activity, classifying one or more service activities into one or more network capacity controlled service classes, associating the one or more network capacity controlled service classes with one or more differential service activity policies, and/or determining a network busy state): compare a network based service usage measure with a service policy and/or service plan associated with the device, compare a device assisted service usage measure with the service policy and/or service plan associated with the device, compare the network based service usage measure to the device assisted service usage measure, compare a first device assisted service usage measure to a second device assisted service usage measure, verify presence of the service processor and/or one or more agents of the service processor, verify configuration of the service processor, verify service usage activities are reported properly (e.g., using test service usages to generate service usage events/reports for analysis and confirmation), verify billing events are reported properly, compare the network based service usage measure with reported device billing data, verify reporting of a test billing event, verify reporting of the communications device reports billing events from a transaction server, verify presence of an activation tracking system, verify device configuration or operation, verify device standing or service plan standing, verify proper operation of the service processor, verify service processor heartbeat response reports, verify monitoring of a test service event, download a new service processor (e.g., and/or one or more agents or new configuration settings of the service processor) and perform integrity checks, verify a service processor code configuration with agent self-diagnosis checks, verify that the communications device uses the first service only after being authorized, verify user standing, verify a network busy state (e.g., compare and/or statistically process network busy state measures from more than one device in which the network busy state monitoring apparatus, for example, is located in a secure execution environment on the device), verify various differential network access control implementations (e.g., network capacity controlled services are properly monitored/determined/detected, controlled, accounted for, and/or charged for), verify various QoS implementations (e.g., as discussed above), and verify an agent communications log. Various other verification techniques are described herein and similar and other verification techniques for providing DAS for protecting network capacity using device based implementations (e.g., service processors and/or other device based agents or software/hardware techniques) will now be apparent to one of ordinary skill in the art in view of the various embodiments described herein.

In some embodiments, the service processor is secured using various hardware and software techniques described herein, including, for example, implementing all and/or portions of the service processor in a secure virtual machine, protected execution environment, secure storage (e.g., secure memory), secure modem, and/or other secure implementation techniques as described herein and/or other or similar techniques as will now be apparent to one of ordinary skill in the art in view of the various embodiments described herein. For example, the service processor can be implemented in software and executed in a protected area of an OS executed on the device and/or executed in protected execution partitions (e.g., in CPU, APU, SIM chipset, modem, modem secure execution partition, SIM, other hardware function on the device, and/or any combination of the above).

In some embodiments, a network service usage counter is embedded into a secure execution environment (e.g., a program store in secure non-volatile memory located on a modem card and/or a modem chip not accessible by device applications, secure CPU environment for executing program and/or secure program operation for data path monitoring and/or control that cannot be bypassed by device applications to get to the modem connection to the network) in a device modem (e.g., using measurement points V, VI, and/or other measurement points of FIG. 12). In some embodiments, the service usage counter counts data traffic (e.g., bytes and/or any other measure of service usage, such as file transactions, message transactions, connection time, time of connection or duration of connection, and/or traffic passed or transactions passed for a given QoS or network capacity controlled service priority level), traffic as a function of time, traffic according to a network service activity classification (e.g., by application, destination/source, port, traffic type, content type, time of day, network busy state, and/or any other criteria/measure). In some embodiments, the service usage counter counts data traffic (e.g., as discussed above) while coordinating with a VPN layer established, for example, for both layer-III (e.g., IPSEC) and layer-II (e.g., L2TP tunnel) so that precise over the air service usage measure is counted for billing mediation and/or network service usage charging (e.g., customer billing, sponsored service bill by service and/or any other charging or billing). In some embodiments, the service usage counter counts data traffic (e.g., as discussed above) while coordinating with accelerator software (e.g., a compression/decompression engine) which transforms frames for more efficient over the air transmission. As similarly discussed above, service processor coordination with the accelerator layer facilitates a precise over the air service usage measure for billing mediation and/or network service usage charging. In some embodiments, the service usage counter counts data traffic (e.g., as discussed above) while coordinating with both the VPN layer and accelerator software layer to facilitate a precise over the air service usage measure for billing mediation and/or network service usage charging.

In some embodiments, the service usage counter reports the service usage to a network element (e.g., a service controller, charging gateway, PCRF, AAA, HA, billing system, mediation system, traffic accounting database, base station or base station controller, and/or another network element/function or central network element/function). In some embodiments, the information reported to the network element is encrypted or signed with a corresponding key known by the network element. In some embodiments, the communication link to the network element to pass the service usage count is conducted over a wireless network specific channel such as SMS, MMS, SS-7, or another specialized control channel. In some embodiments, the communications link to the network element to pass the service usage count is conducted over a network channel (e.g., via IP, TCP, UDP, HTTP, HTTPS, TLS, SSL, point to point signed variants of TLS or SSL, or another data network channel via the network control channel connection to the device). In some embodiments, the data network control channel traffic is injected into the PPP stream at the modem. In some embodiments, the data network control channel traffic is passed up to the device networking stack for connection to the network. In some embodiments, a signed or encrypted service usage count from the modem subsystem is coordinated to provide a service usage count for a time period that also corresponds to a similar time period for a service processor heartbeat report that includes a service usage measure or count. For example, this provides the service controller or another network element with a secondary set of information that can be used to verify and/or secure the service usage measures reported by the service processor. Various techniques can be used to synchronize the time period for the modem service usage count and the service processor service usage count. For example, the service processor can request a latest count message from the modem, in which the modem counts all service usage since the previous request for latest count until the present request for latest count, encrypts the latest count message so that the service processor or other application software or OS software on the device cannot decode and/or tamper with the message, and the modem service usage counter then passes the encrypted message to the service processor. The service processor can then pass the encrypted service usage count message from the modem to the service controller along with the service processor service usage accounting message(s) for the same or similar time period. The service controller can then decode both service count messages from the secure modem subsystem and the service processor and correlate the two measures to verify the service usage reporting by, for example, looking for discrepancies that would indicate service usage control or charging errors or device service processor tampering. In some embodiments, the secure modem subsystem records byte counts for streams (e.g., and/or flows, socket connections, or combinations of IP destination/source/ports), potentially along with time of day, network busy state, QoS level, and/or other criteria/measures, and reports these counts for each stream that had traffic activity during the current reporting interval. For example, the service controller can then correlate the stream service usage information with the service usage information provided by the service processor heartbeat service usage report to verify that the service processor service usage report is consistent with the independent measure made in the modem subsystem. In some embodiments, service usage reports (e.g., certified service usage reports) are correlated on the device and/or in the network (e.g., using one or more network elements/functions, such as the service controller).

In some embodiments, a deeper analysis of traffic can be conducted in the modem subsystem service usage count. For example, a layer 7 analysis of the service usage can be conducted for HTTP or HTTPS traffic flowing through the modem in which the modem subsystem service usage counter performs an HTTP level analysis of the traffic to associate web traffic gets and other transfers with a given higher level service classification (e.g., ad server, content server, proxy server, and/or traffic that is referred by the local host serving up a web page). In some embodiments, the modem subsystem service usage count can be augmented for HTTPS, SSL or TLS traffic by including a trusted proxy server embedded in the modem system. For example, the proxy server can be trusted by the device stack so that the encryption keys for HTTPS, TLS or SSL are known by the proxy server allowing the modem based proxy server, located, for example, in a secure execution environment, to perform layer 7 analysis of encrypted traffic in a manner similar to that described above. In some embodiments, the embedded proxy server generates server SSL certificates for each connection to a specific remote host in real time based on a root certificate trusted by the device (e.g., and/or by network service usage activity, such as by application) and also trusted by the embedded proxy server, and the proxy server then becomes a middle man emulating a remote SSL host on one side and emulating the device (e.g., and/or network service usage activity, such as application) on the other side, decrypting the traffic, analyzing it and re-encrypting before forwarding to and from the remote host. Similarly, as in the case of layer 3 and 4 traffic analysis performed by the modem service usage counting subsystem, the layer 7 service usage count messages can be encrypted and passed to the service controller via various channels. In some embodiments, the layer 7 modem subsystem service usage counting system records service usage counts for a reporting time period that is similar to the reporting time period used by the service processor so that the service controller can correlate the service processor accounting messages against the modem accounting messages with layer 7 information.

In some embodiments, the secure service usage reporting system elements are located in a secure execution environment that includes the modem driver. In some embodiments, all traffic that gets to the modem for the network traffic being controlled or accounted for is required to go through the secure modem driver so that an independent count can be generated and reported to the service controller as described above without the need to embed the secure service usage counting and reporting elements in the modem.

In some embodiments, the secure service usage reporting system elements are located in a secure execution environment that includes the modem driver and modem hardware interface controller driver (e.g., USB controller for 2/3/4G and SDIO controller for WiFi). In some embodiments, all traffic that gets to the modem for the network traffic being controlled or accounted for is required to go through the secure modem driver and modem hardware interface controller driver (e.g., USB controller for 2/3/4G and SDIO controller for WiFi) so that precise count can be generated by either the modem driver and/or modem hardware interface controller driver (e.g., USB controller for 2/3/4G and SDIO controller for WiFi) and passed to the secure service usage reporting element to send it to the service controller for customer charging/billing. This scheme provides flexibility (e.g., most of the device software and operation system and its services/applications need not be located/executed in the secure execution environment) while ensuring usage counting to occur securely as it pertains to the customer accounting and billing.

In some embodiments, the layer 7 proxy server traffic accounting and reporting techniques used for processing HTTPS, TLS, and SSL traffic, as discussed above, are also used in the service processor itself to allow a detailed accounting of encrypted layer 7 traffic by the device. In some embodiments, the information thus obtained is filtered so that private user information is not transmitted to the network (e.g., service controller, PCRF, and/or any other network element/function) but only service usage information sufficient to allow for accounting of service plan usage, to verify service control policy implementation, or to verify service charging policy implementation is transmitted to the network (e.g., service controller, PCRF, and/or any other network element/function). In some embodiments, the layer 7 proxy server for processing secure or in the clear device service usage accounting messages is located in secure hardware execution environments in the device application processor or within secure software partitions in the operating system.

Various techniques can be used to verify and/or secure service usage controls or service usage charging reports. For example, if the secondary service usage reports indicate that service usage is outside of the service usage policy limits that are intended to be in effect (e.g., based on a service plan and/or service policy associated with the device), then the service controller can indicate an error flag for further analysis and action (e.g., implementing various verification and responsive actions as described herein, such as blocking the activity, throttling the activity, quarantining the device, updating/replacing the service processor, and/or monitoring the device using various additional DAS and/or network assisted monitoring techniques). As another example, if the service usage reports from the service processor do not match up with the secondary service usage reports, then the service controller can indicate an error flag for further analysis and action. For example, the correlation can be based on bulk measures of service usage (e.g., total bytes over a given period of time), or using finer grain measures of service usage (e.g., verifying the accounting between one group of service usage activities, such as application, destination/source, port, content type, time of day, network busy state, QoS level, and/or other criteria/measures) charged to one service plan charging record versus the accounting for another group of service usage activities charged to another service plan charging record. In some embodiments, the correlation process between the two service usage accounting reports is performed continuously on all device traffic in real time or near real time as the usage accounting reports are received. In some embodiments, the usage accounting reports are stored and analyzed or correlated later (e.g., periodically, based on a request or audit, and/or based on certain events, such as threshold network service usage events and/or any other events based on various criteria/measures). In some embodiments, only an audit of a portion of time is used to correlate the two usage accounting reports, which, for example, can reduce network traffic and/or network processing load in the service controller.

In some embodiments, correlation techniques are applied by the service controller to compare two different service usage measures as described above based on one or more of the following: total amount of data (e.g., bytes for file transfers, sessions, and/or other measures), amount of data per unit time, total number of accesses, number of accesses per unit time or frequency of accesses, accesses during a time interval (e.g., peak time), accesses during a network busy state, access requests, and individual versus group transmissions at a point in time (e.g., each for a given set of destinations or destinations and traffic types).

In some embodiments, service usage monitoring includes characterizing service usage activities by streams, flows, destination/port, packet inspection, and/or other criteria/measures using the various techniques as described herein and/or other or similar techniques as would be apparent to one of ordinary skill in the art. In some embodiments, service usage monitoring includes characterizing service usage activities by streams, flows, destination/port, packet inspection, and/or other criteria/measures and then correlating to find network service usage behavior patterns that identify likely association of behavior with one or more service activities being managed.

In some embodiments, DAS for network capacity control includes classifying traffic to determine which network service usage activity(ies) are causing traffic (e.g., increasing network capacity/resources usage beyond a threshold), and then determining if access network service usage activity(ies) are violating any rules (e.g., service usage policies or service plan settings associated with the device/user). In some embodiments, DAS for network capacity control includes generating a list for network capacity controlled services that specifies behavioral characteristics for one or more network service usage activities with expected access limits based on access control policy for each managed network service usage activity (e.g., based on service usage policies or service plan settings associated with the device/user). In some embodiments, DAS for network capacity control includes monitoring and/or controlling network service usage activities based on limits, which, for example, can be based on one or more of the following: total access traffic counters, counters for different types of access traffic, destinations, ports, frequency of accesses, access behavior during a given time, access behavior during a given busy state, access behavior for groups of activities (e.g., verify clumping), and/or other criteria/measures.

Accordingly, in some embodiments, a second secure and trusted service usage measure is provided that the service controller (e.g., or another network element/function) can use to verify or secure the service control or service charging reports for the service processor. In some embodiments, the secure and trusted service usage measure also provides for enhanced verification and service security in cases, in which, for example, network based service usage measures are available for additional correlation with the service processor service usage reports. In cases in which network based service usage measures are either not available or are only available at widely spaced time intervals (e.g., roaming networks or other networks with no timely network based service usage measure), these techniques facilitate real time or near real time verification or security for the device assisted service controls and charging.

In some embodiments, a SIM card performs a portion or all of the secure environment processing described above, with the device modem traffic, or a copy of the device modem traffic, being directed to the SIM secure subsystem for traffic accounting and reporting. In some embodiments, a SIM card is used to store QoS classifications and/or network capacity controlled services classifications for various service usage activities so that the user behavior in using certain network service usage activities and/or the user preferences in controlling certain network service usage activities do not need to be relearned or redownloaded as the user swaps the SIM between different devices. In some embodiments, the SIM keeps a local record of service usage activity for multiple devices that belong to the user or the user family plan, so that the service usage notification and policies can be immediately updated on a given device as the user swaps the SIM from device to device. In some embodiments, the manner in which this service usage history is stored on the SIM is secure so that it cannot be tampered with. In some embodiments, the SIM card is used to implement various application management and/or traffic control techniques described herein. In some embodiments, the SIM card is used to inspect traffic, classify traffic, create reports (e.g., certified service activity usage reports), encrypt the report, send the report to a network element/function, and the network element/function correlates the reports (e.g., using network assisted measures for comparisons and/or using various other techniques as described herein). In some embodiments, a SIM card performs a portion or all of the secure environment processing described above using one or more modem measurement points. For example, the traffic that is to be classified can be routed through the SIM and correlated with what is measured by the modem. In some embodiments, network assisted/based network service usage activity classifications are compared SIM based/assisted classifications for service usage monitoring/reporting verification (e.g., detected inconsistencies in monitored/reported network service usage activities can be identified, such as based on total traffic, streams/flows/sockets activities, and/or other criteria/measures). In some embodiments, the reports include a verified sequence so that reports cannot be spoofed and/or missing reports can be determined.

In some embodiments, a portion or all of the secure environment processing described above are applied to implement and/or verify QoS for DAS techniques and/or DAS for network capacity controlled services techniques as described herein.

In some embodiments, the reports include one or more of the following: a number of times the device is cycled from or to a power cycle state in the modem, a number of times during a time window or network busy state, a power cycle versus number of streams initiated during the cycle, and a power cycle versus the streams that are transmitted during that cycle, In some embodiments, device power cycle events trigger generating of a report.

In some embodiments, monitoring, reporting, control, accounting, charging, and/or policy implementation for network capacity controlled services is verified (e.g., using various verification techniques described herein). If any of the verification techniques determine or assist in determining that the network capacity controlled services monitoring, reporting, control, accounting, and/or charging, and/or policy implementation has been tampered with, disabled, and/or is not properly implemented or functioning, then responsive actions can be performed, for example, the device (e.g., and/ or suspect services) can be suspended, quarantined, killed/ terminated, and/or flagged for further analysis/scrutiny to determine whether the device is malfunctioning, needs updating, has been tampered with or compromised, is infected with malware, and/or if any other problem exists.

In some embodiments, the service processor monitors a network service usage activity of a device. In some embodiments, monitoring of the service usage activity includes monitoring for multiple networks (e.g., to determine which networks are available and/or a network busy state of the available networks). In some embodiments monitoring a network service usage activity is performed by and/or assisted by a service cloud (e.g., one or more network elements that provide such a service). In some embodiments, monitoring the network service usage activity includes identifying the network service usage activity, measuring the network service usage of the network service usage activity, and/or characterizing the network service usage of the network service usage activity (e.g., using device assisted/based techniques, network assisted/based techniques, testing/offline monitoring/analysis techniques, and/or a combination thereof).

In some embodiments, the service processor implements differential network access service control (e.g., for network capacity controlled services), network service usage accounting, network service usage charging, and/or network service usage notification on the device to facilitate DAS for protecting network capacity.

In some embodiments, the service processor (e.g., a service processor 115) is updated, communicated with, set, and/or controlled by a network element (e.g., a service controller 122). In some embodiments, the service processor receives service policy information from a network function selected from a base station (e.g., a base station 125), a RAN gateway, a core gateway, a DPI gateway, a home agent (HA), a AAA server (e.g., AAA server 121), a service controller, and/or another network function or combinations of network functions as described herein and/or as will now be apparent to one of ordinary skill in the art in view of the various embodiments described herein. In some embodiments, the service processor is updated through over the air or over the network OS software updates or application software updates or device firmware updates. In some embodiments, the service processor uses an IP connection, SMS connection, and/or MMS connection, for a control channel with a service controller. In some embodiments, the service processor queries a service controller to determine the association of a monitored network service usage activity with a network service usage control policy. In some embodiments, the device (e.g., service processor) maintains a network capacity controlled services list and/or network capacity controlled services policy for one or more of the active services (e.g., actively executing and/or previously installed/downloaded to the device) that have been classified as a network capacity controlled service (e.g., as the number of applications continues to grow, as hundreds of thousands of applications are already available on certain platforms, maintaining a list specific and/or a set of policies unique or specific to each application is not efficient). In this embodiment, when a new application is active/launched and/ or downloaded to the device, the device can request an updated network capacity controlled services list and/or an updated network capacity controlled services policy accordingly (e.g., and/or periodically refresh such lists/policies).

In some embodiments, differential network access control for protecting network capacity includes controlling network services traffic generated by the device (e.g., network capacity controlled services based on a network service usage control policy (e.g., a network capacity controlled services policy). In some embodiments, differential network access control for protecting network capacity includes providing assistance in control of the distribution of bandwidth among devices, network capacity controlled services (e.g., applications, OS operations/functions, and various other network services usage activities classified as network capacity controlled services), a differentiated QoS service offering, a fair sharing of capacity, a high user load network performance, and/or preventing one or more devices from consuming so much network capacity that other devices cannot receive adequate performance or performance in accordance with various threshold and/or guaranteed service levels. In some embodiments, differential network access control for protecting network capacity includes applying policies to determine which network the service activity should be connected to (e.g., 2G, 3G, 4G, home or roaming, WiFi, cable, DSL, fiber, wired WAN, and/or another wired or wireless or access network), and applying differential network access control rules (e.g., traffic control rules) depending on which network to which the service activity is connected. In some embodiments, differential network access control for protecting network capacity includes differentially controlling network service usage activities based on the service usage control policy and a user input (e.g., a user selection or user preference). In some embodiments, differential network access control for protecting network capacity includes differentially controlling network service usage activities based on the service usage control policy and the network the device or network service activity is gaining access from.

In some embodiments, the network service usage control policy is dynamic based on one or more of the following: a network busy state, a time of day, which network the service activity is connected to, which base station or communication channel the service activity is connected to, a user input, a user preference selection, an associated service plan, a service plan change, an application behavior, a messaging layer behavior, random back off, a power state of device, a device usage state, a time based criteria (e.g., time/day/week/month, hold/delay/defer for future time slot, hold/delay/defer for scheduled time slot, and/or hold/delay/defer until a busy state/availability state/QoS state is achieved), monitoring of user interaction with the service activity, monitoring of user interaction with the device, the state of UI priority for the service activity, monitoring the power consumption behavior of the service activity, modem power cycling or power control state changes, modem communication session set up or tear down, and/or a policy update/modification/change from the network. In some embodiments, the network service usage control policy is based on updated service usage behavior analysis of the network service usage activity. In some embodiments, the network service usage control policy is based on updated activity behavior response to a network capacity controlled service classification. In some embodiments, the network service usage control policy is based on updated user input/preferences (e.g., related to policies/controls for network capacity controlled services). In some embodiments, the network service usage control policy is based on updates to service plan status. In some embodiments, the network service usage control policy is based on updates to service plan policies. In some embodiments, the network service usage control policy is based on availability of alternative networks. In some embodiments, the network service usage control policy is based on policy rules for selecting alternative networks. In some embodiments, the network service usage control policy is based on network busy state or availability state for alternative networks. In some embodiments, the network service usage control policy is based on specific network selection or preference policies for a given network service activity or set of network service activities.

In some embodiments, associating the network service usage activity with a network service usage control policy or a network service usage notification policy, includes dynamically associating based on one or more of the following: a network busy state, a time of day, a user input/preference, an associated service plan (e.g., 25 MB data plan, 5G data plan, or an unlimited data plan or other data/service usage plan), an application behavior, a messaging layer behavior, a power state of device, a device usage state, a time based criteria, availability of alternative networks, and a set of policy rules for selecting and/or controlling traffic on one or more of the alternative networks.

In some embodiments, a network service usage control policy (e.g., a network capacity controlled services policy) includes defining the network service usage control policy for one or more service plans, defining network access policy rules for one or more devices or groups of devices in a single or multi-user scenarios such as family and enterprise plans, defining network access policy rules for one or more users or groups of users, allowing or disallowing network access events or attempts, modulating the number of network access events or attempts, aggregating network access events or attempts into a group of access events or attempts, time windowing network access events or attempts, time windowing network access events or attempts based on the application or function being served by the network access events or attempts, time windowing network access events or attempts to pre-determined time windows, time windowing network access events or attempts to time windows where a measure of network busy state is within a range, assigning the allowable types of access events or attempts, assigning the allowable functions or applications that are allowed network access events or attempts, assigning the priority of one or more network access events or attempts, defining the allowable duration of network access events or attempts, defining the allowable speed of network access events or attempts, defining the allowable network destinations for network access events or attempts, defining the allowable applications for network access events or attempts, defining the QoS rules for one or more network access events or attempts, defining or setting access policy rules for one or more applications, defining or setting access policy rules for one or more network destinations, defining or setting access policy rules for one or more devices, defining or setting access policy rules for one or more network services, defining or setting access policy rules for one or more traffic types, defining or setting access policy rules for one or more QoS classes, and defining or setting access policy rules based on any combination of device, application, network destination, network service, traffic type, QoS class, and/or other criteria/measures.

In some embodiments, a network service usage control policy (e.g., a network capacity controlled services policy) includes a traffic control policy. In some embodiments, the traffic control policy includes a traffic control setting. In some embodiments, the traffic control policy includes a traffic control/tier, and the traffic control/tier includes the traffic control setting. In some embodiments, the traffic control policy includes one or more of the following: block/allow settings, throttle settings, adaptive throttle settings, QoS class settings including packet error rate, jitter and delay settings, queue settings, and tag settings (e.g., for packet tagging certain traffic flows). In some embodiments, QoS class settings include one or more of the following: throttle level, priority queuing relative to other device traffic, time window parameters, and hold or delay while accumulating or aggregating traffic into a larger stream/burst/packet/group of packets. In some embodiments, the traffic control policy includes filters implemented as indexes into different lists of policy settings (e.g., using cascade filtering techniques), in which the policy filters include one or more of the following: a network, a service plan, an application, a time of day, and a network busy state. For example, a two dimensional traffic control implementation scheme can be provided using a network busy state and/or a time of day as an index into a traffic control setting (e.g., a certain application's priority level can be increased or decreased based on a network busy state and/or time of day). In some embodiments, the traffic control policy is used for selecting the network from a list of available networks, blocking or reducing access until a connection is made to an alternative network, and/or modifying or replacing a network stack interface of the device to provide for intercept or discontinuance of network socket interface messages to applications or OS functions.

In some embodiments, a traffic control setting is selected based on the network service usage control policy. In some embodiments, the traffic control setting is implemented on the device based on the network service usage control policy. In some embodiments, the implemented traffic control setting controls traffic/traffic flows of a network capacity controlled service. In some embodiments, the traffic control setting is selected based on one or more of the following: a time of day, a day of week, a special time/date (e.g., a holiday or a network maintenance time/date), a network busy state, a priority level associated with the network service usage activity, a QoS class associated with the network service usage activity (e.g., emergency traffic), which network the network service activity is gaining access from, which networks are available, which network the network service activity is connected to, which base station or communication channel the network service activity is connected to, and a network dependent set of traffic control policies that can vary depending on which network the service activity is gaining access from (e.g., and/or various other criteria/measures as described herein). In some embodiments, the traffic control setting includes one or more of the following: allow/block, delay, throttle, QoS class implementation, queue, tag, generate a user notification, random back off, clear to send received from a network element, hold for scheduled transmission time slot, selecting the network from the available networks, and blocking or reducing access until a connection is made to an alternative network. In some embodiments, the traffic control setting is selected based on a network capacity controlled services priority state of the network service usage activity and a network busy state. In some embodiments, the traffic control setting is selected based on a network capacity controlled services priority state of the network service usage activity and a network busy state and is global (e.g., the same) for all network capacity controlled services activities or varies based on a network service usage activity priority, user preferences or option selection, an application, a time based criteria, a service plan, a network the device or service activity is gaining access from, a redetermination of a network congestion state after adapting to a previously determined network busy state, and/or other criteria/measures as described herein.

In some embodiments, network capacity controlled services traffic (e.g., traffic flows) is differentially controlled for protecting network capacity. For example, various software updates for an OS and one or more applications on the device can be differentially controlled using the various techniques described herein. As another example, security/antimalware software (e.g., antivirus, firewall, content protection, intrusion detection/prevention, and/or other security/antimalware software) can be differentially controlled using the various techniques described herein. As yet another example, network backups/imaging, content downloads (e.g., exceeding a threshold individually and/or in aggregate, such as for image, music, video, eBook content, email attachments, content/media subscriptions, RSS/news feeds, text/image/video chat, software updates, and/or other content downloads) can be differentially controlled using the various techniques described herein.

For example, using the DAS for protecting network capacity techniques described herein an adaptive policy control for protecting network capacity can be provided. A network capacity controlled services list can be generated, updated, reported, and/or received by the device and stored on the device (e.g., the list can be based on adapted to the service plan associated with the device). If a monitored network service usage activity is not on the list, then the device can report the monitored network service usage activity to a network element (e.g., for a monitored network service usage activity that also exceeds a certain threshold, based on a network busy state, based on a time based criteria, and/or other criteria/measure). As an example, monitored network service usage activity can be reported if/when the monitored network service usage activity exceeds a data usage threshold (e.g., 50 MB total data usage per day, a socket opening frequency/rate, velocity of data usage at an instant in time, or more complicated thresholds over time, over peak periods, by content and time, by various other parameters/thresholds). As another example, the monitored network service usage activity can be reported based on testing of the network service usage behavior and/or application developer characterization input. The report can include information that identifies the network service usage activity and various network service usage parameters.

In some embodiments, a notification setting is selected based on a service usage notification policy. In some embodiments, a notification setting includes a user notification setting (e.g., various user notifications settings as described above with respect to FIG. 18).

In some embodiments, classifying the network service usage activity further includes classifying the network service usage activity (e.g., using a usage threshold filter and/or cascading filter techniques) into one or more of a plurality of classification categories for differential network access control for protecting network capacity. In some embodiments, classifying the network service usage activity further includes classifying the network service usage activity into one or more network capacity controlled services in which the network capacity controlled services include one or more of the following: applications requiring data network access, application software updates, applications requiring network information, applications requiring GPS or physical location, operating system software updates, security software updates, network based backups, email downloads, and a set of activities configured as network capacity controlled service activities based on a service profile and/or user input (e.g., and/or various other types of network service usage activities as described herein and as will now be apparent to one of ordinary skill in the art). For example, network capacity controlled services can include software updates for OS and applications, OS background network accesses, cloud synchronization services, RSS feeds and other background information feeds, browser/application/device behavior reporting, background email downloads, content subscription service updates and downloads (e.g., music/video downloads, news feeds), text/voice/video chat clients, security updates (e.g., antimalware updates), peer to peer networking application updates, inefficient network access sequences during frequent power cycling or power save state cycling, large downloads or other high bandwidth accesses, and greedy application programs that constantly/repeatedly access the network with small transmissions or requests for information. In some embodiments, a network capacity controlled services list is static, adaptive, generated using a service processor, received from a network element (e.g., service controller or service cloud), received from a network element (e.g., service controller or service cloud) and based at least in part on device activity reports received from the service processor, based on criteria set by pre-testing, report of behavior characterization performed by the application developer, and/or based at least in part on user input. In some embodiments, the network capacity controlled services list includes one or more network service activity background (QoS) classes.

In some embodiments, classifying the network service usage activity further includes classifying the network service usage activity based on one or more of the following: application or widget (e.g., Outlook, Skype, iTunes, Android email, weather channel weather widget, iCal, Firefox Browser, etc), application type (e.g., user application, system application/utility/function/process, OS application/utility/function/process, email, browser, widget, malware (such as a virus or suspicious process), RSS feed, device synchronization service, download application, network backup/imaging application, voice/video chat, peer to peer content application or other peer to peer application, streaming media feed or broadcast reception/transmission application, network meeting application, chat application or session, and/or any other application or process identification and categorization), OS/system function (e.g., any system application/utility/function/process and/or OS application/utility/function/process, such as a OS update and/or OS error reporting), modem function, network communication function (e.g., network discovery or signaling, EtherType messages, connection flow/stream/session set up or tear down, network authentication or authorization sequences, IP address acquisition, and DNS services), URL and/or destination/source IP address, protocol, traffic type, socket (e.g., IP address, protocol, and/or port), socket address/label/identifier (e.g., port address/port number), content type (e.g., email downloads, email text, video, music, eBooks, widget update streams, and download streams), port (e.g., port number), QoS classification level, time of day, on peak or off peak, network time, network busy state, access network selected, service plan selected, user preferences, device credentials, user credentials, and/or status, modem power cycling or power state changes, modem authentication processes, modem link set up or tear down, modem management communications, modem software or firmware updates, modem power management information, device power state, and modem power state. In some embodiments, classifying the network service usage activity further includes associating the classified network service usage activity with an ID (e.g., an application ID, which can be, for example, a unique number, name, and/or signature). In some embodiments, classifying the network service usage activity further includes classifying the network service usage activity using a plurality of classification parameters, including one or more of the following: application ID, remote IP (e.g., URL, domain, and/or IP address), remote port, protocol, content type, a filter action class (e.g., network busy state class, QoS class, time of day, network busy state, and/or other criteria/measures), and access network selected. In some embodiments, classifying the network service usage activity further includes using a combination of parameters as discussed above to determine the classification of the network service usage activity.

In some embodiments, classifying the network service usage activity further includes classifying the network service usage activity as a network capacity controlled service, a non-network capacity controlled service, a blocked or disallowed service, and/or a not yet classified/identified service (e.g., unknown/yet to be determined classification or pending classification). In some embodiments, an application connection, OS connection, and/or other service activity is classified as a network capacity controlled service activity when the device has been inactive (e.g., or in a power save state) for a period of time (e.g., when the user has not interacted with it for a period of time, when it has not displayed user notification policy, and/or a user input has not been received for a period of time, and/or when a power save state is entered). In some embodiments, an application connection, OS connection, and/or other service activity is classified as a network capacity controlled service activity when the monitored network service usage activity exceeds a data usage threshold for more than one application connection, OS connection, and/or other service activity (e.g., aggregated data usage exceeds the data usage threshold); or for a specific application connection. In some embodiments, an application connection, OS connection, and/or other service activity is classified as a network capacity controlled service activity when the monitored network service usage activity exceeds a data usage threshold based on a predetermined list of one or more data usage limits, based on a list received from a network element, usage time limit (e.g., based on a period of time exceeding a usage limit), and/or based on some other usage related criteria/measures. In some embodiments, classifying the network service usage activity further includes classifying the network service usage activity as a network capacity controlled service based on a network peak time, a network busy state, or a network connection to the device falls below a certain performance level (e.g., higher/lower priorities assigned based on various such criteria/other input/factors).

In some embodiments, one or more of the network capacity controlled services are associated with a different network access policy set for one or more networks and/or one or more alternative networks. In some embodiments, one or more of the network capacity controlled services are associated with a different notification policy set for one or more networks and/or one or more alternative networks. In some embodiments, the network capacity controlled services list is stored on the device. In some embodiments, the network capacity controlled services list is received/periodically updated from a network element and stored on the device. In some embodiments, the network capacity controlled services list includes network capacity controlled services, non-network capacity controlled services (e.g., foreground services or services based on various possibly dynamic criteria are not classified as network capacity controlled services), and an unclassified set of services (e.g., grey list including one or more network service activities pending classification based on further analysis and/or input, such as from a network element, service provider, and/or user). In some embodiments, the network capacity controlled services list is based on one or more of the following: predefined/predesignated (e.g., network, service plan, pre-test and/or characterized by an application developer) criteria; device assisted/based monitoring (e.g., using a service processor); network based monitoring (e.g., using a DPI gateway); network assisted analysis (e.g., based on device reports of DAS activity analysis). For example, the device can report device monitored network service usage activities (e.g., all monitored network service usage activities or a subset based on configuration, threshold, service plan, network, and/or user input) to the network element. As another example, the network element can update the network capacity controlled services list and send the updated list to the device. As yet another example, the network element can perform a statistical analysis of network service activities across a plurality of devices based on the device based and/or network based network service usage activity monitoring/reporting. In some embodiments, a network service usage activity is determined to be an active application or process (e.g., based on a user interaction with the device and/or network service usage activity, such as a pop-up and/or other criteria/measures).

In some embodiments, implementing traffic control for network capacity controlled services is provided using various techniques. In some embodiments, the device includes a service processor agent or function to intercept, block, modify, remove or replace UI messages, notifications or other UI communications generated by a network service activity that whose network service usage is being controlled or managed (e.g., using various measurement points as shown in and described with respect to FIGS. 12 and 13). For example, this technique can be used to provide for an improved user experience (e.g., to prevent an application that is being controlled for protecting network capacity from generating repeated and/or confusing messages/alerts to the user). In some embodiments, a network stack interface of the device is replaced or modified to provide for intercept or discontinuance of network socket interface messages to applications or OS functions or other functions/software.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/or other such messages). As another example, an emulated network API can modify, swap, and/or inject network socket application interface messages (socket( ), connect( ), read( ), write( ), close( ), and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

In some embodiments, implementing traffic control for network capacity controlled services using DAS techniques is provided using various techniques in which the network service usage activity is aware of network capacity control (e.g., the network service usage activity supports an API or other interface for implementing network capacity control). For example, a network access API as described herein can be used to implement traffic control for network capacity controlled services. In some embodiments, the API facilitates communication of one or more of the following: network access conditions, network busy state or network availability state of one or more networks or alternative networks, one or more network capacity controlled service policies (e.g., the network service can be of a current network access setting, such as allow/block, throttle, queue, scheduled time/time slot, and/or defer, which can be based on, for example, a current network, a current network busy state, a time based criteria, a service plan, a network service classification, and/or other criteria/measures), a network access request from a network service activity, a query/polled request to a network service activity, a network access grant to a network service activity (e.g., including a priority setting and/or network capacity controlled service classification, a scheduled time/time slot, an alternative network, and/or other criteria/measures), a network busy state or a network availability state or a network QoS state.

In some embodiments, implementing traffic control for network capacity controlled services using network assisted/based techniques is provided using various techniques in which the network service usage activity is unaware of network capacity control (e.g., does not support an API or other interface for implementing network capacity control). In some embodiments, DPI based techniques are used to control network capacity controlled services (e.g., to block or throttle network capacity controlled services at a DPI gateway).

In some embodiments, implementing traffic control for network capacity controlled services using network assisted/based techniques is provided using various techniques in which the network service usage activity is aware of network capacity control (e.g., does support an API or other interface for implementing network capacity control). In some embodiments, the application/messaging layer (e.g., a network API as described herein) is used to communicate with a network service activity to provide associated network capacity controlled service classifications and/or priorities, network busy state information or network availability of one or more networks or alternative networks, a network access request and response, and/other criteria/measures as similarly described herein.

In some embodiments, DAS for protecting network capacity includes implementing a service plan for differential charging based on network service usage activities (e.g., including network capacity controlled services). In some embodiments, the service plan includes differential charging for network capacity controlled services. In some embodiments, the service plan includes a cap network service usage for network capacity controlled services. In some embodiments, the service plan includes a notification when the cap is exceeded. In some embodiments, the service plan includes overage charges when the cap is exceeded. In some embodiments, the service plan includes modifying charging based on user input (e.g., user override selection as described herein, in which for example, overage charges are different for network capacity controlled services and/or based on priority levels and/or based on the current access network). In some embodiments, the service plan includes time based criteria restrictions for network capacity controlled services (e.g., time of day restrictions with or without override options). In some embodiments, the service plan includes network busy state based criteria restrictions for network capacity controlled services (e.g., with or without override options). In some embodiments, the service plan provides for network service activity controls to be overridden (e.g., one time, time window, usage amount, or permanent) (e.g., differentially charge for override, differentially cap for override, override with action based UI notification option, and/or override with UI setting). In some embodiments, the service plan includes family plan or multi-user plan (e.g., different network capacity controlled service settings for different users). In some embodiments, the service plan includes multi-device plan (e.g., different network capacity controlled service settings for different devices, such as smart phone v. laptop v. net book v. eBook). In some embodiments, the service plan includes free network capacity controlled service usage for certain times of day, network busy state(s), and/or other criteria/measures. In some embodiments, the service plan includes network dependent charging for network capacity controlled services. In some embodiments, the service plan includes network preference/prioritization for network capacity controlled services. In some embodiments, the service plan includes arbitration billing to bill a carrier partner or sponsored service partner for the access provided to a destination, application, or other network capacity controlled service. In some embodiments, the service plan includes arbitration billing to bill an application developer for the access provided to a destination, application or other network capacity controlled service.

In some application scenarios, excess network capacity demand can be caused by modem power state changes on the device. For example, when an application or OS function attempts to connect to the network for any reason when the modem is in a power save state wherein the modem is not connected to the network, it can cause the modem to change power save state, reconnect to the network, and then initiate the application network connection. In some cases, this can also cause the network to re-initiate a modem connection session (e.g., PPP session) which in addition to the network capacity consumed by the basic modem connection also consumes network resources for establishing the PPP session. Accordingly, in some embodiments, network service usage activity control policies are implemented that limit or control the ability of applications, OS functions, and/or other network service usage activities (e.g., network capacity controlled services) from changing the modem power control state or network connection state. In some embodiments, a service usage activity is prevented or limited from awakening the modem, changing the power state of the modem, or causing the modem to connect to the network until a given time window is reached. In some embodiments, the frequency a service usage activity is allowed to awakening the modem, changing the power state of the modem, or causing the modem is limited. In some embodiments, a network service usage activity is prevented from awakening the modem, changing the power state of the modem, or causing the modem until a time delay has passed. In some embodiments, a network service usage activity is prevented from awakening the modem, changing the power state of the modem, or causing the modem until multiple network service usage activities require such changes in modem state, or until network service usage activity is aggregated to increase network capacity and/or network resource utilization efficiency. In some embodiments, limiting the ability of a network service usage activity to change the power state of a modem includes not allowing the activity to power the modem off, place the modem in sleep mode, or disconnect the modem from the network. In some embodiments, these limitations on network service usage activity to awaken the modem, change the power state of the modem, or cause the modem to connect to a network are set by a central network function (e.g., a service controller or other network element/function) policy communication to the modem. In some embodiments, these power control state policies are updated by the central network function.

Figure 24:
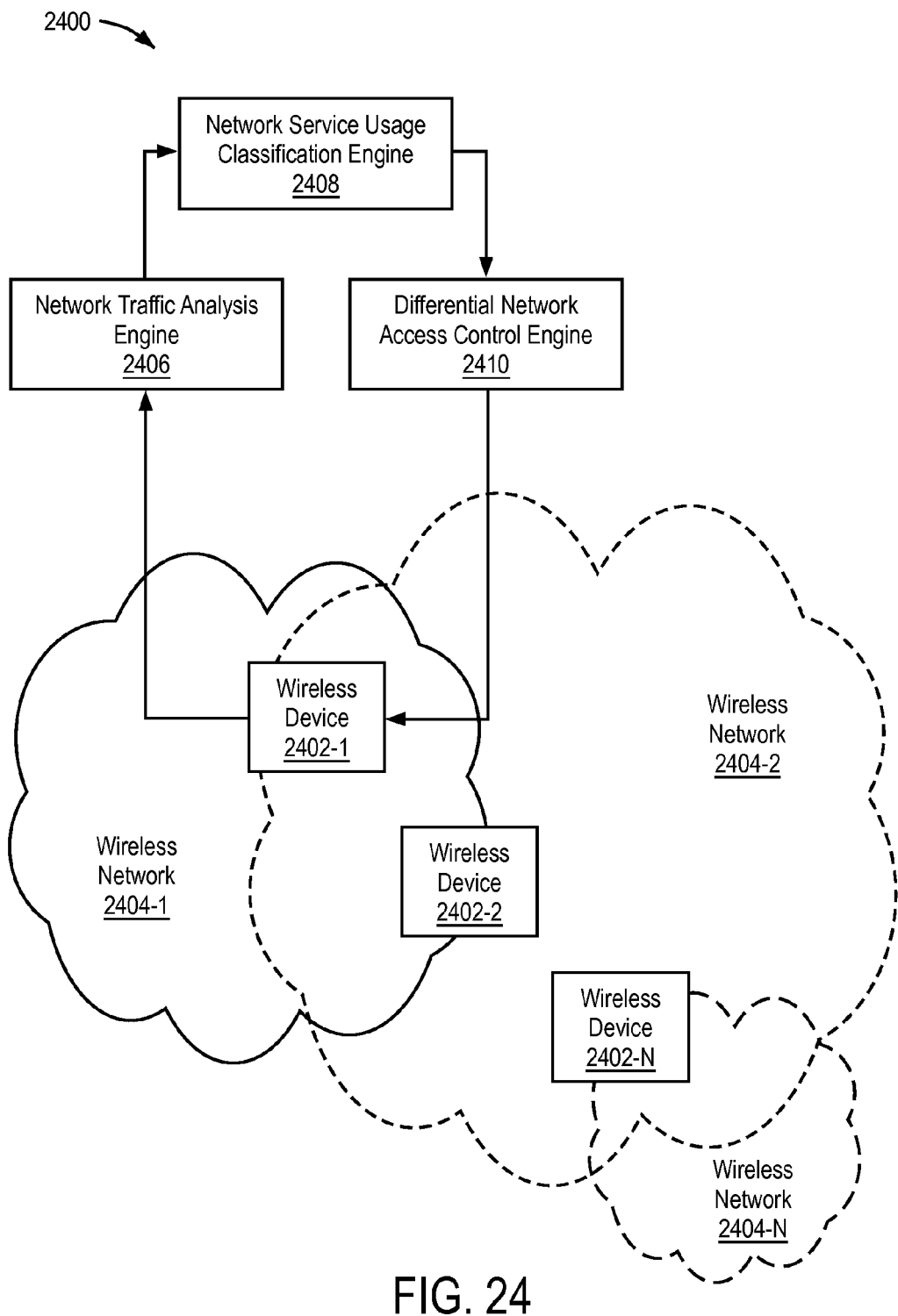
FIG. 24 depicts a diagram of a network capacity protection system utilizing device-assisted services (DAS).

FIG. 24 depicts a diagram of a network capacity protection system 2400 utilizing device-assisted services (DAS). The system 2400 includes wireless devices 2402-1 to 2402-N (referred to collectively as the wireless devices 2402), wireless networks 2404-1 to 2404-N (referred to collectively as the wireless networks 2404), a network traffic analysis engine 2406, a network service usage classification engine 2408, and a differential network access control engine 2410.

The wireless devices 2402 will at a minimum include a processor, memory (though the memory could be implemented in the processor), a radio, and a radio interface (though the radio interface could be implemented as "part of" the radio). In order to make the wireless devices 2402 useful, they will typically have at least one input device and at least one output device, including input and output interfaces, if applicable.

The wireless devices 2402 can be implemented as stations. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit. (I.e, a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std 802.11™-2007 (Revision of IEEE Std 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference.

In alternative embodiments, one or more of the wireless devices 2402 may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

The wireless networks 2404 will typically include an internetworking unit (IWU) that interconnects wireless devices on the relevant one of the wireless networks 2404 with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station.

The wireless networks 2404 can be implemented using any applicable technology, which can differ by network type or in other ways. The wireless networks 2404 can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The wireless networks 2404 can be identifiable by network type (e.g., 2G, 3G, WiFi), service provider, WAP/base station identifier (e.g., WiFi SSID, base station and sector ID), geographic location, or other identification criteria.

The wireless networks 2404 may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 24, the network traffic analysis engine 2406 is coupled to the wireless device 2402-1. In a specific implementation, the network traffic analysis engine 2406 is implemented on a server and is coupled to the wireless device 2402-1 through the Internet. However, at least a portion of the network traffic analysis engine 2406 can alternatively be implemented on the wireless device 2402-1, with or without a connection to a server that includes another portion (e.g., a server portion) of the network traffic analysis engine 2406.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The network traffic analysis engine 2406 analyzes a subset of traffic between the wireless device 2402-1 and a source or destination. The analyzed traffic may or may not be limited to a network segment, such as between a cellular phone and a base station. The network traffic analysis engine 2406 can analyze traffic for a subset of devices in the wireless network 2404-1 service area. The analyzed traffic may or may not be limited to subscribers.

In the example of FIG. 24, the network service usage classification engine 2408 is coupled to the network traffic analysis engine 2406. In a specific implementation, the network service usage classification engine 2408 is implemented on a server, which may or may not be the same server on which the network traffic analysis engine 2406 is implemented. However, at least a portion of the network service usage classification engine 2408 can alternatively be implemented on the wireless device 2402-1, with or without a connection to a server that includes another portion (e.g., a server portion) of the network service usage classification engine 2408.

The network service usage classification engine 2408 can categorize traffic based upon the service class (e.g., conversational, streaming, interactive, background, or some other service class) requested or needed for a service. The categorization facilitates identification of a snapshot of service class use at a given time, and, in some implementations, predictions of future service class use based upon the snapshot (e.g., making an assumption that future service class use is at least somewhat related to service class use of the snapshot), historical data analysis (e.g., service class usage at certain times of day/days of the week), identification of trends, or the use of some other predictive technology.

In the example of FIG. 24, the differential network access control engine 2410 is coupled to the network service usage classification engine 2408. In a specific implementation, the network access control engine 2410 is implemented on a server, which may or may not be the same server on which the network traffic analysis engine 2406 and/or the network service usage classification engine 2408 are implemented. However, at least a portion of the network access control engine 2410 can alternatively be implemented on the wireless device 2402-1, with or without a connection to a server that includes another portion (e.g., a server portion) of the network access control engine 2410.

The differential network access control engine 2410 uses the predicted service class use from the network service usage classification engine 2408 to dynamically adjust resources allocated to service classes. For example, the differential network access control engine 2410 can perform a service class availability assessment to determine whether service class capacity for service classes on a channel is sufficient for predicted service usage, and either add resources if service class availability is insufficient for predicted service usage or reduce resources if service class availability is more than sufficient for predicted service usage.

Alternatively, the differential network access control engine 2410 can instead or in addition control applications on devices such that the applications change service usage levels or delay consumption of wireless resources (e.g., by delaying software updates until more resources become available). In an embodiment, a service usage control policy is implemented on the wireless device 2402-1. This may be necessary in some cases to ensure the wireless device 2402-1 can adjust application settings that are normally fixed, optimize network service usage activation based on network state (e.g., if the network is busy), control over-the-air software updates, throttle resource-hungry applications, manage network service usage requests from repeated power down modes, keep PPP sessions active, or otherwise facilitate dynamic service class adjustments or other device behavior.

In a specific implementation, subscribers can be incented to change service classes by, for example, charging more for higher service classes. The differential network access control engine 2410 can send a notification of differential charges for service classes. Alternatively, the charges could be implemented via subscriber account settings or preferences.

In the example of FIG. 24, in operation, the network traffic analysis engine 2406 analyzes traffic from one or more devices, including the wireless device 2402-1. The network service usage classification engine 2408 predicts the amount of resources needed for service classes, and the differential network access control engine 2410 dynamically allocates resources on an as-needed basis to adjust the service classes that are available to the one or more devices and/or adjusts device behavior for a subset of the one or more devices or instructs a subset of the one or more devices to adjust device behavior such that the device consumes service class-specific resources in accordance with an access control policy appropriate for the resources allocated to the applicable service classes.

Figure 25:
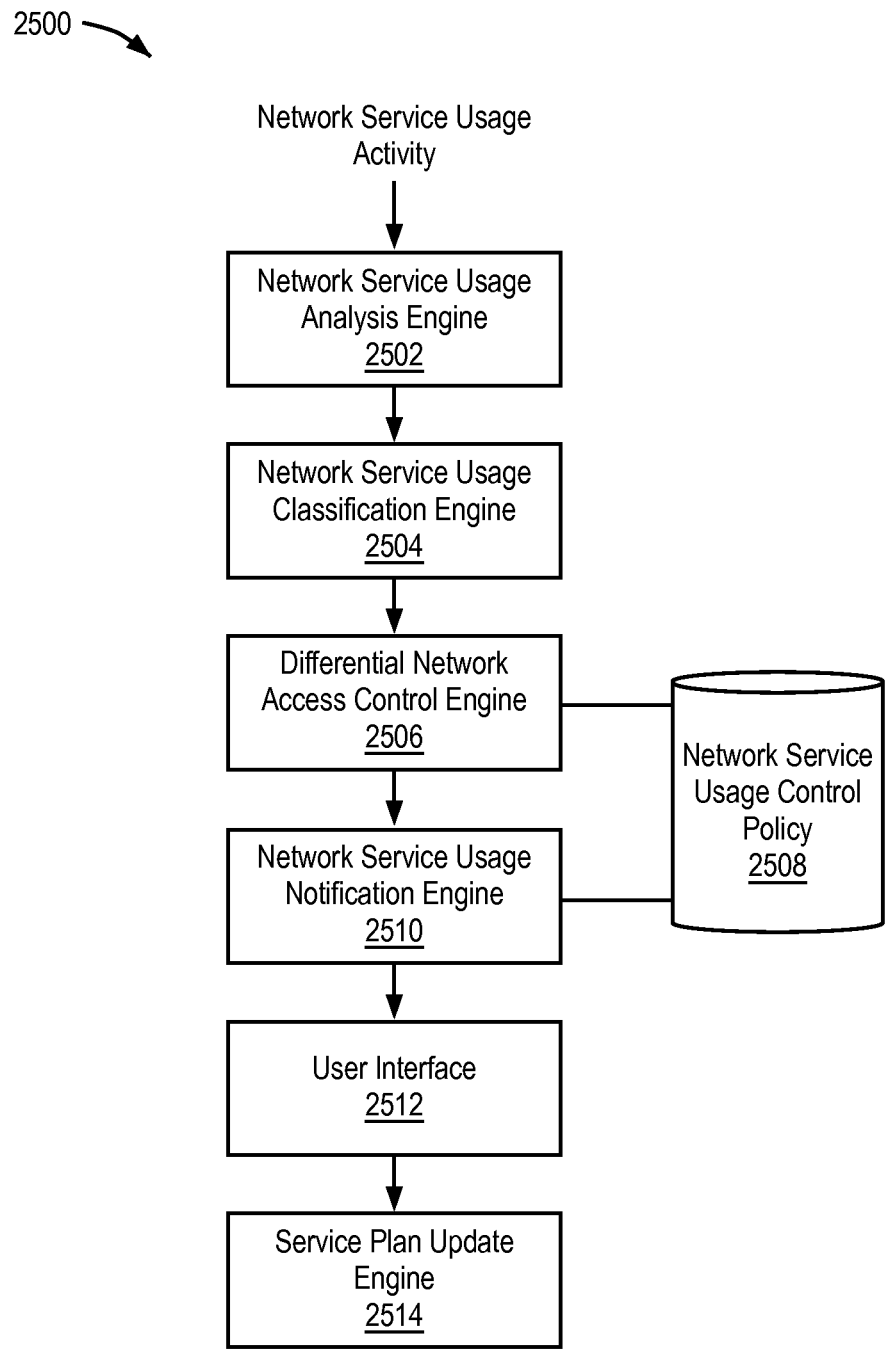
FIG. 25 depicts a diagram an example of a differential access control notification system.

FIG. 25 depicts a diagram an example of a differential access control notification system 2500. In the example of FIG. 25, the system 2500 includes a network service usage analysis engine 2502, a network service usage classification engine 2504, a differential network access control engine 2506, a network service usage control policy datastore 2508, a network service usage notification engine 2510, a user interface 2512, and a service plan update engine 2514.

In the example of FIG. 25, the network service usage analysis engine 2502 analyzes network service usage activity. The analysis can include an analysis of traffic sent to or from a device, an application running on a device, a request for services, or other analysis that is informative of past, current, or future network service usage. For example, the network service usage activity can include an attempt to download or load an application onto the communications device, an attempt to execute the network service activity or the network service usage activity attempts to access the network, meeting or exceeding a network service usage threshold, satisfying a network service usage pre-condition, an update to a network capacity controlled service activity classification list, an update to a network capacity controlled services policy, and a network message is sent to the device triggering the notification, to name several by way of example. The analysis can occur on a non-WAP station, a WAP or base station, a server, or partly on one of these devices or some other device.

In the example of FIG. 25, the network service usage classification engine 2504 is coupled to the network service usage analysis engine 2502. The network service usage classification engine 2504 classifies the analyzed network service usage into one or more service classes. The classification can occur on a non-WAP station, a WAP or base station, a server, or partly on one of these devices or some other device.

In the example of FIG. 25, the differential network access control engine 2506 is coupled to the network service usage classification engine 2504. The differential network access control engine 2506 determines network access parameters using the service classes associated with the network service usage activity and network service usage control policies stored in the network service usage control policy datastore 2508. The determination can occur on a non-WAP station, a WAP or base station, a server, or partly on one of these devices or some other device. The network service usage control policy datastore 2508 can be implemented on a wireless device, but it is also possible to maintain the datastore remotely relative to the device (e.g., on a server). In a specific implementation, even if the network service usage control policy datastore 2508 is maintained remotely relative to the wireless device, the wireless device will still have a network service usage control policy implemented.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 25, the network service usage notification engine 2510 is coupled to the differential network access control engine 2506 and the network service usage control policy datastore 2508. The network service usage notification engine 2510 is configured to generate a notification sufficient to indicate relevant access control information. For example, the notification could indicate what network service usage activities are network capacity controlled services, the type of network service policy in effect for one or more network capacity controlled services, that a network service activity belongs to a network capacity controlled services classification, that a service activity that is classified as network capacity controlled services classification can have the classification changed, that if the service class is changed for the network service activity that the associated network service usage charges will change, a service plan upgrade/downgrade offer, and an offer for a service plan that provides discounts and/or incentives for responding to one or more user notifications for protecting network capacity, to name several by way of example.

The notification may or may not also include a user preference selection. For example, the notification could include a provision to associate a network service usage control policy with the network service usage activity, an over-ride option for selecting the network service usage control policy, a modify option to select the service usage control policy, and a select option to select a new service plan, to name several by way of example. Other examples include network service usage activity information for one or more network capacity controlled services, predicted network service usage activity information for one or more network capacity controlled services, an option for obtaining more information about the network service usage of the network service usage activity, a message that the network service usage activity may result in network service usage that exceeds a threshold for a service plan associated with the device, an option to review or select an alternative service plan, an acknowledgement request, and an option to submit the acknowledgement request, to name several more by way of example.

In the example of FIG. 25, the user interface 2512 is coupled to the network service usage notification engine 2510. It may be noted that notifications can be disposed of by consulting user preferences (e.g., when a user indicates that maximum performance or minimum cost should be automatically selected). However, unless subscriber preferences are set as a default, a user is likely to have notifications displayed in the UI 2512. The notification can be in an applicable known or convenient form, such as SMS, email, a popup window, or the like. To the extent a response is permitted, a user can input a response to the notification using an input device (not shown).

In the example of FIG. 25, the service plan update engine 2514 is coupled to the UI 2512. As was previously mentioned, the UI can be bypassed because of, e.g., user preferences that are determinative of a selection provided in the notification. Regardless of how the selection associated with the notification is made, the service plan update engine 2514 can update a service plan, network service usage control policy, user preferences, or other parameters in accordance with the selection. The service plan update engine 2514 can also update accounting if costs accrue.

Figure 26:
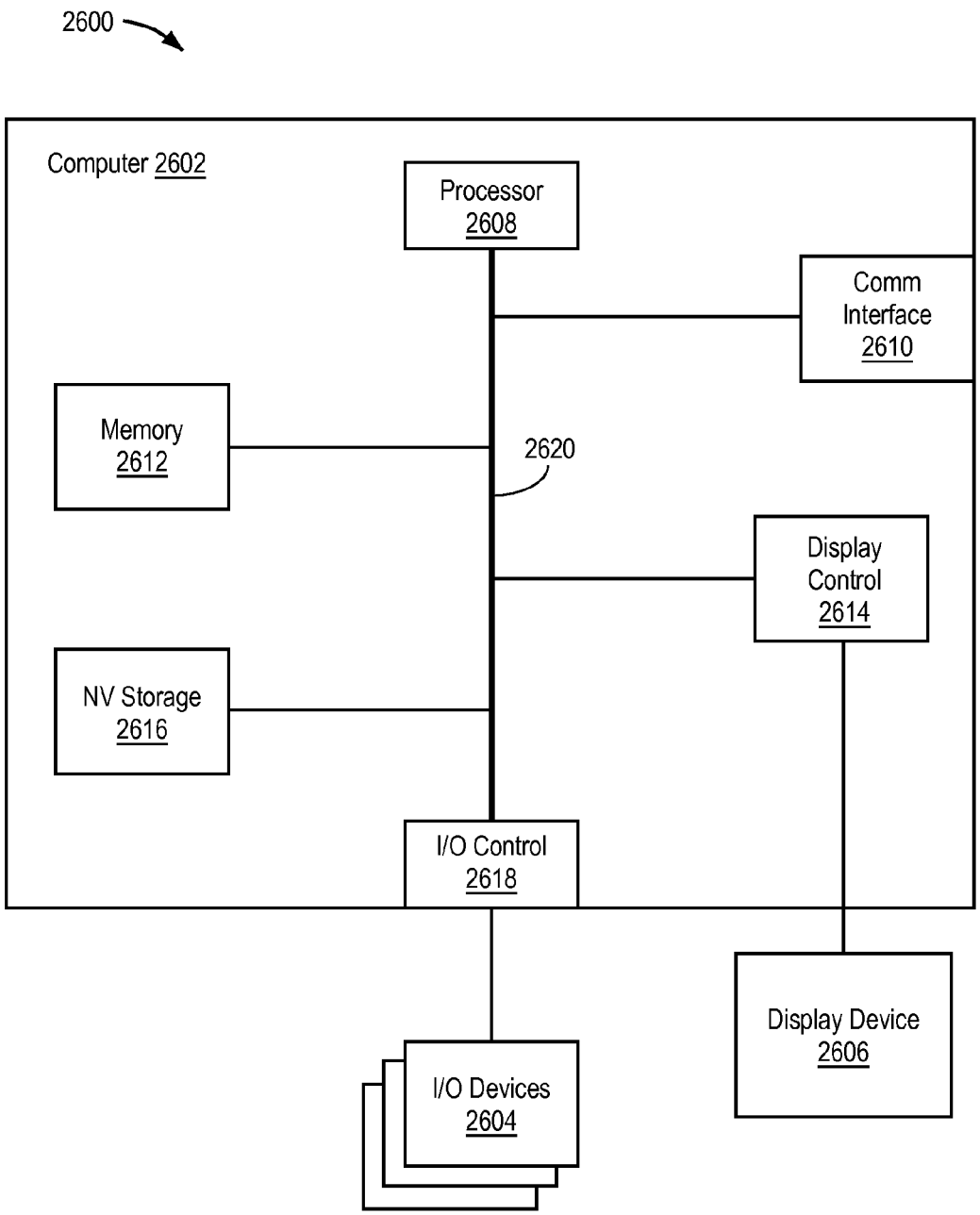
FIG. 26 depicts an example of a computer system on which techniques described in this paper can be implemented.

FIG. 26 depicts an example of a computer system 2600 on which techniques described in this paper can be implemented. The computer system 2600 may be a conventional computer system that can be used as a client computer system, such as a wireless client or a workstation, or a server computer system. The computer system 2600 includes a computer 2602, I/O devices 2604, and a display device 2606. The computer 2602 includes a processor 2608, a communications interface 2610, memory 2612, display controller 2614, non-volatile storage 2616, and I/O controller 2618. The computer 2602 may be coupled to or include the I/O devices 2604 and display device 2606.

The computer 2602 interfaces to external systems through the communications interface 2610, which may include a modem or network interface. It will be appreciated that the communications interface 2610 can be considered to be part of the computer system 2600 or a part of the computer 2602. The communications interface 2610 can be an analog modem, ISDN modem, cable modem, token ring interface, satellite transmission interface (e.g., "direct PC"), or other interfaces for coupling a computer system to other computer systems.

The processor 2608 may be, for example, a conventional microprocessor such as an Intel Pentium microprocessor or Motorola power PC microprocessor. The memory 2612 is coupled to the processor 2608 by a bus 2670. The memory 2612 can be Dynamic Random Access Memory (DRAM) and can also include Static RAM (SRAM). The bus 2670 couples the processor 2608 to the memory 2612, also to the non-volatile storage 2616, to the display controller 2614, and to the I/O controller 2618.

The I/O devices 2604 can include a keyboard, disk drives, printers, a scanner, and other input and output devices, including a mouse or other pointing device. The display controller 2614 may control in the conventional manner a display on the display device 2606, which can be, for example, a cathode ray tube (CRT) or liquid crystal display (LCD). The display controller 2614 and the I/O controller 2618 can be implemented with conventional well known technology.

The non-volatile storage 2616 is often a magnetic hard disk, an optical disk, or another form of storage for large amounts of data. Some of this data is often written, by a direct memory access process, into memory 2612 during execution of software in the computer 2602. One of skill in the art will immediately recognize that the terms "machine-readable medium" or "computer-readable medium" includes any type of storage device that is accessible by the processor 2608 and also encompasses a carrier wave that encodes a data signal.

The computer system 2600 is one example of many possible computer systems which have different architectures. For example, personal computers based on an Intel microprocessor often have multiple buses, one of which can be an I/O bus for the peripherals and one that directly connects the processor 2608 and the memory 2612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 2612 for execution by the processor 2608. A Web TV system, which is known in the art, is also considered to be a computer system, but it may lack some of the features shown in FIG. 26, such as certain input or output devices. A typical computer system will usually include at least a processor, memory, and a bus coupling the memory to the processor.

In addition, the computer system 2600 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 2616 and causes the processor 2608 to execute the various acts required by the operating system to input and output data and to store data in memory, including storing files on the non-volatile storage 2616.

Figure 27:
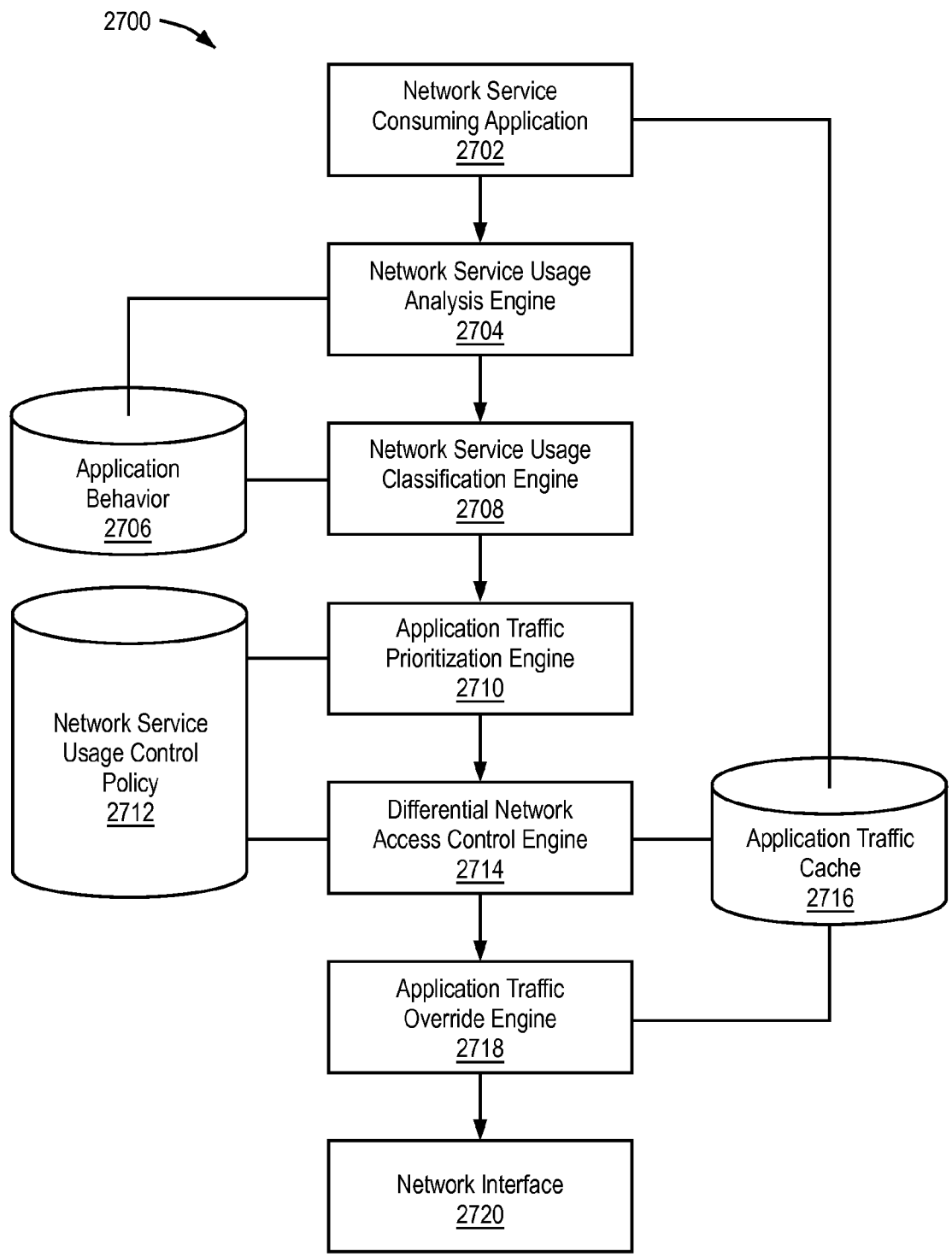
FIG. 27 depicts a diagram of an example of a system for application-specific differential network access control.

FIG. 27 depicts a diagram of an example of a system 2700 for application-specific differential network access control. In the example of FIG. 27, the system 2700 includes a network service consuming application 2702, a network service usage analysis engine 2704, an application behavior datastore 2706, a network service usage classification engine 7708, an application traffic prioritization engine 2710, a network service usage control policy datastore 2712, a differential network access control engine 2714, an application traffic cache 2716, an application traffic override engine 2718, and a network interface 2720. The system 2700 is intended to represent a specific implementation of techniques described previously in this paper for illustrative purposes. The techniques may be applicable to an applicable known or convenient (wired or wireless) device for which there is a motivation to control network service usage.

In the example of FIG. 27, the network service consuming application 2702 is a application that is implemented on a device. In an expected use, the application is a software application stored at least in part in memory on a wireless device, though kernel-level instructions could be implemented as firmware or even hardware. The application can be referred to as "running" on the device or as being "executed" by the device in accordance with known uses of those terms. Wireless media are known to have more bandwidth constraints, which is why a wireless device is an expected use, though the technique may be applicable to wired devices in certain situations.

In the example of FIG. 27, the network service usage analysis engine 2704 is coupled to the network service consuming application 2702. The network service usage analysis engine 2704 analyzes traffic from the network service consuming application 2702 and stores relevant data in the application behavior datastore 2706. The data can include all traffic that is sent by the application, or a subset of the traffic (e.g., that which has a certain QoS classification or priority, that which has high resource consumption due to frequent transmission from the application, that which is sent to a particular destination, etc.) The data can also include traffic that is received for the application. The application behavior datastore 2706 can alternatively or in addition be implemented as a traffic source/destination datastore, which can be valuable if differential access control is based upon the source and/or destination of traffic. The application behavior datastore 2706 includes data structures (e.g., records) representative of data that is organized with implementation-specific granularity. For example, the data structures could be representative of frames (L2), packets (L3), or messages. (It may be noted that the term "packets" is often used to mean collections of data that are not limited to L3.) The desired granularity may depend upon where the network service usage analysis engine 2704 is located. Whether the data structures are changed over time (e.g., to change data associated with a record), replaced as records age, or maintained as historical data is also implementation-specific.

In the example of FIG. 27, the network service usage classification engine 2708 is coupled to the network service usage analysis engine 2704 and the application behavior datastore 2706. The network service usage classification engine 2708 can categorize the traffic stored in the application behavior datastore 2706 based on, e.g., network type, time of day, connection cost, whether home or roaming, network busy state, QoS, and whether the particular service usage activity is in foreground of user interaction or in the background of user interaction, or other characteristics that are obtained from network service usage analysis or through other means. Classification rules can include, for example, examining if one or more of the following has taken place within a specified period of time: user has interacted with the device, user has interacted with the service usage activity, user has picked up the device, service usage activity UI content is in the foreground of the device UI, audio or video information is being played by the service usage activity, a certain amount of data has been communicated by the service usage activity, service usage activity is or is not on a foreground or background service list. Rules that define which service usage activities to classify as, e.g., background service usage activities can be user-selected, set by a service provider, or through some other applicable means.

Advantageously, the network service usage analysis engine 2704 can examine a particular service usage activity and the network service usage classification engine 2708 can determine if the particular service usage activity fits a set of one or more classification rules that define the particular service usage activity as, e.g., a background service usage activity.

In the example of FIG. 27, the application traffic prioritization engine 2710 uses a policy stored in the network service usage control policy datastore 2712 to determine an appropriate prioritization for traffic to and/or from the network service consuming application 2702. Prioritization can enable the system 2700 to fine-tune the amount of network resources consumed by the network service consuming application 2702, or the rate of network resource consumption. The control policy can require applications to throttle network resource consumption, prohibit the use of network resources by certain applications, etc.

Advantageously, the application traffic prioritization engine 2710 can determine a particular service usage activity has a particular characteristic, such as being a background service usage activity. This can involve checking whether a condition is satisfied.

In the example of FIG. 27, the differential network access control engine 2714 is coupled to the application traffic prioritization engine 2710 and the network service usage control policy datastore 2712. The differential network access control engine 2714 causes the network service consuming application 2702 traffic to be queued in the application traffic cache 2716. (If no throttling is required to follow the control policy, of course, the traffic need not be cached anywhere other than is typical, such as in an output buffer.) The application traffic cache 2716 is intended to represent a cache that is implemented on top of an output buffer or other standard caching device, and is used by the differential network access control engine 2714 to facilitate control over "rogue" applications, applications having anomalous behavior, or applications that must otherwise be controlled to conform with the control policy.

Advantageously, the differential network access control engine can restrict network access of a particular service usage activity when a condition is satisfied, such as when the service usage activity is a background activity.

In the example of FIG. 27, the application traffic override engine 2718 is coupled to the differential network access control engine 2714 and the application traffic cache 2716. The application traffic override engine 2718 enables a user or device to deviate from the control policy. Such deviation can be prompted by, for example, an incentive offer or a notification of cost.

In an illustrative example, the device 2700 blocks chatter for an application running in the background that is attempting to report device or user behavior. The application traffic prioritization engine 2710 determines that the chatter has zero priority, such that the network service consuming application 2702 is prevented from consuming any resources. The user can be sent a notification by the application traffic override engine 2718 that their control policy prohibits the application from consuming network resources, but that the user can opt to deviate from the control policy if they are willing to pay for the consumed resources. If the user is willing to pay for the resources, traffic can be sent at a certain rate from the application traffic cache 2716 through the network interface 2720, or perhaps sent without using the application traffic cache 2716.

As another illustrative example, the device 2700 could identify application traffic as a software update. The differential network access control engine 2714 may determine that software updates can be received at a throttled rate (perhaps even slower than the lowest QoS categorization). The application traffic override engine 2718 can receive an indication from the user, from user preferences, service provider settings, or the like that the updates can ignore the control policy for a particular application (or for all applications).

Advantageously, the control policy can set up a priority to communicate cached elements, set minimum update frequencies, provide control policy overrides (typically for payment), or the like to fine-tune differential network access control policies. This can enable the system 2700 to encourage certain behavior, such as sending low QoS traffic when it is cheaper (e.g., when the network does not have a busy state, at historically low-use times of day, when on a certain type of network, such as Wi-Fi, as opposed to another, such as cellular, etc.).

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference the following U.S. patent applications for all purposes: U.S. Ser. No. 14/082,040, filed Nov. 15, 2013, entitled "Device-Assisted Services for Protecting Network Capacity;" U.S. Ser. No. 13/134,028, filed May 25, 2011, entitled "Device-Assisted Services for Protecting Network Capacity;" U.S. Ser. No. 12/380,759 filed Mar. 2, 2009, entitled "Verifiable Device Assisted Service Policy Implementation;" U.S. Ser. No. 12/380,779 filed Mar. 2, 2009, entitled "Device Assisted Service Profile Management with User Preference, Adaptive Policy, Network Neutrality, and User Privacy;" U.S. Ser. No. 12/380,758 filed Mar. 2, 2009, entitled "Verifiable Device Assisted Service Usage Monitoring with Reporting, Synchronization, and Notification;" U.S. Ser. No. 12/380,778 filed Mar. 2, 2009, entitled "Verifiable Device Assisted Service Usage Billing with Integrated Accounting, Mediation Accounting, and Multi-Account;" U.S. Ser. No. 12/380,768 filed Mar. 2, 2009, entitled "Network Based Service Policy Implementation with Network Neutrality and User Privacy;" U.S. Ser. No. 12/380,767 filed Mar. 2, 2009, entitled "Network Based Service Profile Management with User Preference, Adaptive Policy, Network Neutrality and User Privacy;" U.S. Ser. No. 12/380,780 filed Mar. 2, 2009, entitled "Automated Device Provisioning and Activation;" U.S. Ser. No. 12/380,755 filed Mar. 2, 2009, entitled "Device Assisted Ambient Services;" U.S. Ser. No. 12/380,756 filed Mar. 2, 2009, entitled "Network Based Ambient Services;" U.S. Ser. No. 12/380,770 filed Mar. 2, 2009, entitled "Network Tools for Analysis, Design, Testing, and Production of Services;" U.S. Ser. No. 12/380,772 filed Mar. 2, 2009, entitled "Roaming Services Network and Overlay Networks;" U.S. Ser. No. 12/380,782 filed Mar. 2, 2009, entitled "Open Development System for Access Service Providers;" U.S. Ser. No. 12/380,783 filed Mar. 2, 2009, entitled "Virtual Service Provider Systems;" U.S. Ser. No. 12/380,757 filed Mar. 2, 2009, entitled "Service Activation Tracking System;" U.S. Ser. No. 12/380,781 filed Mar. 2, 2009, entitled "Open Transaction Central Billing System;" U.S. Ser. No. 12/380,774 filed Mar. 2, 2009, entitled "Verifiable and Accurate Service Usage Monitoring for Intermediate Networking Devices;" U.S. Ser. No. 12/380,771 filed Mar. 2, 2009, entitled "Verifiable Service Billing for Intermediate Networking Devices;" U.S. Ser. No. 12/380,773 filed Mar. 2, 2009, entitled "Verifiable Service Policy Implementation for Intermediate Networking Devices;" U.S. Ser. No. 12/380,769 filed Mar. 2, 2009, entitled "Service Profile Management with User Preference, Adaptive Policy, Network Neutrality and User Privacy for Intermediate Networking Devices;" U.S. Ser. No. 12/380,777 filed Mar. 2, 2009, entitled "Simplified Service Network Architecture;" U.S. Ser. No. 12/695,019 filed Jan. 27, 2010, entitled "Device Assisted CDR Creation, Aggregation, Mediation and Billing;" U.S. Ser. No. 12/695,020 filed Jan. 27, 2010, entitled "Adaptive Ambient Services;" U.S. Ser. No. 12/694,445 filed Jan. 27, 2010, entitled "Security Techniques for Device Assisted Services;" U.S. Ser. No. 12/694,451 filed Jan. 27, 2010, entitled "Device Group Partitions and Settlement Platform;" U.S. Ser. No. 12/694,455 filed Jan. 27, 2010, entitled "Device Assisted Services Install;" U.S. Ser. No. 12/695,021 filed Jan. 27, 2010, entitled "Quality of Service for Device Assisted Services;" U.S. Ser. No. 12/695,980 filed Jan. 28, 2010, entitled "Enhanced Roaming Services and Converged Carrier Networks with Device Assisted Services and a Proxy;" and U.S. application Ser. No. 13/134,005, filed May 25, 2011, entitled "System and Method for Wireless Network Offloading,"

This application also incorporates by reference the following U.S. provisional applications: U.S. provisional application Ser. No. 61/206,354, filed Jan. 28, 2009, entitled "Services Policy Communication System and Method;" U.S. provisional application Ser. No. 61/206,944, filed Feb. 4, 2009, entitled "Services Policy Communication System and Method;" U.S. provisional application Ser. No. 61/207,393, filed Feb. 10, 2009, entitled "Services Policy Communication System and Method;" U.S. provisional application Ser. No. 61/207,739, filed Feb. 13, 2009, entitled "Services Policy Communication System and Method;" U.S. provisional application Ser. No. 61/270,353, filed Jul. 6, 2009, entitled "Device Assisted CDR Creation, Aggregation, Mediation and Billing;" U.S. provisional application Ser. No. 61/275,208, filed Aug. 25, 2009, entitled "Adaptive Ambient Services;" U.S. provisional application Ser. No. 61/237,753, filed Aug. 28, 2009, entitled "Adaptive Ambient Services;" U.S. provisional application Ser. No. 61/252,151, filed Oct. 15, 2009, entitled "Security Techniques for Device Assisted Services;" U.S. provisional application Ser. No. 61/252,153, filed Oct. 15, 2009, entitled "Device Group Partitions and Settlement Platform;" U.S. provisional application Ser. No. 61/264,120, filed Nov. 24, 2009, entitled "Device Assisted Services Install," and U.S. provisional application Ser. No. 61/264,126, filed Nov. 24, 2009, entitled "Device Assisted Services Activity Map;" U.S. provisional application Ser. No. 61/348,022, filed May 25, 2010, entitled "Device Assisted Services for Protecting Network Capacity;" U.S. provisional application Ser. No. 61/381,159, filed Sep. 9, 2010, entitled "Device Assisted Services for Protecting Network Capacity;" U.S. provisional application Ser. No. 61/381,162, filed Sep. 9, 2010, entitled "Service Controller Interfaces and Workflows; " U.S. provisional application Ser. No. 61/384,456, filed Sep. 20, 2010, entitled "Securing Service Processor with Sponsored SIMs;" U.S. provisional application Ser. No. 61/389,547, filed Oct. 4, 2010, entitled "User Notifications for Device Assisted Services;" U.S. provisional application Ser. No. 61/385,020, filed Sep. 21, 2010, entitled "Service Usage Reconciliation System Overview;" U.S. provisional application Ser. No. 61/387,243, filed Sep. 28, 2010, entitled "Enterprise and Consumer Billing Allocation for Wireless Communication Device Service Usage Activities;" U.S. provisional application Ser. No. 61/387,247, filed Sep. 28, 2010, entitled "Secured Device Data Records;" U.S. provisional application Ser. No. 61/407,358, filed Oct. 27, 2010, entitled "Service Controller and Service Processor Architecture;" U.S. provisional application Ser. No. 61/418,507, filed Dec. 1, 2010, entitled "Application Service Provider Interface System;" U.S. provisional application Ser. No. 61/418,509, filed Dec. 1, 2010, entitled "Service Usage Reporting Reconciliation and Fraud Detection for Device Assisted Services;" U.S. provisional application Ser. No. 61/420,727, filed Dec. 7, 2010, entitled "Secure Device Data Records;" U.S. provisional application Ser. No. 61/422,565, filed Dec. 13, 2010, entitled "Service Design Center for Device Assisted Services;" U.S. provisional application Ser. No. 61/422,572, filed Dec. 13, 2010, entitled "System Interfaces and Workflows for Device Assisted Services;" U.S. provisional application Ser. No. 61/422,574, filed Dec. 13, 2010, entitled "Security and Fraud Detection for Device Assisted Services;" U.S. provisional application Ser. No. 61/435,564, filed Jan. 24, 2011, entitled "Framework for Device Assisted Services;" and U.S. provisional application Ser. No. 61/472,606, filed Apr. 6, 2011, entitled "Managing Service User Discovery and Service Launch Object Placement on a Device."

We claim:

1. A wireless end-user device, comprising:
a wireless wide area network (WWAN) modem to communicate data for Internet service activities between the device and at least one WWAN, when configured for and connected to the WWAN;
a non-transitory memory to store a configurable differential traffic control policy;
a service processor to implement
a policy agent configured to securely receive, from a network element, at least a portion of a differential traffic control policy list, the differential traffic control policy list distinguishing between a first one or more applications capable of execution on the device and a second one or more applications and/or services capable of execution on the device,
an interface to allow a user to configure one or more aspects of the differential traffic control policy for one or more of the first one or more applications,
one or more device agents to classify whether a particular application associated with a first Internet service access request, and capable of both
interacting with a user in a user interface foreground of the device, and
at least some Internet service activities when not interacting with a user in the device user interface foreground,
is interacting with the user in the device user interface foreground, and to classify whether data communication for Internet service activities is provided through the WWAN modem, and
a network stack agent to, based on the classification performed by the one or more device agents and based on whether the particular application is a member of the first one or more applications, disallow the first Internet service access request for the particular application
in a first classification state wherein the request is disallowed based on a match with a disallowed state specified at least in part by a user-configured aspect of the differential traffic control policy, and
in a second classification state comprising data communication for Internet service activities provided through the WWAN modem, the particular application not interacting with the user in the device user interface foreground, and the particular application being one of the first one or more applications,
but to allow the first service access request for the particular application in the second classification state during at least one time period based on the WWAN modem being active to serve a second Internet service access request from a different application and/or service.

2. The wireless end-user device of claim 1, wherein the one or more device agents are configured to classify that the particular application is interacting with the user in the device user interface foreground when the user of the device is directly interacting with that application or perceiving any benefit from that application.

3. The wireless end-user device of claim 1, wherein the one or more device agents are configured to classify that the particular application is interacting with the user in the device user interface foreground based on a state of user interface priority for the application.

4. The wireless end-user device of claim 1, wherein the one or more device agents are configured to classify that the particular application is not interacting with the user in the device user interface foreground when the application is providing or utilizing a background data service.

5. The wireless end-user device of claim 1, wherein the user interface is to provide the user of the device with information regarding why the differential traffic control policy is applied to the particular application.

6. The wireless end-user device of claim 1, wherein the differential traffic control policy is part of a multimode profile having different policies for different ones of a plurality of wireless network types supported by the device for data communication.

7. The wireless end-user device of claim 6, wherein the one or more device agents to classify whether data communication for Internet service activities is provided through the WWAN modem do so at least in part by classifying a wireless network type providing data communications for Internet service activities from among the plurality of wireless network types, and the policy agent is further configured to select a traffic control policy from the multimode profile based at least in part on the classified wireless network type.

8. The wireless end-user device of claim 7, wherein the plurality of wireless network types include at least one wireless local area network (WLAN) type as the wireless network type when data communication is provided via a WLAN modem on the device.

9. The wireless end-user device of claim 8, wherein the policy agent is further configured to, when the classified wireless network type is at least one type of WLAN, select a traffic control policy from the multimode profile based at least in part on a type of network connection from the WLAN to the Internet.

10. The wireless end-user device of claim 6, wherein the plurality of wireless network types include three or more of 2G WWAN, 3G WWAN, 4G WWAN, home WWAN, roaming WWAN, and WLAN.

11. The wireless end-user device of claim 1, wherein the one or more device agents to classify whether data communication for Internet service activities is provided through the WWAN modem do so at least in part by classifying a wireless network type providing data communications for Internet service activities from among a plurality of wireless network types supported by the device for data communication.

12. The wireless end-user device of claim 1, wherein the at least one WWAN comprises a home WWAN and a roaming WWAN, and wherein the second classification state comprises data communication for Internet service activities provided by the roaming WWAN, but not data communication for Internet service activities provided by the home WWAN.

13. The wireless end-user device of claim 1, the policy agent further configured to query the network element to determine whether a given application capable of execution on the device is included in the differential traffic control policy list.

14. The wireless end-user device of claim 1, wherein the network stack agent is further to allow the first Internet service access request for the particular application in a third classification state comprising data communication for Internet service activities provided through the WWAN modem, the particular application not interacting with a user in the device user interface foreground, and the particular application is one of the second one or more applications and/or services.

15. The wireless end-user device of claim 1, wherein the network stack agent is further configured to dynamically change at least one policy application to allow or disallow the first Internet service access request based on a power state of the device.

16. The wireless end-user device of claim 1, wherein the network stack agent is further configured to dynamically change at least one policy application to allow or disallow the first Internet service access request based on a device usage state.

17. The wireless end-user device of claim 1, wherein the network stack agent is further configured to dynamically change at least one policy application to allow or disallow the first Internet service access request based on power control state changes for one or more of the modems.

18. The wireless end-user device of claim 1, wherein the network stack agent is operable to disallow the Internet service access request by intercepting open, connect, and/or write requests by the particular application to a network stack.

19. The wireless end-user device of claim 18, wherein the network stack agent is configured to respond to an intercepted request by the particular application by emulating network messaging.

20. The wireless end-user device of claim 19, wherein emulating network messaging comprises responding to a network request from the particular application by blocking the request from passing to a network stack and returning to the particular application a message indicating the network request was not successful.

21. The wireless end-user device of claim 1, wherein the second one or more applications and/or services are not subject to a differential network access control that is applicable to the first one or more applications.

\* \* \* \* \*